United States Patent
Kim et al.

(10) Patent No.: US 12,041,624 B2
(45) Date of Patent: Jul. 16, 2024

(54) METHOD FOR TRANSMITTING/RECEIVING DATA IN WIRELESS COMMUNICATION SYSTEM, AND DEVICE THEREFOR

(71) Applicant: LG ELECTRONICS INC., Seoul (KR)

(72) Inventors: Kyuseok Kim, Seoul (KR); Hyungtae Kim, Seoul (KR); Kijun Kim, Seoul (KR); Jiwon Kang, Seoul (KR); Kilbom Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 504 days.

(21) Appl. No.: 17/413,797

(22) PCT Filed: Dec. 13, 2019

(86) PCT No.: PCT/KR2019/017750
§ 371 (c)(1),
(2) Date: Jun. 14, 2021

(87) PCT Pub. No.: WO2020/122686
PCT Pub. Date: Jun. 18, 2020

(65) Prior Publication Data
US 2022/0022237 A1 Jan. 20, 2022

Related U.S. Application Data

(60) Provisional application No. 62/829,682, filed on Apr. 5, 2019, provisional application No. 62/795,073, filed on Jan. 22, 2019.

(30) Foreign Application Priority Data

| Dec. 13, 2018 | (KR) | ........................ 10-2018-0161119 |
| Jan. 11, 2019 | (KR) | ........................ 10-2019-0003632 |
| Feb. 15, 2019 | (KR) | ........................ 10-2019-0018066 |

(51) Int. Cl.
*H04W 72/23* (2023.01)
*H04L 1/1812* (2023.01)
(Continued)

(52) U.S. Cl.
CPC ........... *H04W 72/23* (2023.01); *H04L 1/1819* (2013.01); *H04L 5/0053* (2013.01); *H04W 72/1273* (2013.01)

(58) Field of Classification Search
None
See application file for complete search history.

(56) References Cited

U.S. PATENT DOCUMENTS

2014/0036814 A1* 2/2014 Zhang .................. H04W 72/23
370/329
2017/0367046 A1* 12/2017 Papasakellariou .... H04W 72/23
(Continued)

FOREIGN PATENT DOCUMENTS

KR    1020160108309    9/2016

OTHER PUBLICATIONS

Huawei, HiSilicon, "Enhancements on multi-TRP/panel transmission," R1-1812243, 3GPP TSG RAN WG1 Meeting #95, Spokane, USA, Nov. 12-16, 2018, 11 pages.
(Continued)

*Primary Examiner* — Jamaal Henson
(74) *Attorney, Agent, or Firm* — Fish & Richardson P.C.

(57) ABSTRACT

The present specification relates to a method for a base station transmitting/receiving data in a wireless communication system. More specifically, a terminal receives, from the base station, configuration information for configuring a control resource set (CORESET). Then, on the basis of the configuration information, the terminal receives first downlink control information (DCI) and second DCI for generating an ACK/NACK using a dynamic method. The terminal
(Continued)

receives, on a resource scheduled by the first DCI, a first physical downlink shared channel (PDSCH) and a second PDSCH, and transmits a first Ack/Nack for the first PDSCH and an Ack/Nack for the second PDSCH.

19 Claims, 29 Drawing Sheets

(51) Int. Cl.
*H04L 5/00* (2006.01)
*H04W 72/1273* (2023.01)

(56) References Cited

U.S. PATENT DOCUMENTS

| | | | | |
|---|---|---|---|---|
| 2018/0227777 | A1* | 8/2018 | Sun | H04L 5/0053 |
| 2019/0387550 | A1* | 12/2019 | Pan | H04W 74/0833 |
| 2020/0084752 | A1* | 3/2020 | Åström | H04W 72/51 |
| 2020/0154467 | A1* | 5/2020 | Gong | H04L 5/0092 |
| 2021/0153185 | A1* | 5/2021 | Schober | H04L 5/0051 |
| 2022/0116183 | A1* | 4/2022 | Gao | H04L 1/1812 |
| 2022/0190980 | A1* | 6/2022 | Matsumura | H04L 5/0032 |

OTHER PUBLICATIONS

Huawei, HiSilicon, "Solution and TP for multi-TRP PDCCH transmission," R1-1800824, 3GPP TSG RAN WG1 Ad Hoc Meeting, Vancouver, Canada, Jan. 22-26, 2018, 7 pages.

Intel Corporation, "Discussion on multi-TRP/multi-panel transmission," R1-1812509, 3GPP TSG RAN WG1 Meeting #95, Spokane, USA, Nov. 12-16, 2018, 15 pages.

PCT International Search Report in International Appln. No. PCT/KR2019/017750, dated Mar. 31, 2020, 5 pages.

Qualcomm Incorporated, "Multi-TRP Enhancements," R1-1813442, 3GPP TSG-RAN WG1 Meeting #95, Spokane, WA, Nov. 12-16, 2018, 22 pages.

* cited by examiner

[Fig. 1]
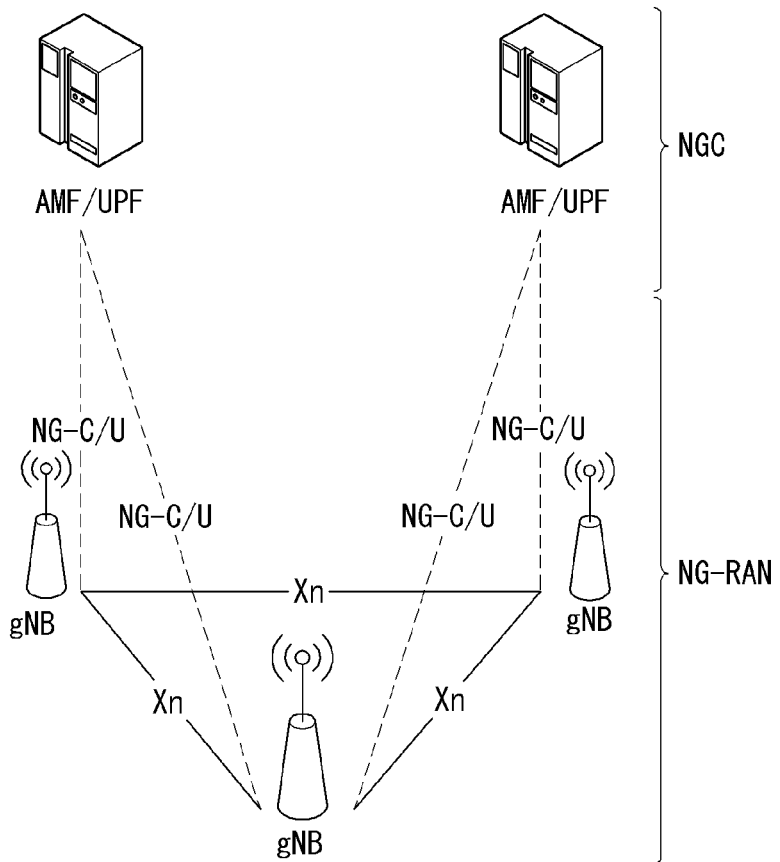
[Fig. 2]
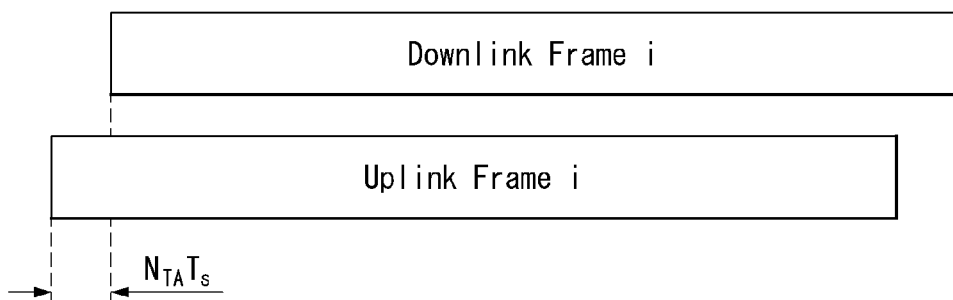

[Fig. 3]
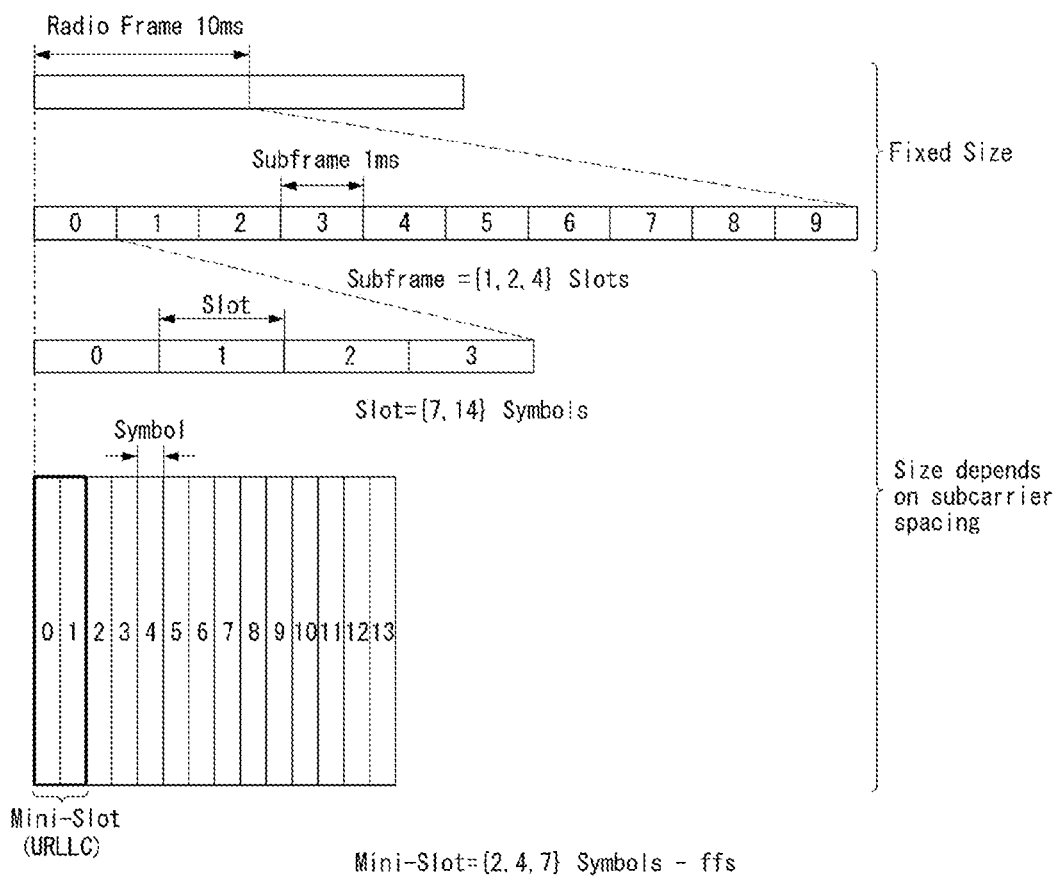

[Fig. 4]
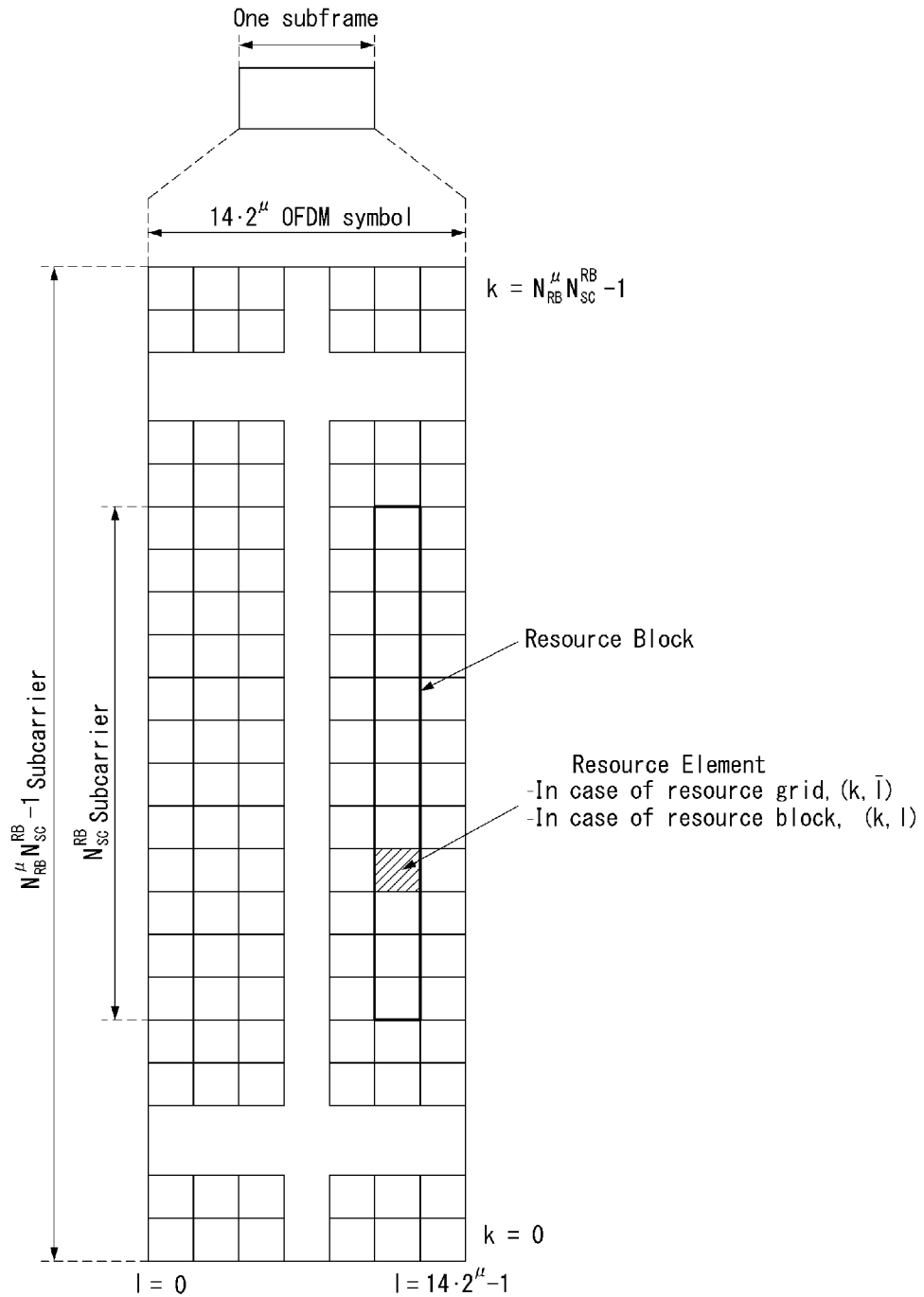

[Fig. 5]
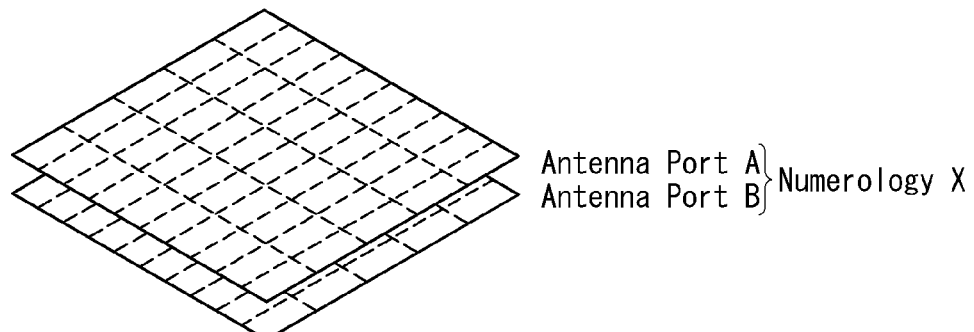
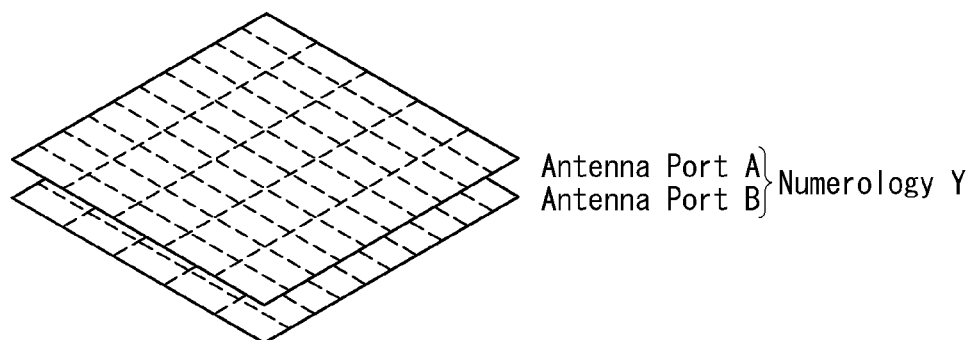
[Fig. 6]
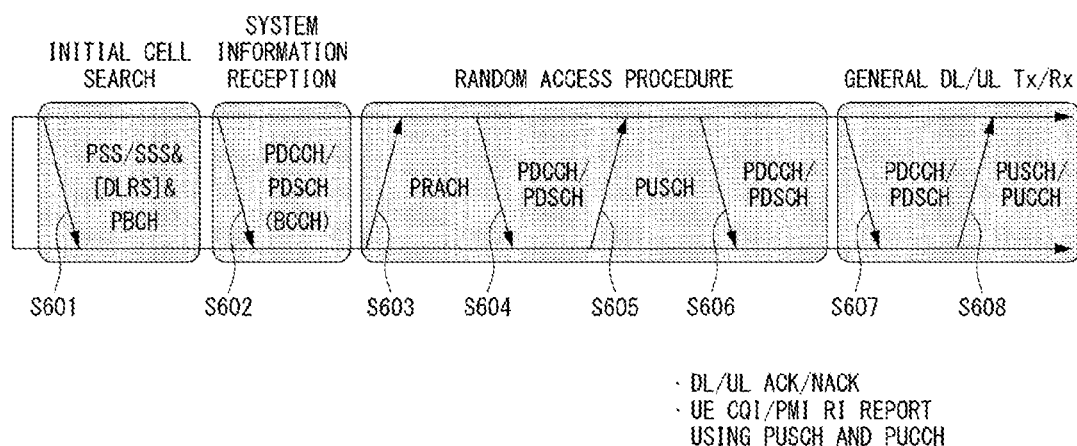

[Fig. 7]
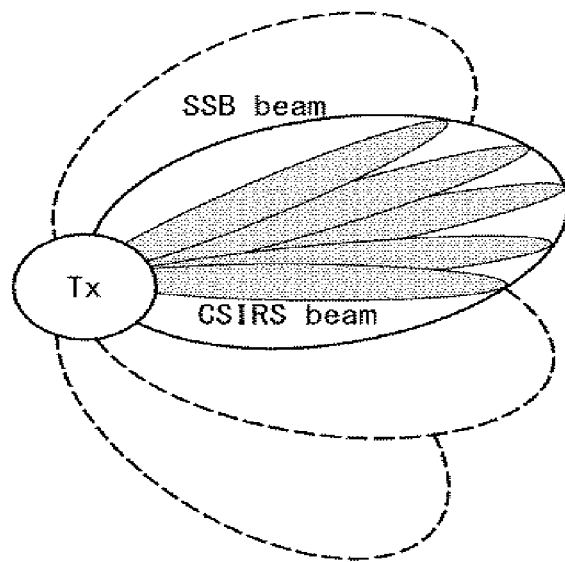
[Fig. 8]
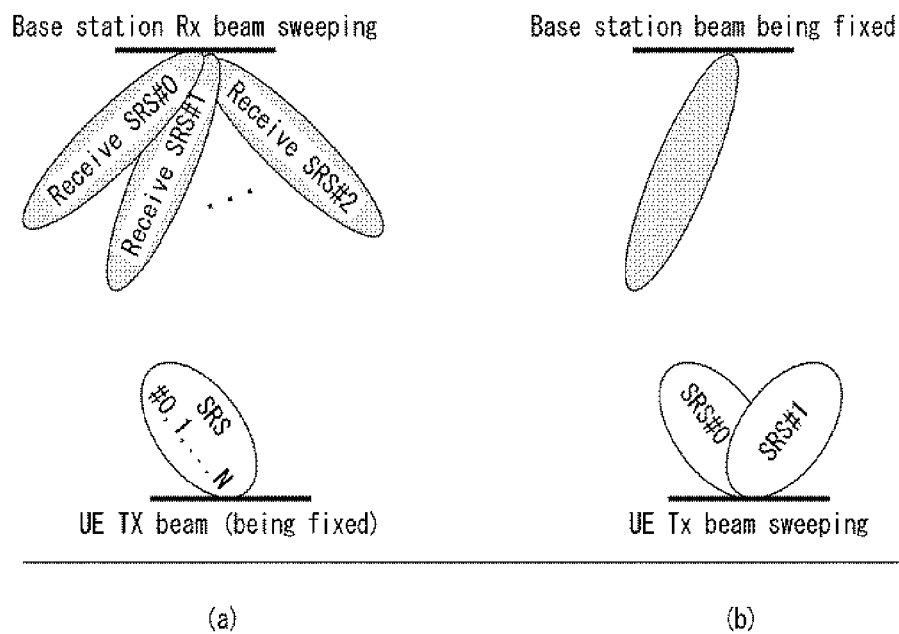
(a)                                     (b)

[Fig. 9]
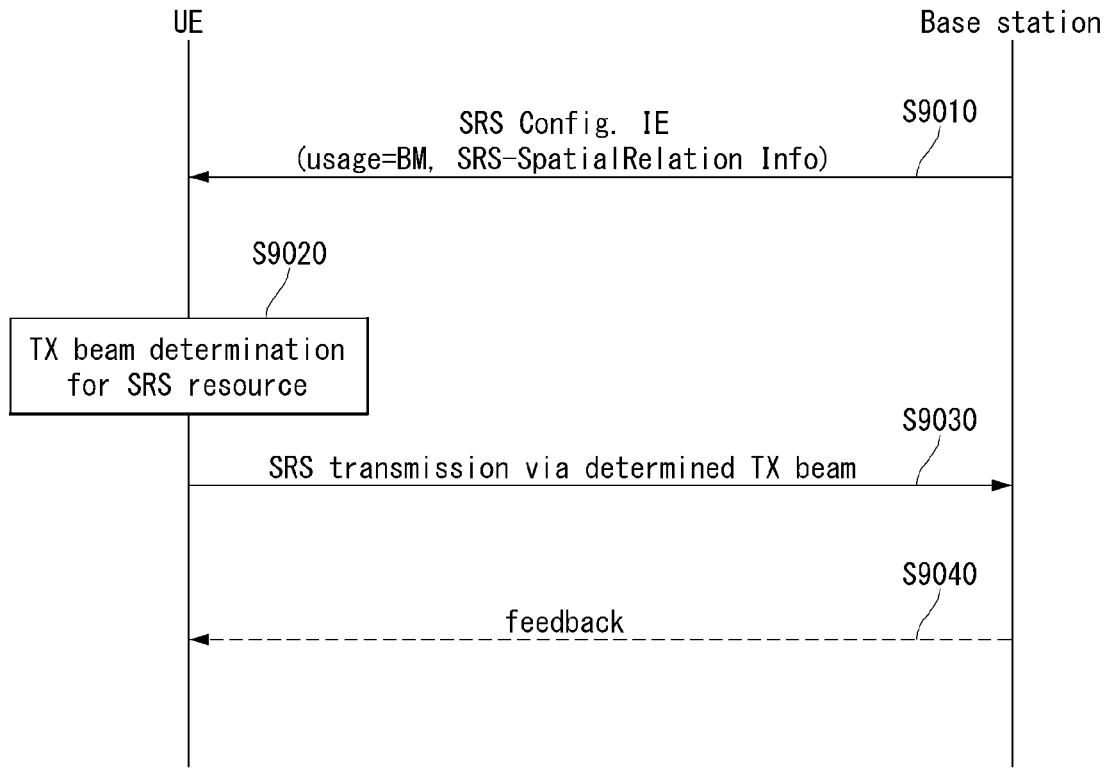
[Fig. 10]
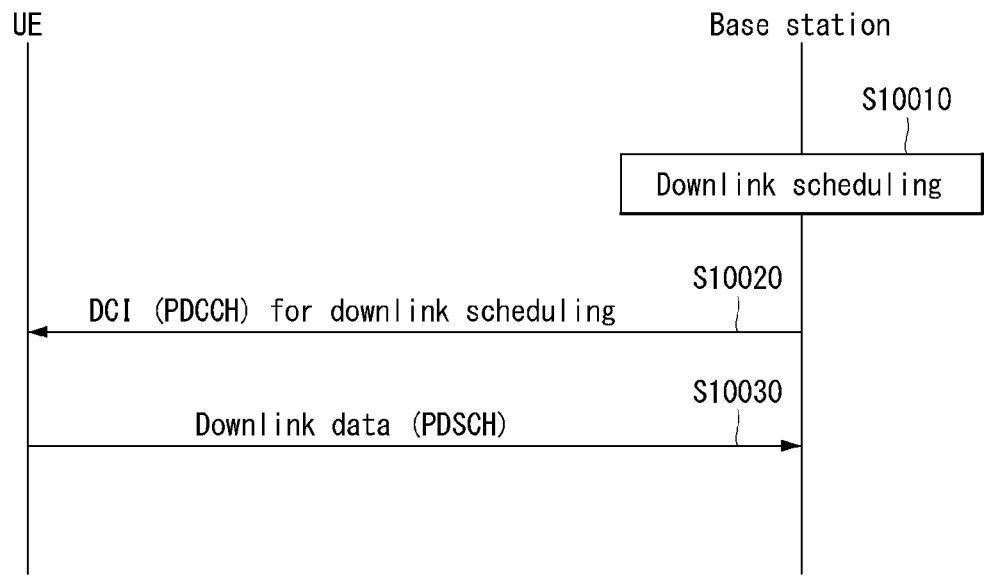

[Fig. 11]
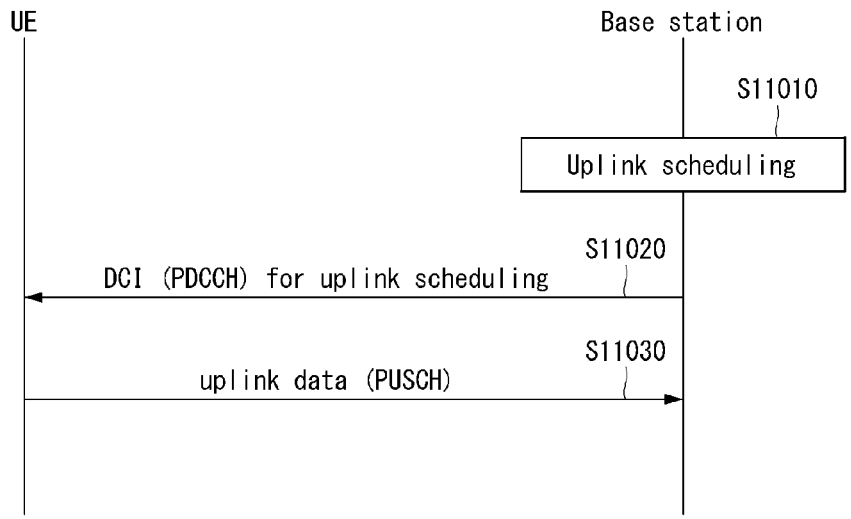
[Fig. 12]
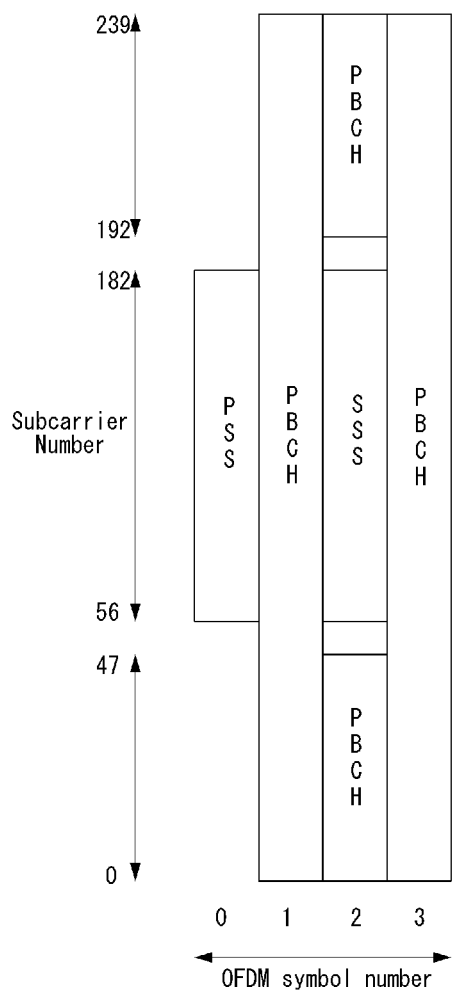

[Fig. 13]
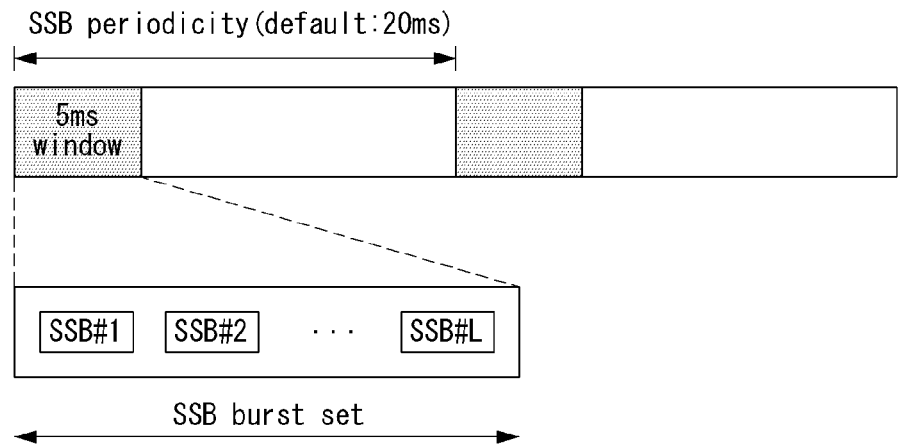
[Fig. 14]
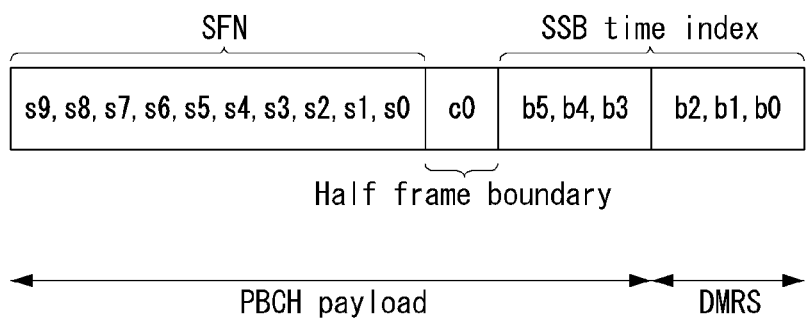
[Fig. 15]
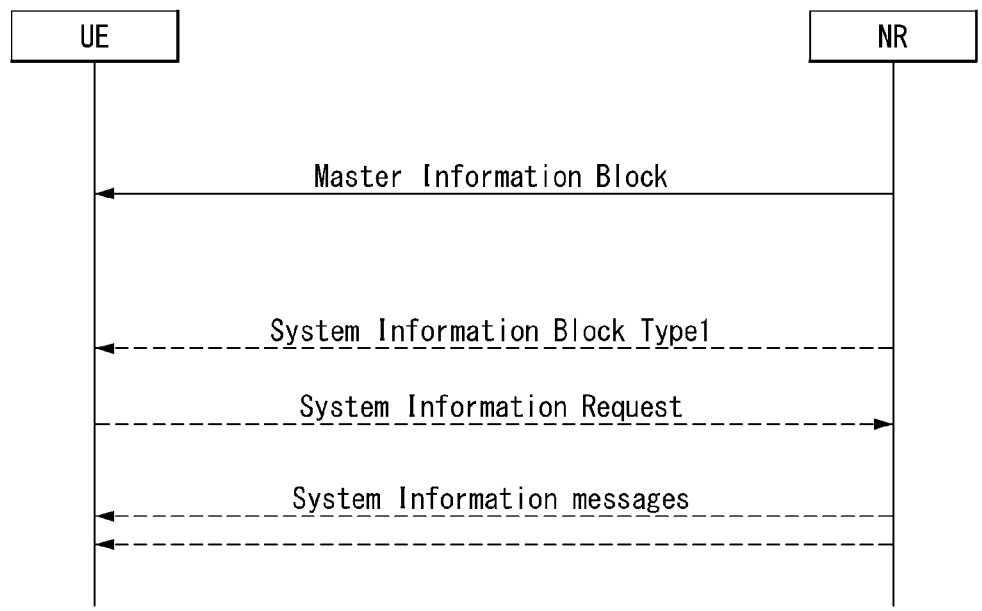

[Fig. 16]
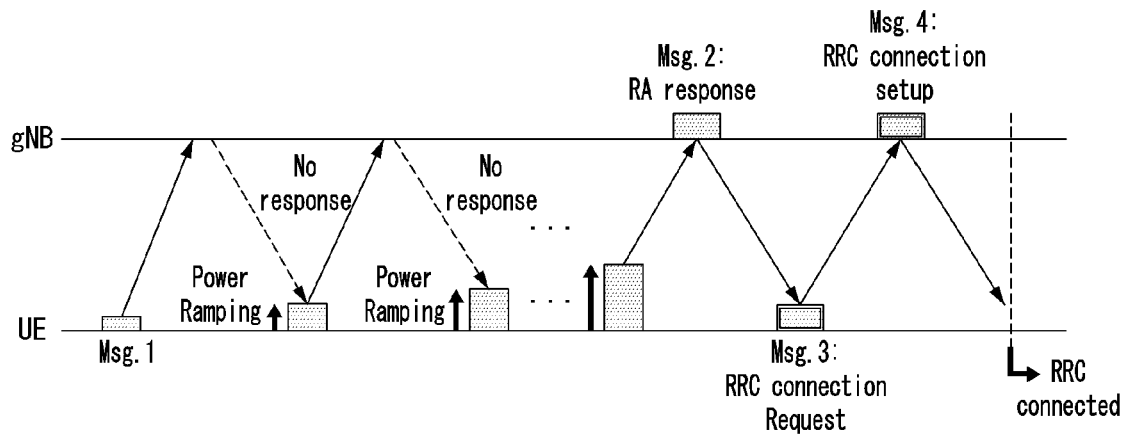
[Fig. 17]
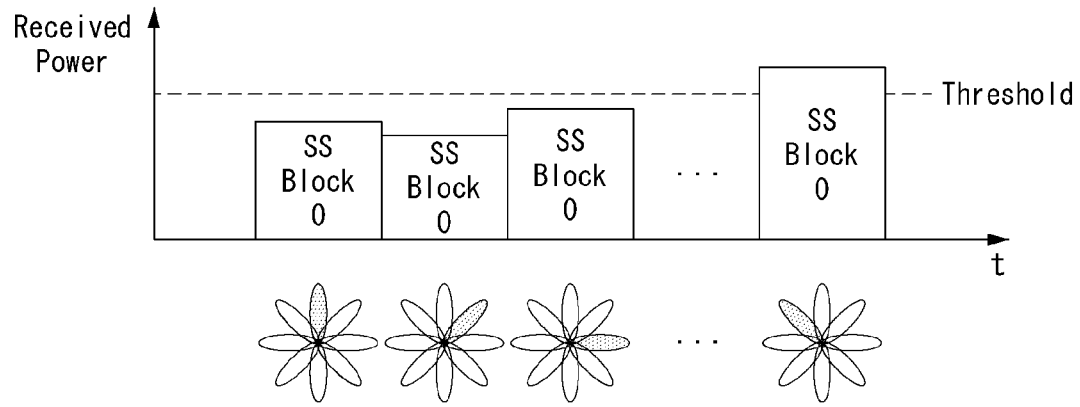
[Fig. 18]
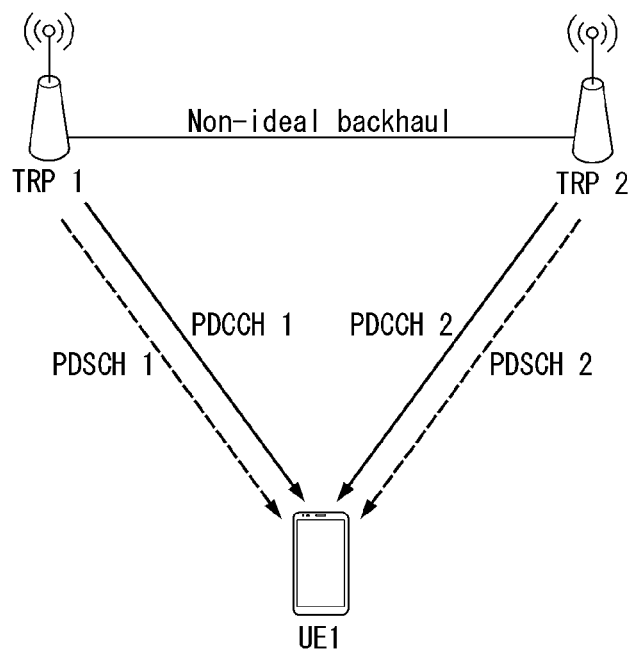

[Fig. 19]
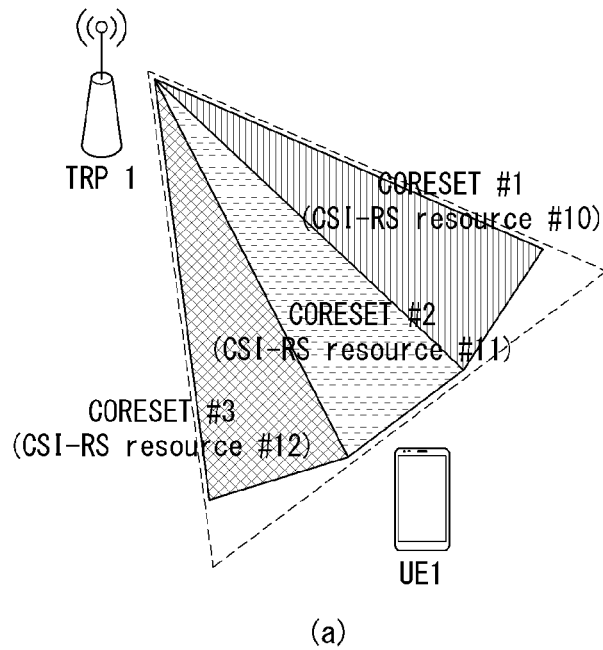
(a)
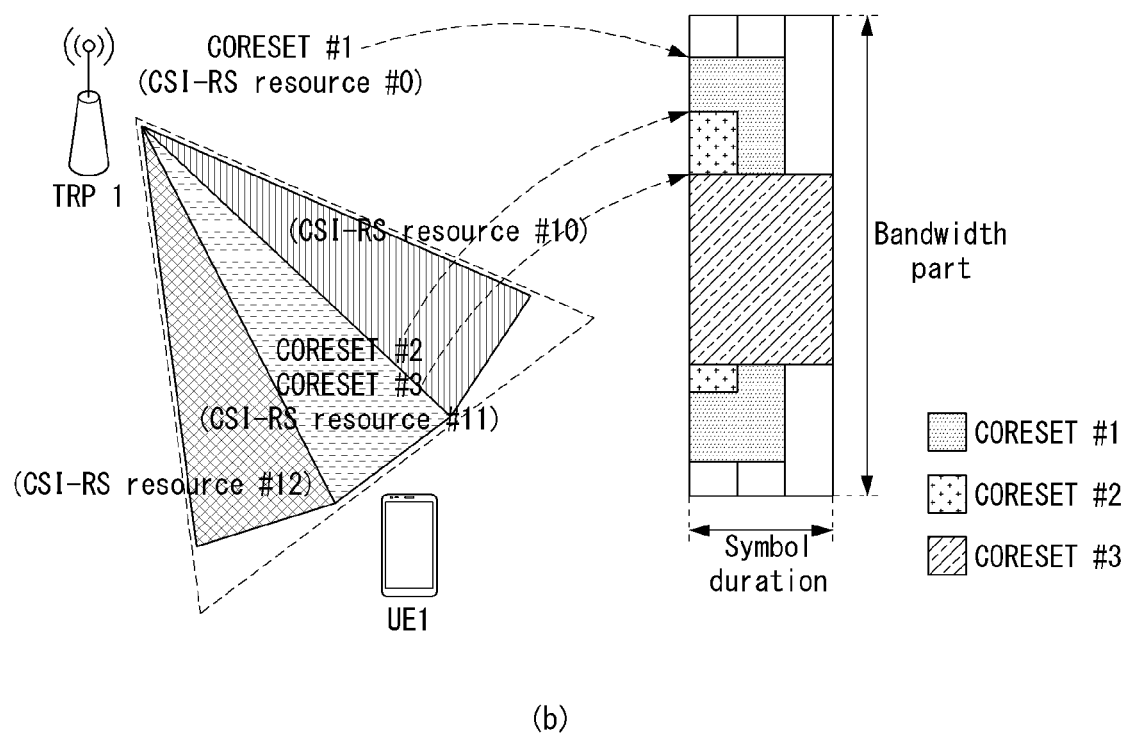
(b)

[Fig. 20]
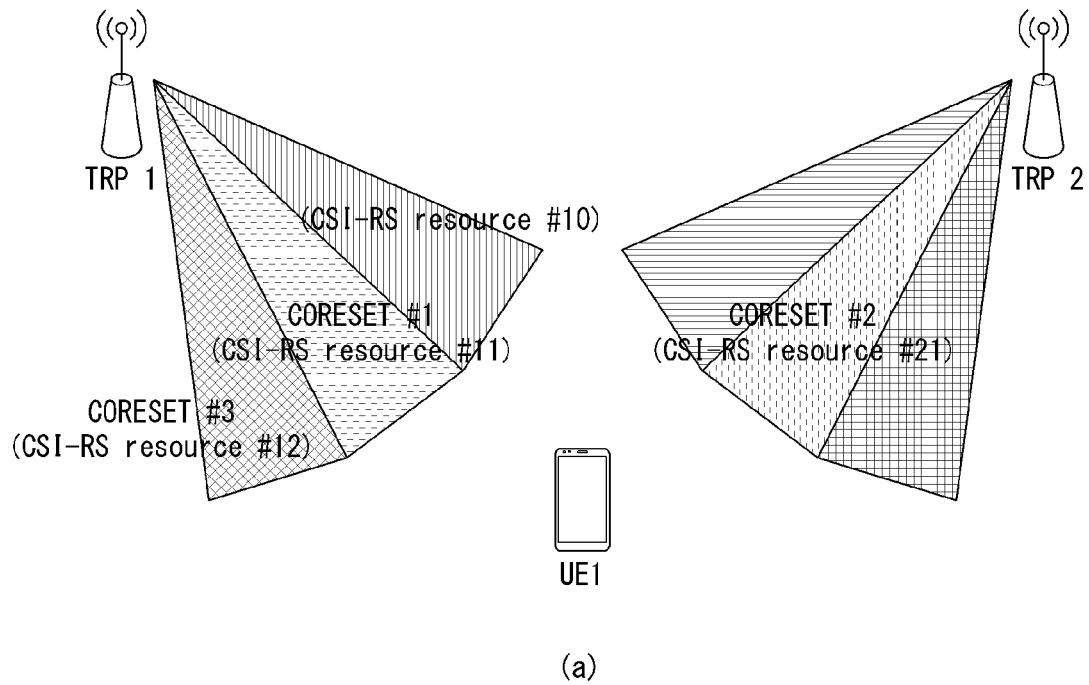
(a)
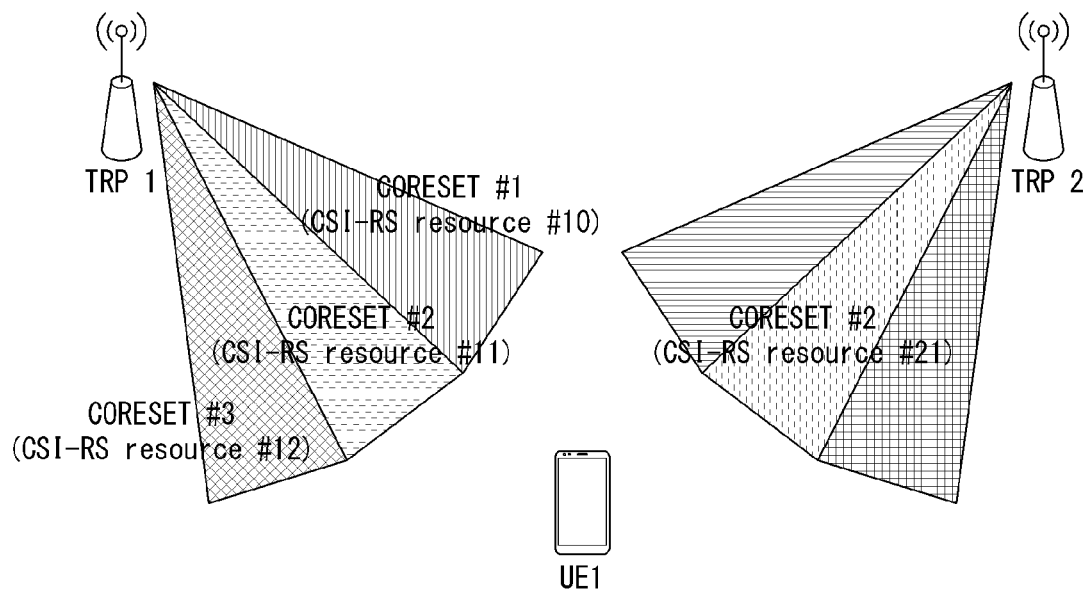
(b)

[FIG. 21]

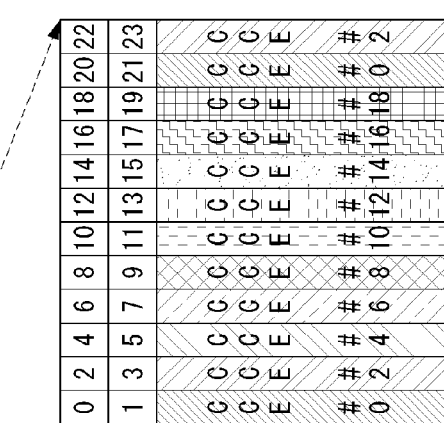
[FIG. 22]

[Fig. 25]
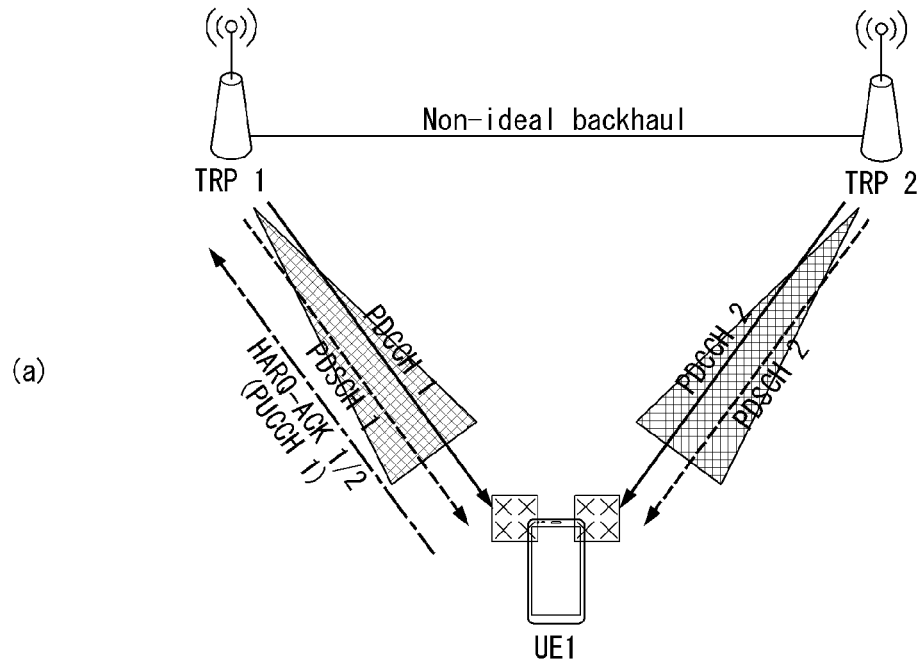
(a)
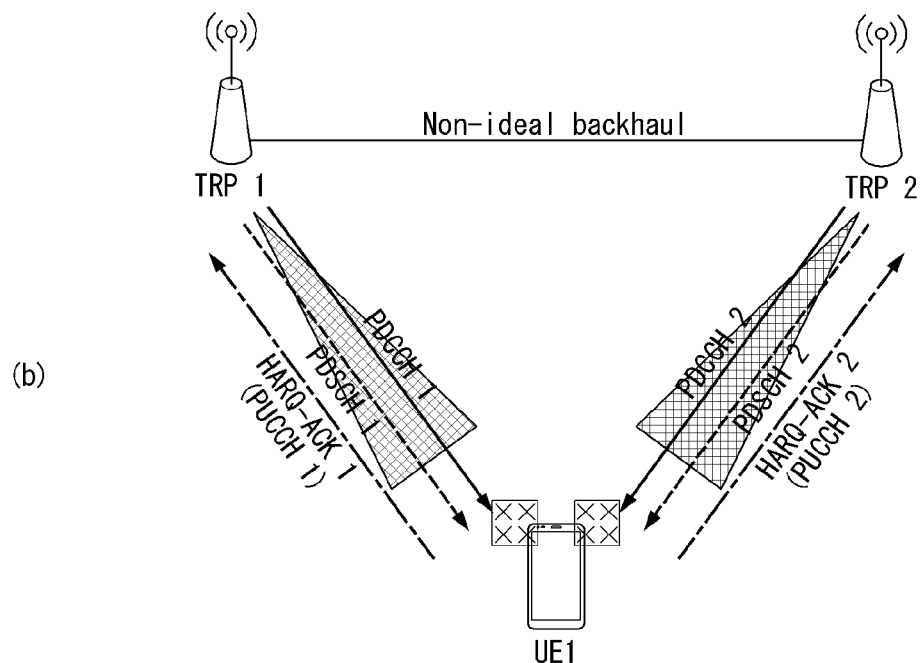
(b)

[Fig. 26]
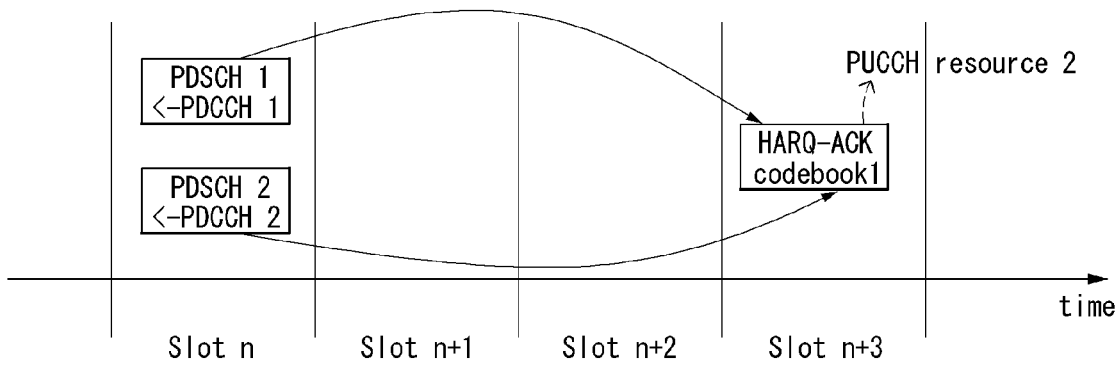
(a)
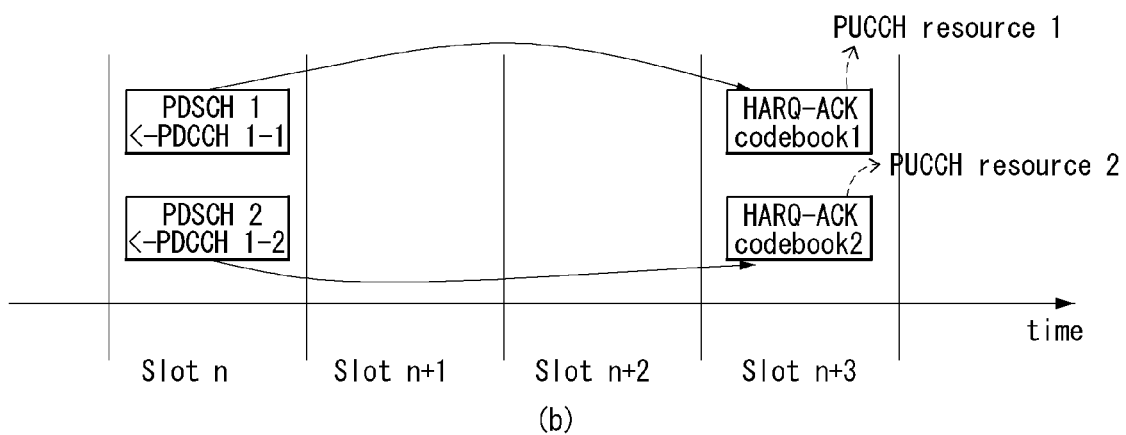
(b)

[Fig. 27]
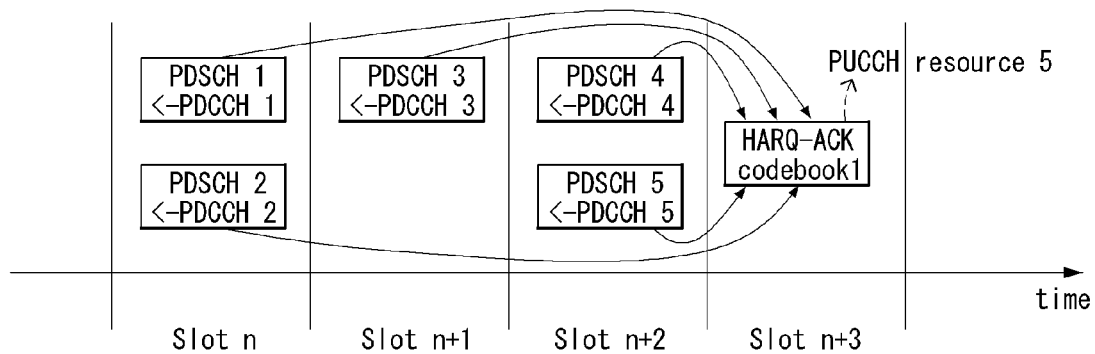
(a)
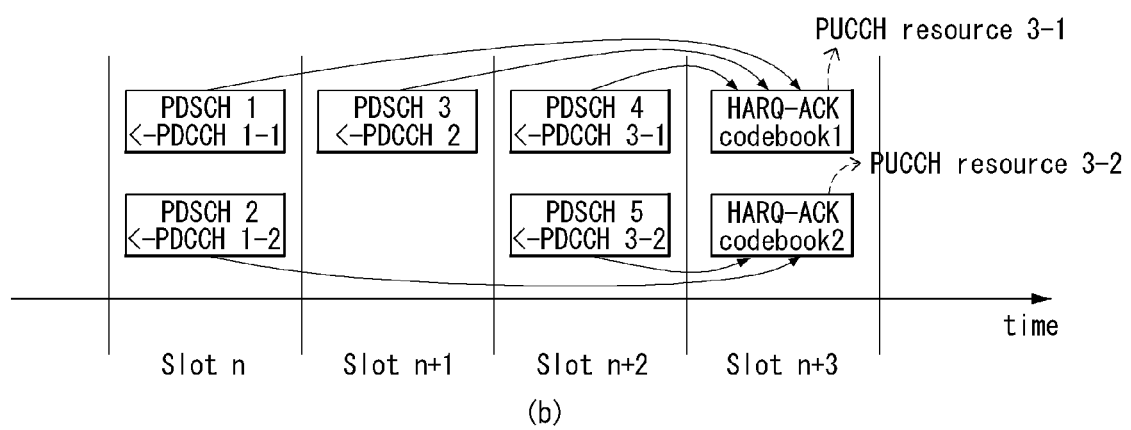
(b)

[Fig. 28]
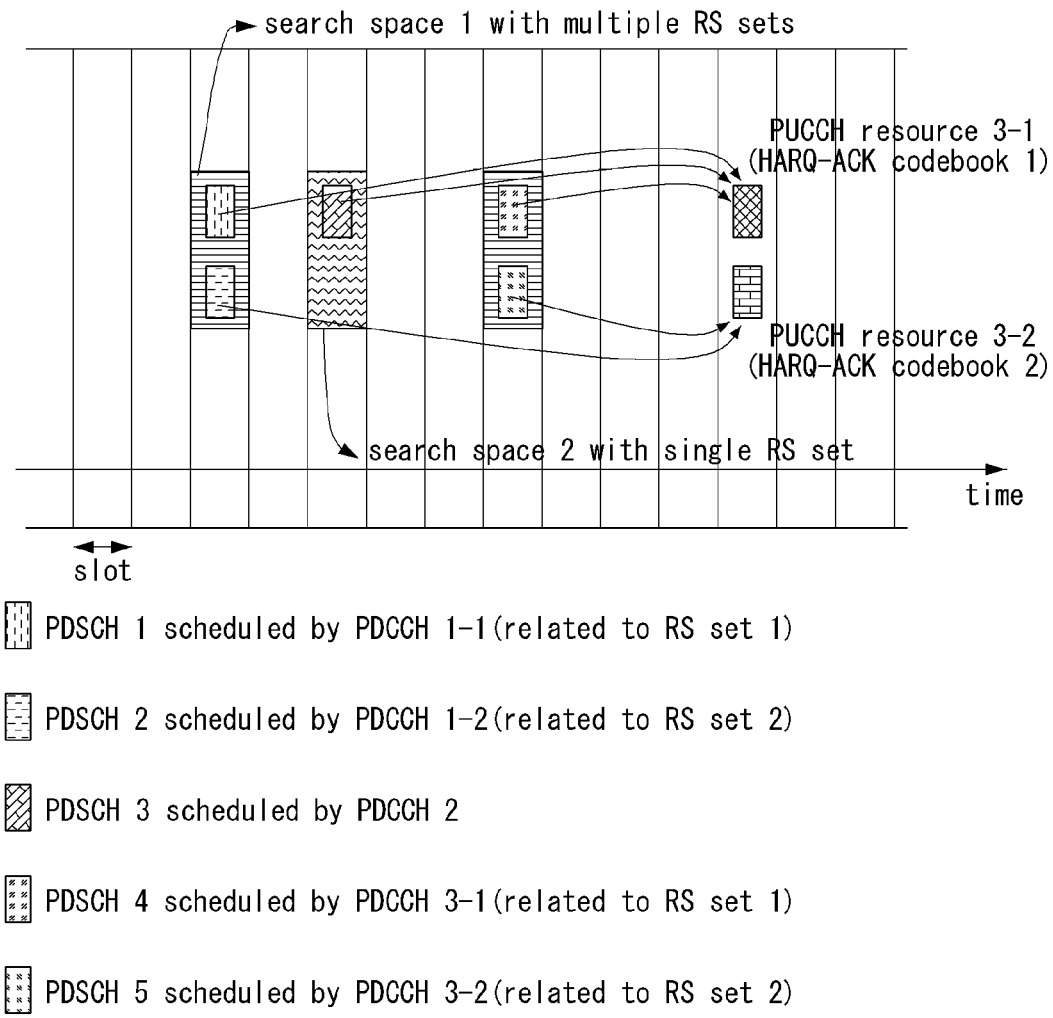

[Fig. 29]
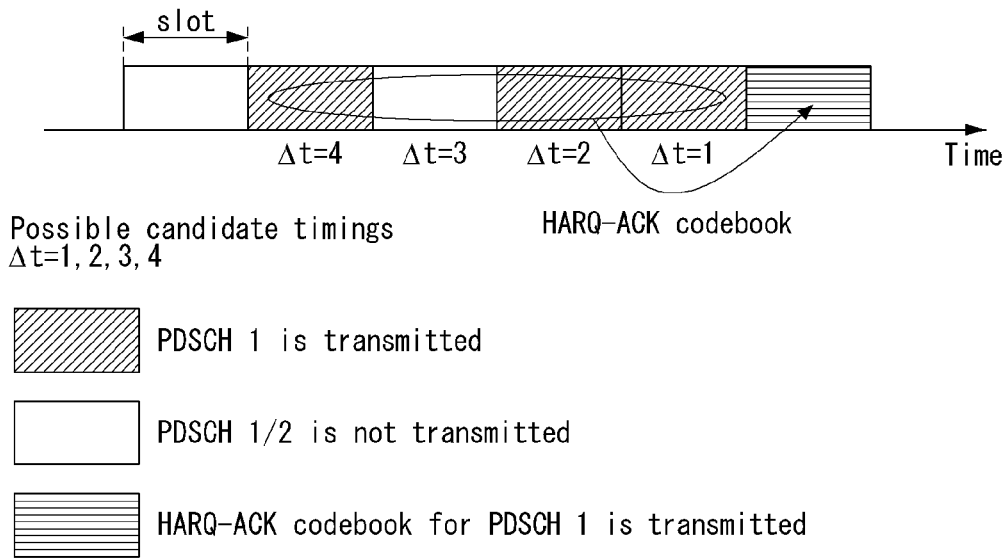
[Fig. 30]
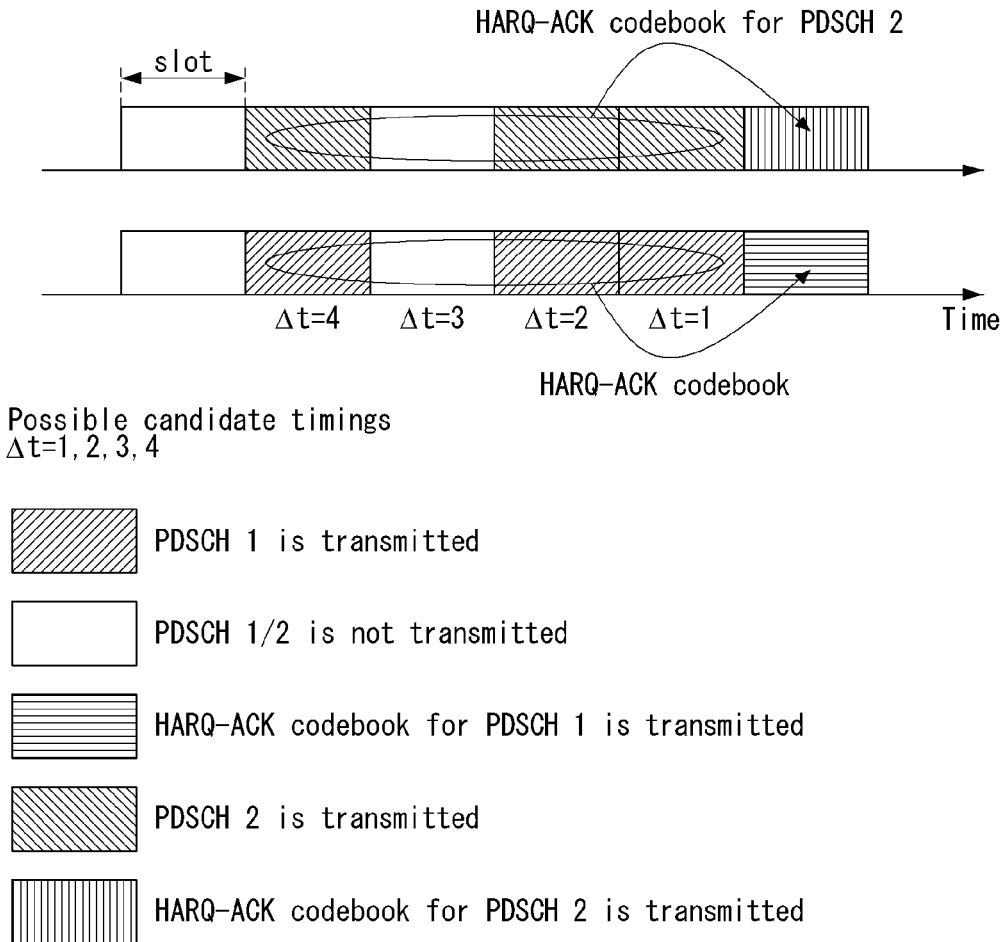

[Fig. 31]
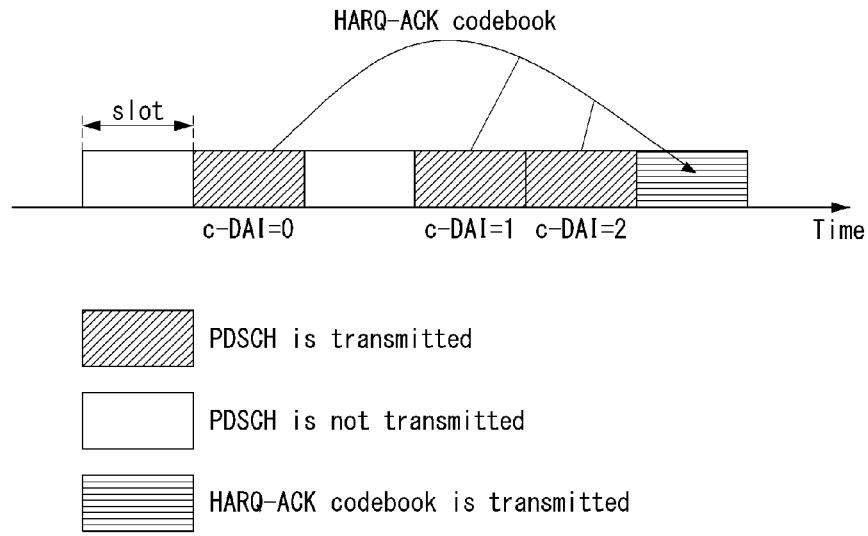
[Fig. 32]
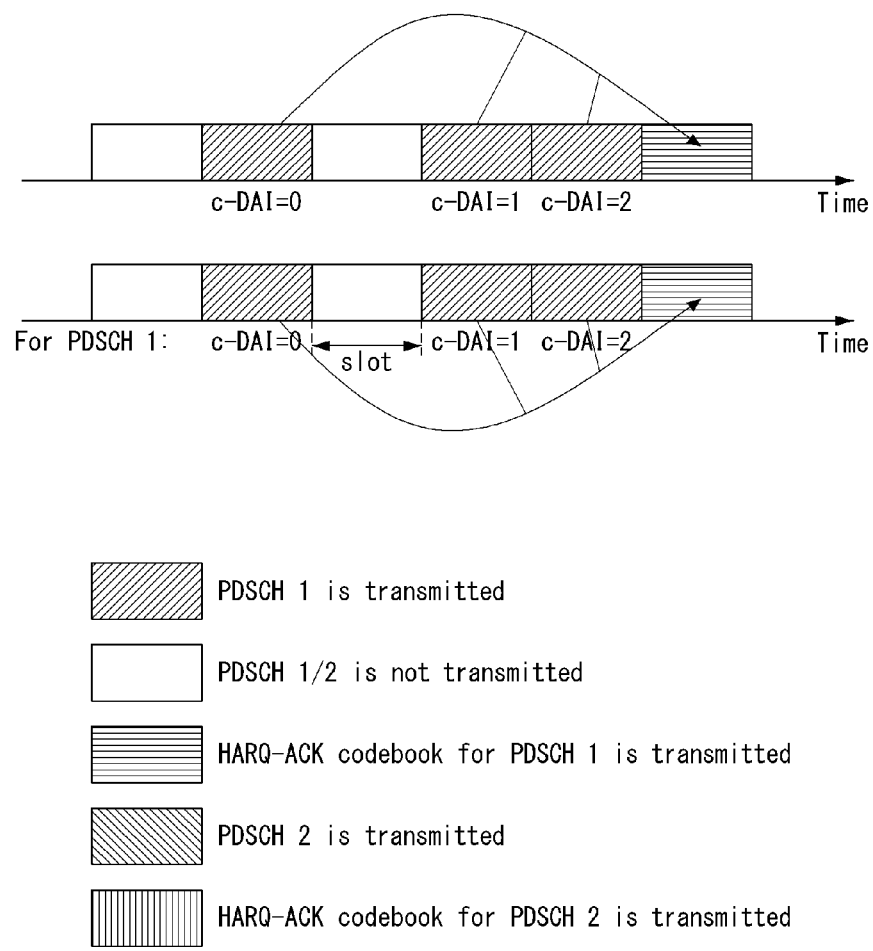

[Fig. 33]
| R | Serving Cell ID | | | | | BWP ID | | Oct 1 |
|---|---|---|---|---|---|---|---|---|
| R | PUCCH Resource ID | | | | | | | Oct 2 |
| $S_7$ | $S_6$ | $S_5$ | $S_4$ | $S_3$ | $S_2$ | $S_1$ | $S_0$ | Oct 3 |
[Fig. 34]
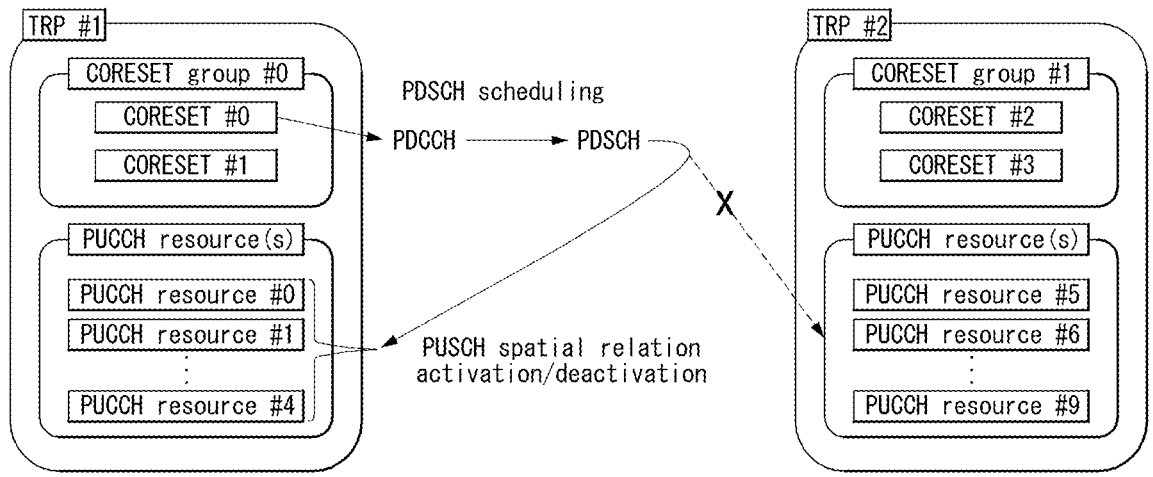
[Fig. 35]
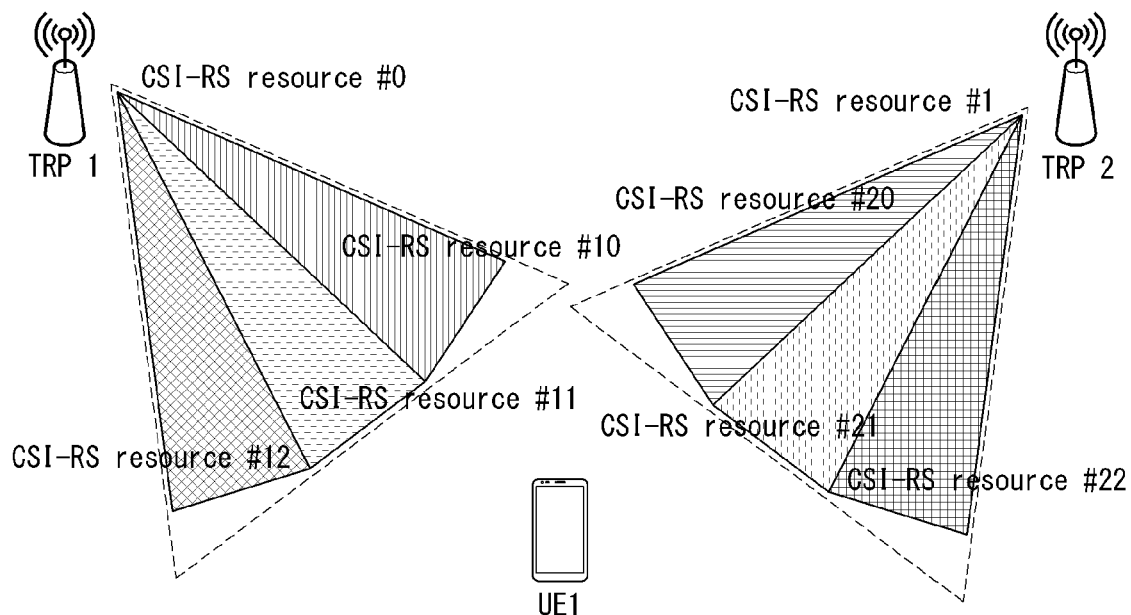

[Fig. 36]
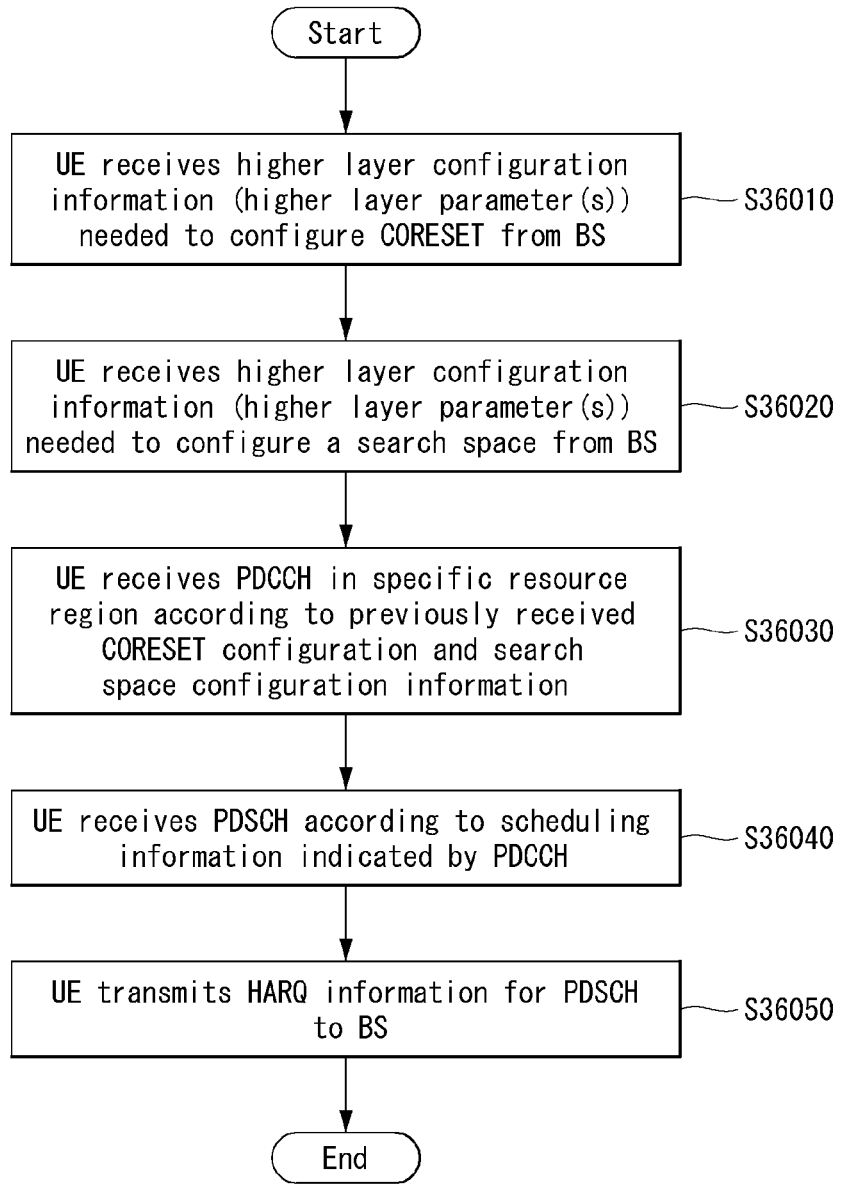

[Fig. 37]
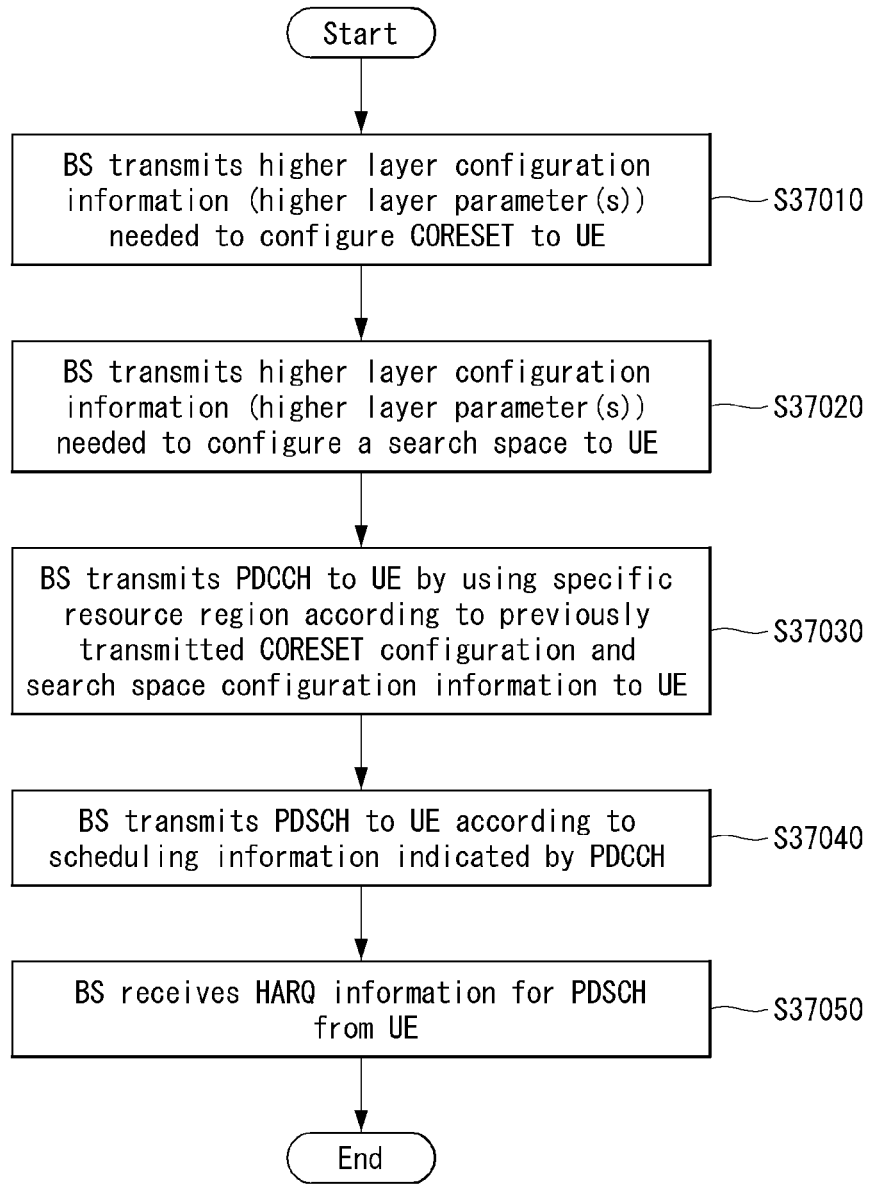

[Fig. 38]
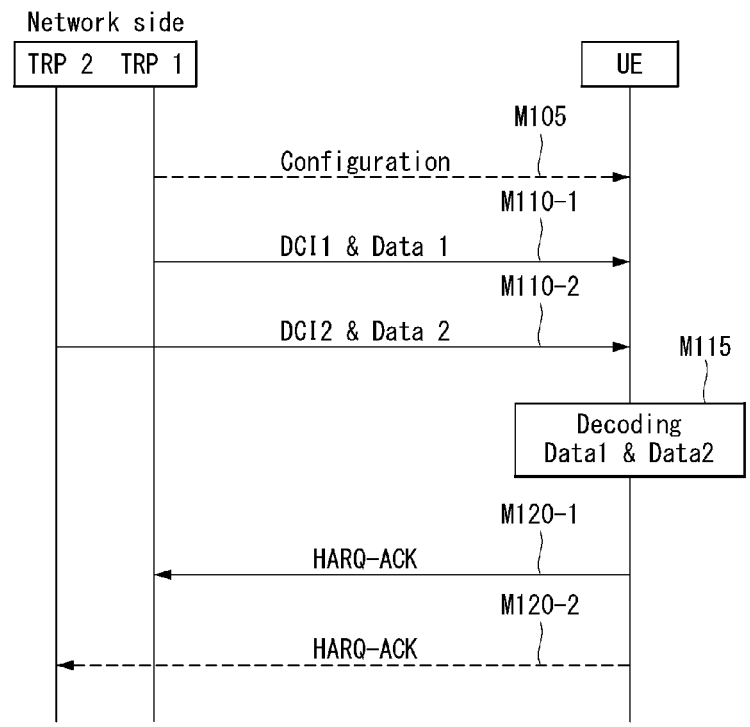
[Fig. 39]
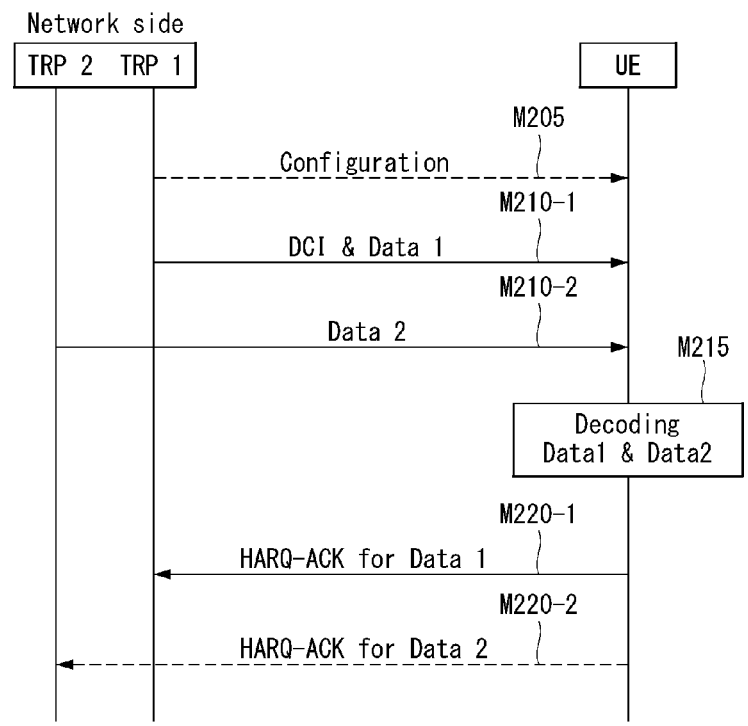

[Fig. 40]
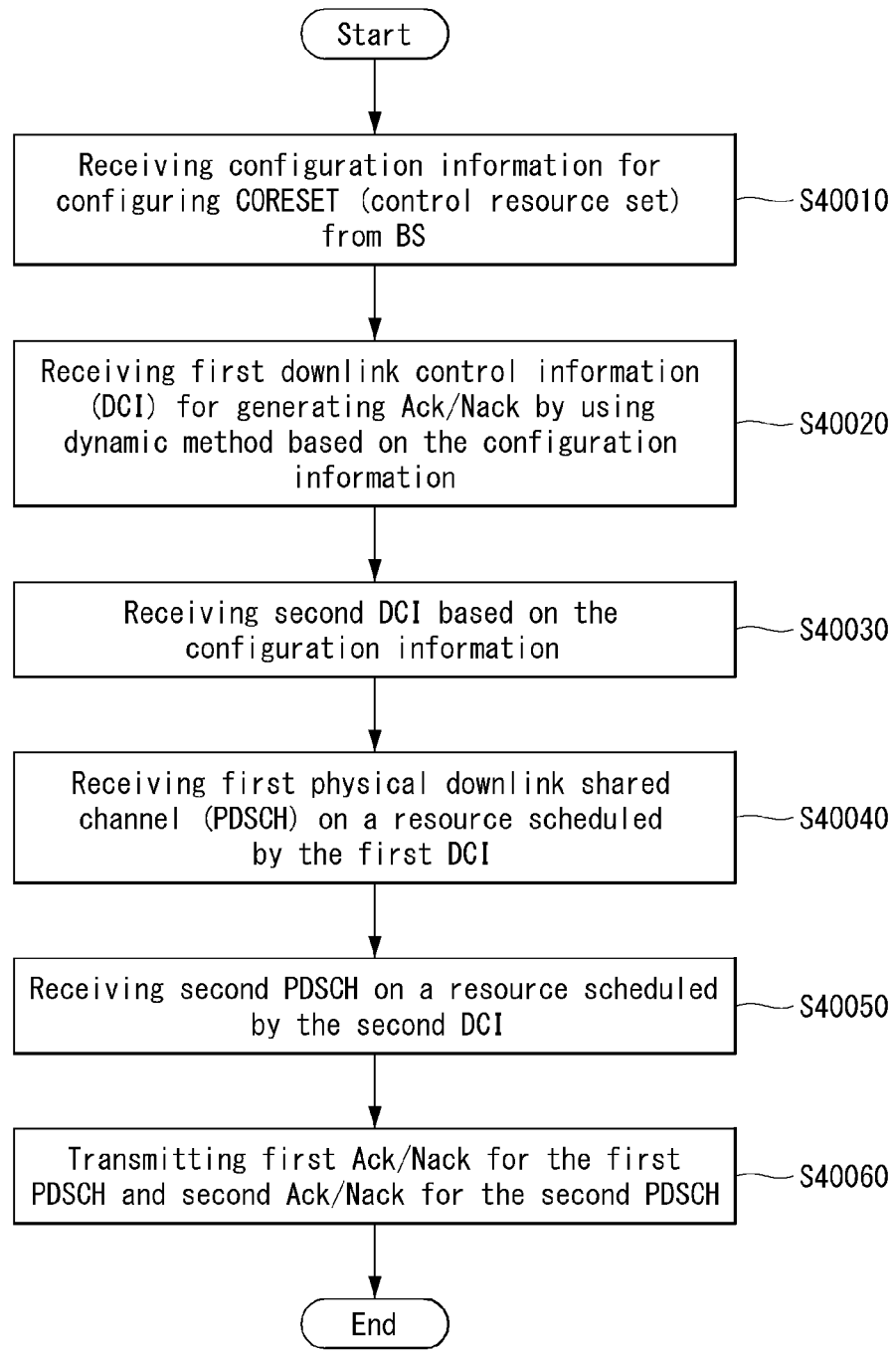

[Fig. 41]
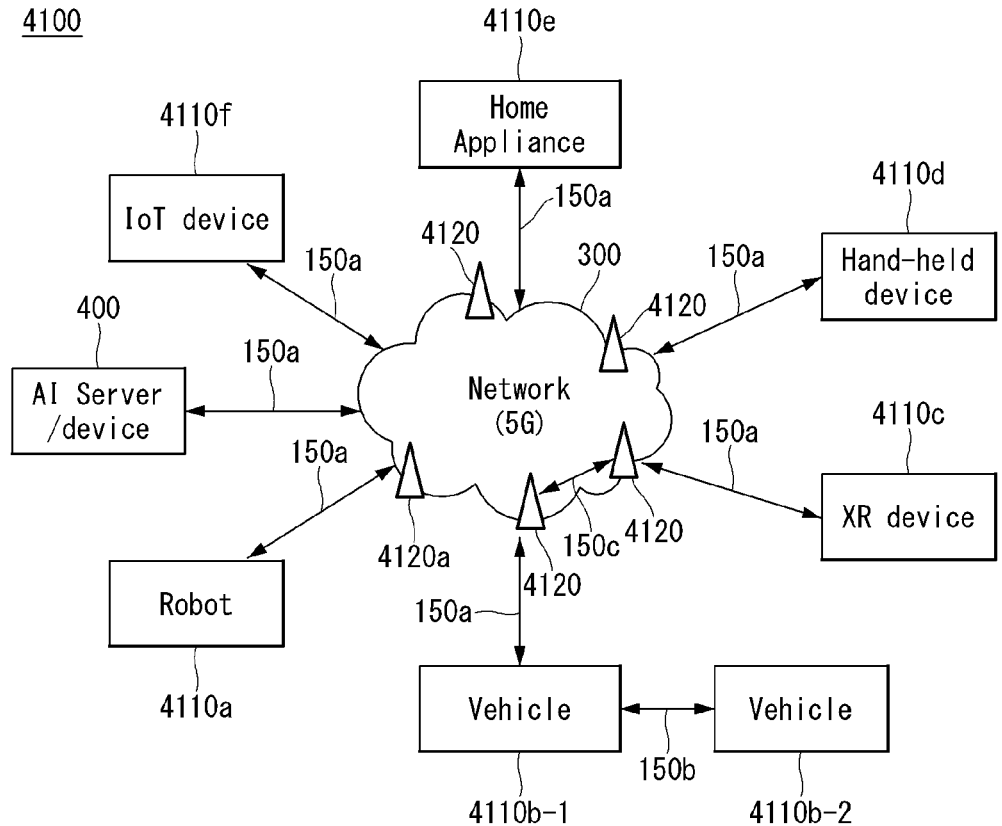
[Fig. 42]
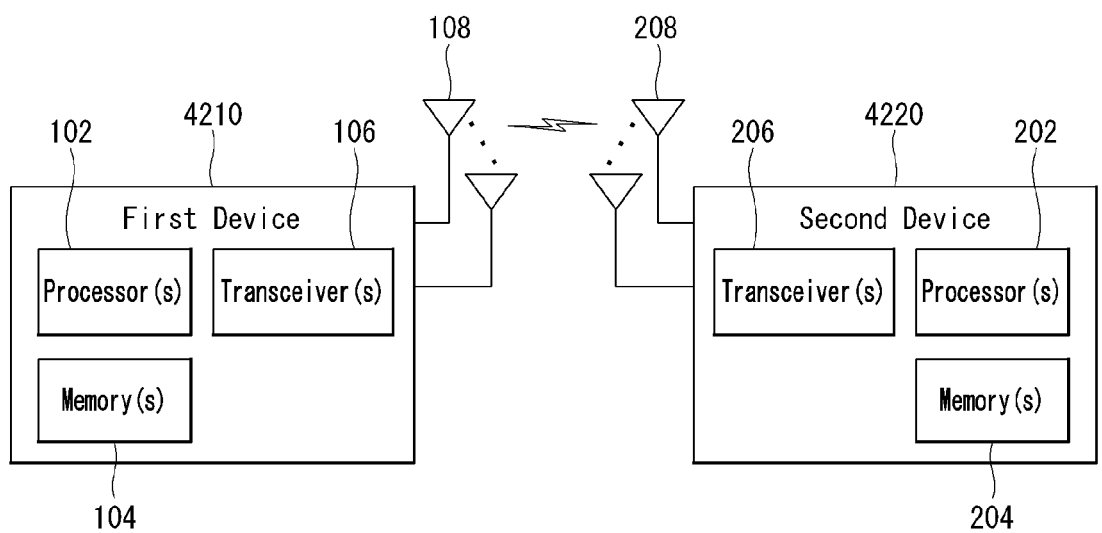

[Fig. 43]
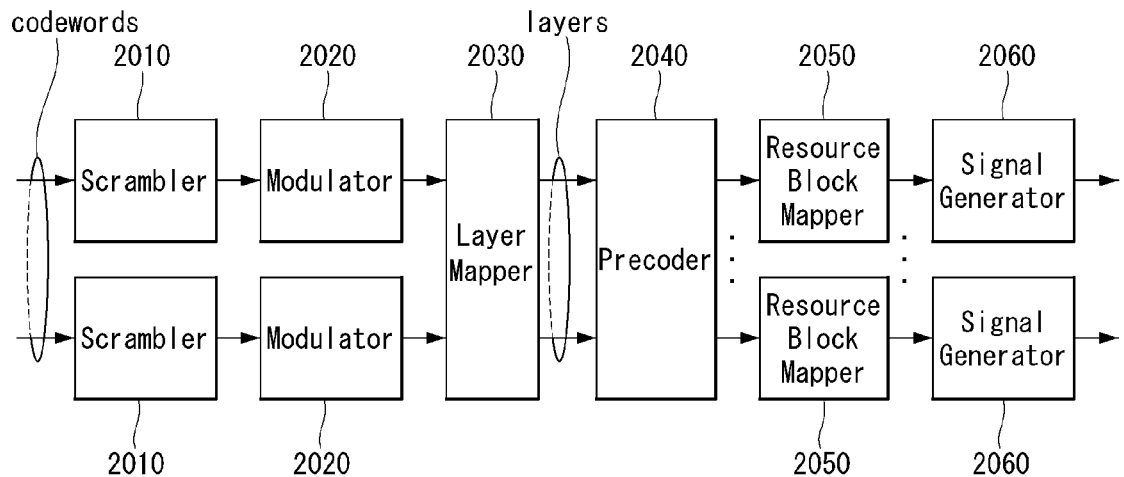
[Fig. 44]
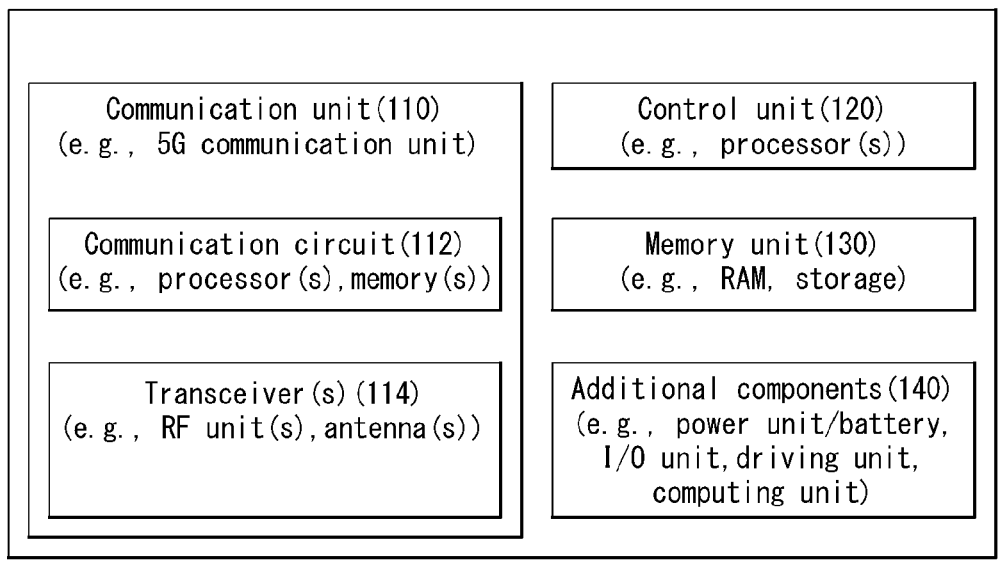

[Fig. 45]
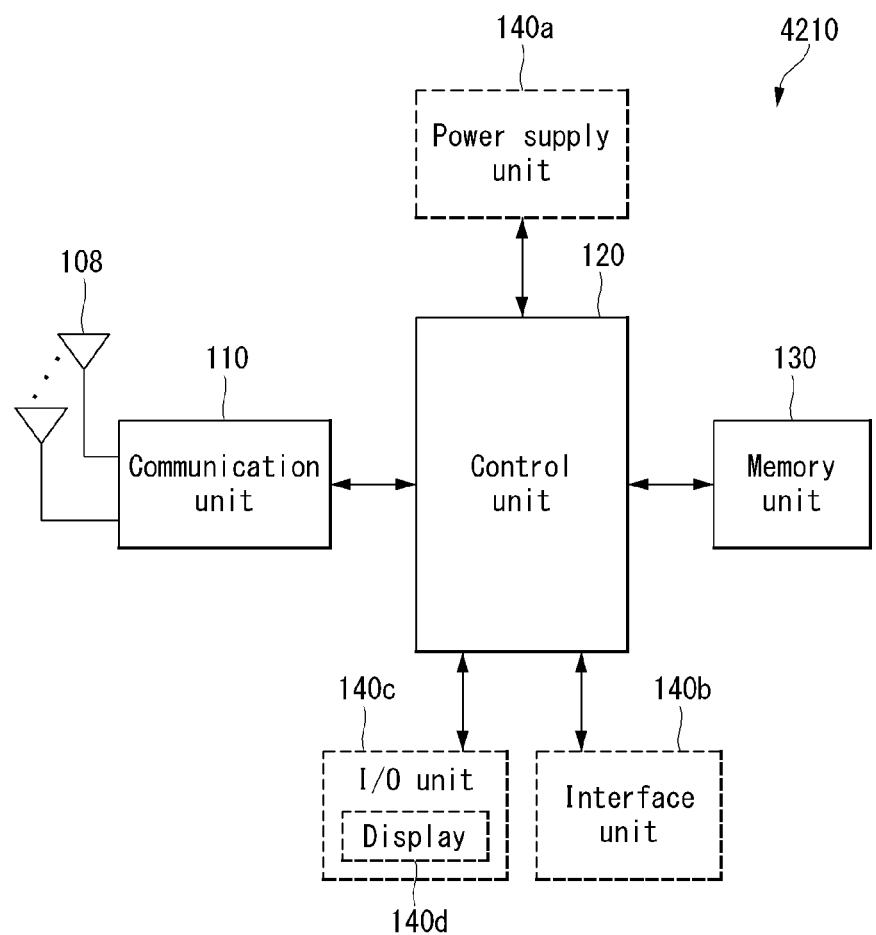

METHOD FOR TRANSMITTING/RECEIVING DATA IN WIRELESS COMMUNICATION SYSTEM, AND DEVICE THEREFOR

TECHNICAL FIELD

The present disclosure relates to a method for transmitting and receiving data in a wireless communication system, and more particularly, to a method for transmitting downlink data and transmitting Hybrid Automatic Repeat Request (HARQ) Ack/Nack therefor, and an apparatus for supporting the same.

BACKGROUND ART

Mobile communication systems have been developed to provide a voice service while ensuring the activity of a user. However, in the mobile communication system, not only a voice, but also a data service is extended. At present, there is a shortage of resources due to an explosive increase in traffic, and users demand a higher speed service. As a result, a more advanced mobile communication system is required.

Requirements for a next-generation mobile communication system should be able to support the acceptance of explosive data traffic, a dramatic increase in the per-user data rate, the acceptance of a significant increase in the number of connected devices, very low end-to-end latency, and high-energy efficiency. To this end, various technologies are researched, which include dual connectivity, massive multiple input multiple output (MIMO), in-band full duplex, non-orthogonal multiple access (NOMA), super wideband support, device networking, and the like.

DISCLOSURE

Technical Problem

The present disclosure proposes a method for receiving data and Ack/Nack therefor in a wireless communication system.

Furthermore, the present disclosure proposes a method for transmitting, when downlink data is transmitted through different resources, AcK/Nack therefore, respectively.

Further, the present disclosure proposes a method for generating and transmitting Ack/Nack for downlink data using a dynamic method.

Further, the present disclosure proposes a method for transmitting Ack/Nack for downlink data scheduled by downlink control information transmitted through different configurations, through different resources in one slot.

Technical objects to be achieved in the present disclosure are not limited to the aforementioned technical objects, and other technical objects not described above may be evidently understood by a person having ordinary skill in the art to which the present disclosure pertains from the following description.

Technical Solution

According to the present disclosure, a method of transmitting and receiving data by a base station in a wireless communication system includes: receiving, from a base station, configuration information for configuring a control resource set (CORESET); receiving first downlink control information (DCI) for generating Ack/Nack using a dynamic method based on the configuration information; receiving second DCI based on the configuration information; receiving first Physical Downlink Shared channel (PDSCH) on a resource scheduled by the first DCI; receiving second PDSCH on a resource scheduled by the second DCI; and transmitting first Ack/Nack for the first PDSCH and Ack/Nack for the second PDSCH, in which the first DCI and the second DCI include a downlink assignment indicator (DAI) for separately generating the first Ack/Nack and the second Ack/Nack, respectively, and the first Ack/Nack and the second Ack/Nack are transmitted through different resources in a same slot.

Further, in the present disclosure, the configuration information includes type information indicating that a generating method of the Ack/Nack is dynamically generated.

Further, in the present disclosure, each of the first Ack/Nack or the second Ack/Nack is determined as Ack or Nack based on the DAI value.

Further, in the present disclosure, the configuration information includes an index value for configuring a plurality of CORESETs into a first group and a second group.

Further, in the present disclosure, the first DCI is received based on the first group and the second DCI is received based on the second group.

Further, in the present disclosure, the first Ack/Nack is generated based on an index value configured to the first group, and the second Ack/Nack is generated based on an index value configured to the second group.

Further, in the present disclosure, each of the plurality of CORESETs is configured with a plurality of Transmission configuration indication (TCI) states.

Further, in the present disclosure, the method further includes receiving setting information for configuring a search space for searching the first DCI and the second DCI, in which the first DCI and the second DCI are received on the search space.

Further, in the present disclosure, the first Ack/Nack is transmitted through a resource scheduled by the first DCI, and the second Ack/Nack is transmitted through a resource scheduled by the second DCI.

Further, the present disclosure provides a user equipment (UE) transmitting and receiving a data in a wireless communication system, which includes: a transceiver; at least one processor controlling the transceiver; and at least one memory functionally connected to the at least one processor, in which the at least one processor configured to: receive, from a base station, configuration information for configuring a control resource set (CORESET); receive first downlink control information (DCI) based on the configuration information; receive second DCI based on the configuration information; receive first Physical Downlink Shared channel (PDSCH) on a resource scheduled by the first DCI; receive second PDSCH on a resource scheduled by the second DCI; and transmit first Ack/Nack for the first PDSCH and second Ack/Nack for the second PDSCH, and the first Ack/Nack and the second Ack/Nack are transmitted through different resources in a same slot.

Advantageous Effects

In the present disclosure, there is an effect that when downlink data is received through different resources, Ack/Nack for respective downlink data can be separately generated and transmitted.

Further, in the present disclosure, there is an effect that the AcK/Nack for the downlink data is separately generated to clearly transmit downlink Ack/Nack.

Further, in the present disclosure, there is an effect that the Ack/Nack for the downlink data transmitted on different resources is separately generated and transmitted to reduce a delay which occurs as the Ack/Nack is transmitted between base stations (or transmission point, transmission and reception point (TRP), etc.).

Effects which may be obtained from the disclosure are not limited by the above effects, and other effects that have not been mentioned may be clearly understood from the following description by those skilled in the art to which the disclosure pertains.

DESCRIPTION OF DRAWINGS

The accompany drawings, which are included to provide a further understanding of the present disclosure and are incorporated on and constitute a part of this disclosure illustrate embodiments of the present disclosure and together with the description serve to explain the principles of the present disclosure.

FIG. 1 is a diagram illustrating an example of an overall system structure of NR to which a method proposed in the present disclosure may be applied.

FIG. 2 illustrates a relationship between an uplink frame and a downlink frame in a wireless communication system to which a method proposed in the present disclosure may be applied.

FIG. 3 illustrates an example of a frame structure in an NR system.

FIG. 4 illustrates an example of a resource grid supported by a wireless communication system to which a method proposed in the present disclosure may be applied.

FIG. 5 illustrates examples of a resource grid for each antenna port and numerology to which a method proposed in the present disclosure may be applied.

FIG. 6 illustrates physical channels and general signal transmission used in a 3GPP system.

FIG. 7 illustrates an example of beamforming using SSB and CSI-RS.

FIG. 8 illustrates an example of a UL BM procedure using SRS.

FIG. 9 is a flowchart showing an example of a UL BM procedure using the SRS.

FIG. 10 is a flowchart showing an example of a downlink transmitting and receiving procedure.

FIG. 11 is a flowchart showing an example of an uplink transmitting and receiving procedure.

FIG. 12 illustrates an SSB architecture.

FIG. 13 illustrates SSB transmission.

FIG. 14 illustrates that a UE acquires information on DL time synchronization.

FIG. 15 illustrates a system information (SI) acquisition process.

FIG. 16 illustrates an example of a random access procedure.

FIG. 17 illustrates a concept of a threshold for an SS block for RACH resource association.

FIG. 18 illustrates an example of transmission through multiple Physical Downlink Control Channels (PDCCHs) according to an embodiment of the present disclosure.

FIG. 19 illustrates an example in which different control resource sets (CORESETs) are configured for different beams according to an embodiment of the present disclosure.

FIG. 20 illustrates an example of configuring CORESET in different transmit and reception points (TRPs) according to an embodiment of the present disclosure.

FIG. 21 illustrates an example of a method for configuring, by a base station, a plurality of resource sets to a UE through a configuration of a search space according to an embodiment of the present disclosure.

FIG. 22 illustrates an example of a method for configuring a precoder for Resource Element Groups (REGs) in a Resource Block (RB) according to an embodiment of the present disclosure.

FIG. 23 illustrates an example of REG, REG bundle, and CCE according to an embodiment of the present disclosure.

FIG. 24 illustrates another example of REG, REG bundle, and CCE according to an embodiment of the present disclosure.

FIG. 25 illustrates an example of a method for transmitting Ack/Nack for Physical Downlink Shared Channel (PDSCH) scheduled through different TRPs according to an embodiment of the present disclosure.

FIG. 26 illustrates an example of a resource for transmitting HARQ Ack/Nack according to an embodiment of the present disclosure.

FIG. 27 illustrates another example of a resource for transmitting HARQ Ack/Nack according to an embodiment of the present disclosure.

FIG. 28 illustrates an example of a method for configuring a resource for transmitting HARQ Ack/Nack through a configuration of a search space according to an embodiment of the present disclosure.

FIG. 29 illustrates an example of a method for transmitting HARQ Ack/Nack according to an embodiment of the present disclosure.

FIGS. 30 to 32 illustrate another example of a method for configuring a resource for transmitting HARQ Ack/Nack according to an embodiment of the present disclosure.

FIG. 33 illustrates an example of PUSCH spatial relationship activation/deactivation MAC CE.

FIG. 34 illustrates an example of a method for changing a transmission beam for transmission of HARQ Ack/Nack according to an embodiment of the present disclosure.

FIG. 35 illustrates an example of a method for limiting the number of beams transmitted in different TRPs according to an embodiment of the present disclosure.

FIG. 36 is a flowchart showing an example of a method for transmitting, by a UE, HARQ Ack/Nack through different resources according to an embodiment of the present disclosure.

FIG. 37 is a flowchart showing an example of a method for receiving, by a base station, HARQ Ack/Nack through different resources according to an embodiment of the present disclosure.

FIGS. 38 and 39 are flowcharts showing an example of signaling between a network and a UE in a multi-TRP situation according to an embodiment of the present disclosure.

FIG. 40 is a flowchart showing an example of a method for transmitting, by a UE, HARQ Ack/Nack on different resources according to an embodiment of the present disclosure.

FIG. 41 illustrates a communication system 3500 to which the present disclosure is applied.

FIG. 42 illustrates a wireless device to which the present disclosure may be applied.

FIG. 43 illustrates a signal processing circuit for a transmit signal.

FIG. 44 illustrates another example of a wireless device to which the present disclosure is applied.

FIG. 45 illustrates a hand-held device to which the present disclosure is applied.

MODE FOR DISCLOSURE

Reference will now be made in detail to embodiments of the disclosure, examples of which are illustrated in the accompanying drawings. A detailed description to be disclosed below together with the accompanying drawing is to describe exemplary embodiments of the present disclosure and not to describe a unique embodiment for carrying out the present disclosure. The detailed description below includes details to provide a complete understanding of the present disclosure. However, those skilled in the art know that the present disclosure may be carried out without the details.

In some cases, in order to prevent a concept of the present disclosure from being ambiguous, known structures and devices may be omitted or illustrated in a block diagram format based on core functions of each structure and device.

Hereinafter, downlink (DL) means communication from the base station to the terminal and uplink (UL) means communication from the terminal to the base station. In downlink, a transmitter may be part of the base station, and a receiver may be part of the terminal. In uplink, the transmitter may be part of the terminal and the receiver may be part of the base station. The base station may be expressed as a first communication device and the terminal may be expressed as a second communication device. A base station (BS) may be replaced with terms including a fixed station, a Node B, an evolved-NodeB (eNB), a Next Generation NodeB (gNB), a base transceiver system (BTS), an access point (AP), a network (5G network), an AI system, a road side unit (RSU), a vehicle, a robot, an Unmanned Aerial Vehicle (UAV), an Augmented Reality (AR) device, a Virtual Reality (VR) device, and the like. Further, the terminal may be fixed or mobile and may be replaced with terms including a User Equipment (UE), a Mobile Station (MS), a user terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, and a Device-to-Device (D2D) device, the vehicle, the robot, an AI module, the Unmanned Aerial Vehicle (UAV), the Augmented Reality (AR) device, the Virtual Reality (VR) device, and the like.

The following technology may be used in various radio access system including CDMA, FDMA, TDMA, OFDMA, SC-FDMA, and the like. The CDMA may be implemented as radio technology such as Universal Terrestrial Radio Access (UTRA) or CDMA2000. The TDMA may be implemented as radio technology such as a global system for mobile communications (GSM)/general packet radio service (GPRS)/enhanced data rates for GSM evolution (EDGE). The OFDMA may be implemented as radio technology such as Institute of Electrical and Electronics Engineers (IEEE) 802.11 (Wi-Fi), IEEE 802.16 (WiMAX), IEEE 802.20, Evolved UTRA (E-UTRA), or the like. The UTRA is a part of Universal Mobile Telecommunications System (UMTS). 3rd Generation Partnership Project (3GPP) Long Term Evolution (LTE) is a part of Evolved UMTS (E-UMTS) using the E-UTRA and LTE-Advanced (A)/LTE-A pro is an evolved version of the 3GPP LTE. 3GPP NR (New Radio or New Radio Access Technology) is an evolved version of the 3GPP LTE/LTE-A/LTE-A pro.

For clarity of description, the technical spirit of the present disclosure is described based on the 3GPP communication system (e.g., LTE-A or NR), but the technical spirit of the present disclosure are not limited thereto. LTE means technology after 3GPP TS 36.xxx Release 8. In detail, LTE technology after 3GPP TS 36.xxx Release 10 is referred to as the LTE-A and LTE technology after 3GPP TS 36.xxx Release 13 is referred to as the LTE-A pro. The 3GPP NR means technology after TS 38.xxx Release 15. The LTE/NR may be referred to as a 3GPP system. "xxx" means a detailed standard document number. The LTE/NR may be collectively referred to as the 3GPP system. Matters disclosed in a standard document opened before the present disclosure may be referred to fora background art, terms, omissions, etc., used for describing the present disclosure. For example, the following documents may be referred to.

3GPP LTE
  36.211: Physical channels and modulation
  36.212: Multiplexing and channel coding
  36.213: Physical layer procedures
  36.300: Overall description
  36.331: Radio Resource Control (RRC)
3GPP NR
  38.211: Physical channels and modulation
  38.212: Multiplexing and channel coding
  38.213: Physical layer procedures for control
  38.214: Physical layer procedures for data
  38.300: NR and NG-RAN Overall Description
  36.331: Radio Resource Control (RRC) protocol specification As more and more communication devices require larger communication capacity, there is a need for improved mobile broadband communication compared to the existing radio access technology (RAT). Further, massive machine type communications (MTCs), which provide various services anytime and anywhere by connecting many devices and objects, are one of the major issues to be considered in the next generation communication. In addition, a communication system design considering a service/UE sensitive to reliability and latency is being discussed. The introduction of next generation radio access technology considering enhanced mobile broadband communication (eMBB), massive MTC (mMTC), ultra-reliable and low latency communication (URLLC) is discussed, and in the present disclosure, the technology is called new RAT for convenience. The NR is an expression representing an example of 5G radio access technology (RAT).

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link having ultra reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver may drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system may support remote treatment providing clinical treatment at a distant place. This helps to reduce a barrier for the distance and may improve access to medical services which are not continuously used at remote farming areas. Furthermore, this is used to save life in important treatment and an emergency condition. A radio sensor network based on mobile communication may provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

In a new RAT system including NR uses an OFDM transmission scheme or a similar transmission scheme thereto. The new RAT system may follow OFDM parameters different from OFDM parameters of LTE. Alternatively, the new RAT system may follow numerology of conventional LTE/LTE-A as it is or have a larger system bandwidth (e.g., 100 MHz). Alternatively, one cell may support a plurality of numerologies. In other words, UEs that operate with different numerologies may coexist in one cell.

The numerology corresponds to one subcarrier spacing in a frequency domain. Different numerologies may be defined by scaling reference subcarrier spacing to an integer N.

DEFINITION OF TERMS eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network created by the operator customized to provide an optimized solution for a specific market scenario which demands specific requirements with end-to-end scope.

Network function: A network function is a logical node within a network infrastructure that has well-defined external interfaces and well-defined functional behavior.

NG-C: A control plane interface used on NG2 reference points between new RAN and NGC.

NG-U: A user plane interface used on NG3 references points between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: A termination point of NG-U interface.

Overview of System

FIG. 1 illustrates an example of an overall structure of a NR system to which a method proposed in the present disclosure is applicable.

Referring to FIG. 1, an NG-RAN consists of gNBs that provide an NG-RA user plane (new AS sublayer/PDCP/RLC/MAC/PHY) and control plane (RRC) protocol terminations for a user equipment (UE).

The gNBs are interconnected with each other by means of an Xn interface.

The gNBs are also connected to an NGC by means of an NG interface.

More specifically, the gNBs are connected to an access and mobility management function (AMF) by means of an N2 interface and to a user plane function (UPF) by means of an N3 interface.

NR(New Rat) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an orthogonal frequency division multiplexing (OFDM) numerology and a frame structure, which may be considered in the NR system, will be described.

A plurality of OFDM numerologies supported in the NR system may be defined as in Table 1.

TABLE 1

| μ | $\Delta f = 2^{\mu} \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

The NR supports multiple numerologies (or subcarrier spacing (SCS)) for supporting various 5G services. For example, when the SCS is 15 kHz, a wide area in traditional cellular bands is supported and when the SCS is 30 kHz/60 kHz, dense-urban, lower latency, and wider carrier bandwidth are supported, and when the SCS is more than 60 kHz, a bandwidth larger than 24.25 GHz is supported in order to overcome phase noise.

An NR frequency band is defined as frequency ranges of two types (FR1 and FR2). FR1 and FR2 may be configured as shown in Table 2 below. Further, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in the NR system, a size of various fields in the time domain is expressed as a multiple of a time unit of $T_s=1/(\Delta f_{max} \cdot N_f)$. In this case, $\Delta f_{max}=480 \cdot 10^3$, and $N_f=4096$. DL and UL transmission is configured as a radio frame having a section of $T_f=(\Delta f_{max} N_f/100) \cdot T_s=10$ ms. The radio frame is composed of ten subframes each having a section of $T_{sf}=(\Delta f_{max} N_f/1000) \cdot T_s=1$ ms. In this case, there may be a set of UL frames and a set of DL frames.

FIG. 2 illustrates a relation between an uplink frame and a downlink frame in a wireless communication system to which a method proposed in the present disclosure is applicable.

As illustrated in FIG. 2, uplink frame number i for transmission from a user equipment (UE) shall start $T_{TA}=N_{TA}T_s$ before the start of a corresponding downlink frame at the corresponding UE.

Regarding the numerology μ, slots are numbered in increasing order of $n_s^{\mu} \in \{0, \ldots, N_{subframe}^{slots,\mu}-1\}$ within a subframe and are numbered in increasing order of $n_{s,f}^{\mu} \in \{0, \ldots, N_{frame}^{slots,\mu}-1\}$ within a radio frame. One slot consists of consecutive OFDM symbols of $N_{symb}^{\mu}$, and $N_{symb}^{\mu}$ is determined depending on a numerology used and slot configuration. The start of slots $n_s^{\mu}$ in a subframe is aligned in time with the start of OFDM symbols $n_s^{\mu} N_{symb}^{\mu}$ in the same subframe.

Not all UEs are able to transmit and receive at the same time, and this means that not all OFDM symbols in a downlink slot or an uplink slot are available to be used.

Table 3 represents the number $N_{symb}^{slot}$ of OFDM symbols per slot, the number $N_{slot}^{frame,\mu}$ of slots per radio frame, and the number $N_{slot}^{subframe,\mu}$ of slots per subframe in a normal CP. Table 4 represents the number of OFDM symbols per slot, the number of slots per radio frame, and the number of slots per subframe in an extended CP.

TABLE 3

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 3 illustrates an example of a frame structure in a NR system. FIG. 3 is merely for convenience of explanation and does not limit the scope of the present disclosure.

In Table 4, in case of μ=2, i.e., as an example in which a subcarrier spacing (SCS) is 60 kHz, one subframe (or frame) may include four slots with reference to Table 3, and one subframe={1, 2, 4} slots shown in FIG. 3, for example, the number of slot(s) that may be included in one subframe may be defined as in Table 3.

Further, a mini-slot may consist of 2, 4, or 7 symbols, or may consist of more symbols or less symbols.

In regard to physical resources in the NR system, an antenna port, a resource grid, a resource element, a resource block, a carrier part, etc. May be considered.

Hereinafter, the above physical resources that may be considered in the NR system are described in more detail.

First, in regard to an antenna port, the antenna port is defined so that a channel over which a symbol on an antenna port is conveyed may be inferred from a channel over which another symbol on the same antenna port is conveyed. When large-scale properties of a channel over which a symbol on one antenna port is conveyed may be inferred from a channel over which a symbol on another antenna port is conveyed, the two antenna ports may be regarded as being in a quasi co-located or quasi co-location (QC/QCL) relation. Here, the large-scale properties may include at least one of delay spread, Doppler spread, frequency shift, average received power, and received timing.

FIG. 4 illustrates an example of a resource grid supported in a wireless communication system to which a method proposed in the present disclosure is applicable.

Referring to FIG. 4, a resource grid consists of $N_{RB}^{\mu} N_{sc}^{RB}$ subcarriers on a frequency domain, each subframe consisting of $14 \cdot 2^{\mu}$ OFDM symbols, but the present disclosure is not limited thereto.

In the NR system, a transmitted signal is described by one or more resource grids, consisting of $N_{RB}^{\mu} N_{sc}^{RB}$ subcarriers, and $2^{\mu} N_{symb}^{(\mu)}$ OFDM symbols, where $N_{RB}^{\mu} \leq N_{RB}^{max,\mu}$. $N_{RB}^{max,\mu}$ denotes a maximum transmission bandwidth and may change not only between numerologies but also between uplink and downlink.

In this case, as illustrated in FIG. 5, one resource grid may be configured per numerology μ and antenna port p.

FIG. 5 illustrates examples of a resource grid per antenna port and numerology to which a method proposed in the present disclosure is applicable.

Each element of the resource grid for the numerology μ and the antenna port p is called a resource element and is uniquely identified by an index pair (k,l̄), where k=0, . . . , $N_{RB}^{\mu} N_{sc}^{RB}-1$ is an index on a frequency domain, and l=0, . . . , $2^{\mu} N_{symb}^{(\mu)}-1$ refers to a location of a symbol in a subframe. The index pair (k,l̄) is used to refer to a resource element in a slot, where l=0, . . . , $N_{symb}^{\mu}-1$.

The resource element (k,l̄) for the numerology μ and the antenna port p corresponds to a complex value $a_{k,l̄}^{(p,\mu)}$ When there is no risk for confusion or when a specific antenna port or numerology is not specified, the indices p and μ may be dropped, and as a result, the complex value may be $a_{k,l̄}^{(p)}$ or $a_{k,l̄}$.

Further, a physical resource block is defined as $N_{sc}^{RB}=12$ consecutive subcarriers in the frequency domain.

Point A serves as a common reference point of a resource block grid and may be obtained as follows:
  offsetToPointA for PCell downlink represents a frequency offset between the point A and a lowest subcarrier of a lowest resource block that overlaps a SS/PBCH block used by the UE for initial cell selection, and is expressed in units of resource blocks assuming 15 kHz subcarrier spacing for FR1 and 60 kHz subcarrier spacing for FR2;
  absoluteFrequencyPointA represents frequency-location of the point A expressed as in absolute radio-frequency channel number (ARFCN);

The common resource blocks are numbered from 0 and upwards in the frequency domain for subcarrier spacing configuration μ.

The center of subcarrier 0 of common resource block 0 for the subcarrier spacing configuration μ coincides with "point A". A common resource block number $n_{CRB}^{\mu}$ in the frequency domain and resource elements (k, l) for the subcarrier spacing configuration μ may be given by the following Equation 1.

$$n_{CRB}^{\mu} = \left\lfloor \frac{k}{N_{sc}^{RB}} \right\rfloor \qquad \text{[Equation 1]}$$

Here, k may be defined relative to the point A so that k=0 corresponds to a subcarrier centered around the point A. Physical resource blocks are defined within a bandwidth part (BWP) and are numbered from 0 to $N_{BWP,i}^{size}-1$, where i is No. Of the BWP. A relation between the physical resource block $n_{PRB}$ in BWP i and the common resource block $n_{CRB}$ may be given by the following Equation 2.

$$n_{CRB} = n_{PRB} + N_{BWP,i}^{start} \qquad \text{[Equation 2]}$$

Here, $N_{BWP,i}^{start}$ may be the common resource block where the BWP starts relative to the common resource block 0.

Physical Channel and General Signal Transmission

FIG. 6 illustrates physical channels and general signal transmission used in a 3GPP system. In a wireless communication system, the UE receives information from the eNB through Downlink (DL) and the UE transmits information from the eNB through Uplink (UL). The information which the eNB and the UE transmit and receive includes data and various control information and there are various physical channels according to a type/use of the information which the eNB and the UE transmit and receive.

When the UE is powered on or newly enters a cell, the UE performs an initial cell search operation such as synchronizing with the eNB (S601). To this end, the UE may receive a Primary Synchronization Signal (PSS) and a (Secondary Synchronization Signal (SSS) from the eNB and synchronize with the eNB and acquire information such as a cell ID or the like. Thereafter, the UE may receive a Physical Broadcast Channel (PBCH) from the eNB and acquire in-cell broadcast information. Meanwhile, the UE receives a Downlink Reference Signal (DL RS) in an initial cell search step to check a downlink channel status.

A UE that completes the initial cell search receives a Physical Downlink Control Channel (PDCCH) and a Physical Downlink Control Channel (PDSCH) according to information loaded on the PDCCH to acquire more specific system information (S602).

Meanwhile, when there is no radio resource first accessing the eNB or for signal transmission, the UE may perform a Random Access Procedure (RACH) to the eNB (S603 to S606). To this end, the UE may transmit a specific sequence to a preamble through a Physical Random Access Channel (PRACH) (S603 and S605) and receive a response message (Random Access Response (RAR) message) for the preamble through the PDCCH and a corresponding PDSCH. In the case of a contention based RACH, a Contention Resolution Procedure may be additionally performed (S606).

The UE that performs the above procedure may then perform PDCCH/PDSCH reception (S607) and Physical Uplink Shared Channel (PUSCH)/Physical Uplink Control Channel (PUCCH) transmission (S608) as a general uplink/downlink signal transmission procedure. In particular, the UE may receive Downlink Control Information (DCI) through the PDCCH. Here, the DCI may include control information such as resource allocation information for the UE and formats may be differently applied according to a use purpose.

Meanwhile, the control information which the UE transmits to the eNB through the uplink or the UE receives from the eNB may include a downlink/uplink ACK/NACK signal, a Channel Quality Indicator (CQI), a Precoding Matrix Index (PMI), a Rank Indicator (RI), and the like. The UE may transmit the control information such as the CQI/PMI/RI, etc., through the PUSCH and/or PUCCH.

Beam Management (BM)

A BM procedure as layer 1 (L1)/layer 2 (L2) procedures for acquiring and maintaining a set of base station (e.g., gNB, TRP, etc.) and/or terminal (e.g., UE) beams which may be used for downlink (DL) and uplink (UL) transmission/reception may include the following procedures and terms.

Beam measurement: Operation of measuring characteristics of a beam forming signal received by the eNB or UE.

Beam determination: Operation of selecting a transmit (Tx) beam/receive (Rx) beam of the eNB or UE by the eNB or UE.

Beam sweeping: Operation of covering a spatial region using the transmit and/or receive beam for a time interval by a predetermined scheme.

Beam report: Operation in which the UE reports information of a beamformed signal based on beam measurement.

The BM procedure may be divided into (1) a DL BM procedure using a synchronization signal (SS)/physical broadcast channel (PBCH) Block or CSI-RS and (2) a UL BM procedure using a sounding reference signal (SRS).

Further, each BM procedure may include Tx beam sweeping for determining the Tx beam and Rx beam sweeping for determining the Rx beam.

DL Beam Management (DL BM) Procedure

The DL BM procedure may include (1) transmission of beamformed DL reference signals (RSs) (e.g., CIS-RS or SS Block (SSB)) of the eNB and (2) beam reporting of the UE.

Here, the beam reporting a preferred DL RS identifier (ID)(s) and L1-Reference Signal Received Power (RSRP).

The DL RS ID may be an SSB Resource Indicator (SSBRI) or a CSI-RS Resource Indicator (CRI).

FIG. 7 illustrates an example of beamforming using SSB and CSI-RS.

As illustrated in FIG. 7, an SSB beam and a CSI-RS beam may be used for the beam management. A measurement metric is an L1-RSRP for each resource/block. The SSB may be sued for coarse beam management and the CSI-RS may be sued for fine beam management. The SSB may be used for both the Tx beam sweeping and the Rx beam sweeping. The Rx beam sweeping using the SSB may be performed while the UE changes the Rx beam for the same SSBRI across multiple SSB bursts. Here, one SS burst includes one or more SSBs and one SS burst set includes one or more SSB bursts.

DL BM Associated Beam Indication

The UE may be RRC-configured with a list for a maximum of M candidate Transmission Configuration Indication (TCI) states at least for a purpose of Quasi Co-location (QCL) indication. Here, the M may be 64.

Each TCI state may be configured as one RS set. One of DL RS types including SSB, P-CSI RS, SP-CSI RS, A-CSI RS, and the like may be at least referred to for an ID of each DL RS for a purpose of spatial QCL (QCL Type D) in the RS set.

Initialization/update of the ID of the DL RS(s) in the RS set used for the purpose of the spatial QCL may be at least performed through explicit signaling.

Table 5 shows an example of TCI-State IE.

The TCI-State IE is associated with a quasi co-location (QCL) type corresponding to one or two DL reference signals (RSs).

TABLE 5

```
-- ASN1START
-- TAG-TCI-STATE-START
TCI-State ::=              SEQUENCE {
    tci-StateId                TCI-StateId,
    qcl-Type1                  QCL-Info,
    qcl-Type2                  QCL-Info
    ...
}
QCL-Info ::=               SEQUENCE {
    cell                       ServCellIndex
    bwp-Id                     BWP-Id
    referenceSignal            CHOICE {
        csi-rs                     NZP-CSI-RS-ResourceId,
        ssb                        SSB-Index
    },
    qcl-Type                   ENUMERATED {typeA, typeB, typeC, typeD},
    ...
}
-- TAG-TCI-STATE-STOP
-- ASN1STOP
```

In Table 5, bwp-Id parameter represents DL BWP in which the RS is located, cell parameter represents a carrier in which the RS is located, and reference signal parameter represents a reference antenna port(s) which becomes a source of quasi co-location for a corresponding target antenna port(s) or a reference signaling including the same. The target antenna port(s) may be CSI-RS, PDCCH DMRS, or PDSCH DMRS. As an example, corresponding TCI state ID may be indicated for NZP CSI-RS resource configuration information in order to indicate QCL reference RS information for NZP CSI-RS. As another example, the TCI state ID may be indicated for each CORESET configuration in order to indicate QCL reference information for a PDCCH DMRS antenna port(s). As yet another example, the TCI state ID may be indicated through DCI in order to indicate QCL reference information for a PDSCH DMRS antenna port(s).

QCL (Quasi-Co Location)

An antenna port is defined so that a channel in which symbols on an antenna port are carried is inferred from a channel in which other symbols on the same antenna port are carried. If the property of a channel in which symbols on one antenna port are carried can be inferred from a channel in which symbols on another antenna port are carried, the two antenna ports may be said to have a quasi co-located or quasi co-location (QC/QCL) relation.

In this case, the channel property includes one or more of delay spread, Doppler spread, a frequency/Doppler shift, average received power, received timing/average delay, and a spatial RX parameter. In this case, the spatial Rx parameter means a spatial (reception) channel property parameter, such as an angle of arrival.

A UE may be configured with a list of up to M TCI-State configurations within a higher layer parameter PDSCH-Config in order to decode a PDSCH based on a detected PDCCH having DCI intended for the corresponding UE and a given serving cell. The M depends on the UE capability.

Each of the TCI-States includes a parameter for setting a quasi co-location relation between one or two DL reference signals and the DM-RS port of a PDSCH.

The quasi co-location relation is configured with a higher layer parameter qcl-Type1 for the first DL RS and qcl-Type2 (if configured) for the second DL RS. In the case of the two DL RSs, QCL types are the same regardless of whether a reference is the same DL RS or different DL RS or not.

A quasi co-location type corresponding to each DL RS is given by the higher layer parameter qcl-Type of QCL-Info, and may adopt one of the following values:

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

For example, if a target antenna port is a specific NZP CSI-RS, it may be indicated/configured that corresponding NZP CSI-RS antenna ports have been QCLed with a specific TRS from a QCL-Type A viewpoint and OCLed with a specific SSB from a QCL-Type D viewpoint. A UE that has received such an indication/configuration may receive a corresponding NZP CSI-RS using a Doppler, delay value measured in a QCL-Type A TRS, and may apply, to corresponding NZP CSI-RS reception, an Rx beam used for QCL-Type D SSB reception.

A UE may receive an activation command based on MAC CE signaling used to map up to 8 TCI states to the code point of a DCI field "Transmission Configuration Indication."

UL BM Procedure

In the case of UL BM, beam reciprocity (or beam correspondence) between the Tx beam and the Rx beam may be established or not established according to UE implementation. If the reciprocity between the Tx beam and the Tx beam is established in both the eNB and the UE, a UL beam pair may be matched through a DL beam pair. However, when the reciprocity between the Tx beam and the Rx beam is not established even in any one of the eNB and the UE, a UL beam pair determination process is required apart form DL beam pair determination.

Further, even when the eNB and the UE maintain beam correspondence, the eNB may use a UL BM procedure in order to determine a DL Tx beam without requesting report of a preferred beam by the UE.

The UL BM may be performed through beamformed UL SRS transmission and whether to apply UL BM of the SRS resource set is configured by a (higher layer parameter) usage. When the usage is configured as 'BeamManagement (BM)', only one SRS resource may be transmitted to each of a plurality of SRS resource sets at a given time instant.

The UE may be configured with one or more Sounding Reference Symbol (SRS) resource sets configured by (higher layer parameter) SRS-ResourceSet (through higher layer signaling, RRC signaling, etc.). For each SRS resource set, the UE may be configured with K 1) SRS resources (higher later parameter SRS-resources). Here, K is a natural number and a maximum value of K is indicated by SRS_capability.

Similarly to the DL BM, a UL BM procedure may also be divided into Tx beam sweeping of the UE and Rx beam sweeping of the eNB.

FIG. 8 illustrates an example of an uplink beam management procedure using a Sounding Reference Signal (SRS).

FIG. 8(a) illustrates an Rx beam determination procedure of the eNB and FIG. 8(b) illustrates a Tx beam sweeping procedure of the UE.

FIG. 9 is a flowchart showing an example of an uplink beam management procedure using the SRS.

The UE receives, from the eNB, RRC signaling (e.g., SRS-Config IE) including a (higher layer parameter) usage parameter configured as 'beam management' (S910).

Table 6 shows an example of SRS-Config Information Element (IE) and SRS-Config IE is used for an SRS transmission configuration. SRS-Config IE includes a list of SRS-Resources and a list of SRS-ResourceSets. Each SRS resource set means a set of SRS-resources.

The network may trigger transmission of the SRS resource set by using configured aperiodicSRS-Resource-Trigger (L1 DCI).

TABLE 6

```
-- ASN1START
-- TAG-MAC-CELL-GROUP-CONFIG-START
SRS-Config ::=                          SEQUENCE {
    srs-ResourceSetToReleaseList            SEQUENCE (SIZE(1..maxNrofSRS-
ResourceSets)) OF SRS-ResourceSetId             OPTIONAL, -- Need N
    srs-ResourceSetToAddModList             SEQUENCE (SIZE(1..maxNrofSRS-
ResourceSets)) OF SRS-ResourceSet               OPTIONAL, -- Need N
    srs-ResourceToReleaseList               SEQUENCE (SIZE(1..maxNrofSRS-
Resources)) OF SRS-ResourceId                   OPTIONAL, -- Need N
```

TABLE 6-continued

```
srs-ResourceToAddModList              SEQUENCE (SIZE(1..maxNrofSRS-
  Resources)) OF SRS-Resource             OPTIONAL, -- Need N
  tpc-Accumulation                    ENUMERATED {disabled}
  ...
}
SRS-ResourceSet ::=                   SEQUENCE {
  srs-ResourceSetId                     SRS-ResourceSetId,
  srs-ResourceIdList                    SEQUENCE (SIZE(1..maxNrofSRS-
  ResourcesPerSet)) OF SRS-ResourceId     OPTIONAL, -- Cond Setup
  resourceType                          CHOICE {
    aperiodic                             SEQUENCE {
      aperiodicSRS-ResourceTrigger                INTEGER (1..maxNrofSRS-
TriggerStates-1),
      csi-RS                                      NZP-CSI-RS-ResourceId
      slotOffset                                  INTEGER (1..32)
      ...
    },
    semi-persistent                       SEQUENCE {
      associatedCSI-RS                            NZP-CSI-RS-ResourceId
      ...
    },
    periodic                              SEQUENCE {
      associatedCSI-RS                            NZP-CSI-RS-ResourceId
      ...
    }
  },
  usage                                 ENUMERATED {beamManagement,
codebook, nonCodebook, antennaSwitching},
  alpha                                 Alpha
  p0                                    INTEGER (-202..24)
  pathlossReferenceRS                   CHOICE {
    ssb-Index                             SSB-Index,
    csi-RS-Index                          NZP-CSI-RS-ResourceId
SRS-SpatialRelationInfo ::=           SEQUENCE {
  servingCellId                         ServCellIndex
  referenceSignal                       CHOICE {
    ssb-Index                             SSB-Index,
    csi-RS-Index                          NZP-CSI-RS-ResourceId,
    srs                                   SEQUENCE {
      resourceId                                  SRS-ResourceId,
      uplinkBWP                                   BWP-Id
    }
  }
}
SRS-ResourceId ::=                    INTEGER (0..maxNrofSRS-Resources-1)
```

In Table 6, usage represents a higher layer parameter indicating whether the SRS resource set is used for the beam management or whether the SRS resource set is used for codebook based or non-codebook based transmission. The usage parameter corresponds to L1 parameter 'SRS-SetUse'. 'spatialRelationInfo' is a parameter representing a configuration of a spatial relation between a reference RS and a target SRS. Here, the reference RS may become SSB, CSI-RS, or SRS corresponding to L1 parameter 'SRS-SpatialRelationInfo'. The usage is configured for each SRS resource set.

The UE determines a Tx beam for an SRS resource to be transmitted based on SRS-SpatialRelation Info included in the SRS-Config IE (S920). Here, SRS-SpatialRelation Info is configured for each SRS resource and represents a beam which is the same as the beam used in the SSB, the CSI-RS, or the SRS is to be applied for each SRS resource. Further, SRS-SpatialRelationInfo may be configured or not configured in each SRS resource.

If SRS-SpatialRelationInfo is configured in the SRS resource, SRS-SpatialRelationInfo is transmitted by applying the beam which is the same as the beam used in the SSB, the CSI-RS, or the SRS. However, if SRS-SpatialRelationInfo is not configured in the SRS resource, the UE arbitrarily determines the Tx beam and transmits the SRS through the determined Tx beam (S930).

More specifically, for P-SRS in which 'SRS-ResourceConfigType' is configured as 'periodic':

i) When SRS-SpatialRelationInfo is configured as 'SSB/PBCH', the UE transmits the corresponding SRS resource by applying a spatial domain transmission filter which is the same as a spatial domain Rx filter used for receiving the SSB/PBCH (or generated from the corresponding filter); or ii) When SRS-SpatialRelationInfo is configured as 'CSI-RS', the UE transmits the SRS resource by applying the same spatial domain transmission filter used for receiving periodic CSI-RS or SP CSI-RS; or iii) When SRS-SpatialRelationInfo is configured as 'SRS', the UE transmits the SRS resource by applying the same spatial domain transmission filter used for transmitting the periodic CSI-RS.

Even when 'SRS-ResourceConfigType' is configured as 'SP-SRS' or 'AP-SRS', beam determination and transmission operations may be applied similarly thereto.

Additionally, the UE may receive or not receive a feedback for the SRS from the eNB like three following cases (S940).

i) When Spatial_Relation_Info is configured for all SRS resources in the SRS resource set, the UE transmits the SRS with the beam indicated by the eNB. For example, when all Spatial_Relation_Info indicates the same SSB, CRI, or SRI, the UE repeatedly transmits the SRS with the same beam. This case as a usage of selecting the Rx beam by the eNB corresponds to FIG. 8(a).

ii) Spatial_Relation_Info may not be configured for all SRS resources in the SRS resource set. In this case, the UE may transmit the SRS while arbitrarily changing the SRS beam. In other words, this case as a usage of selecting the Tx beam by the UE corresponds to FIG. 8(b).

iii) Spatial_Relation_Info may be configured for some SRS resources in the SRS resource set. In this case, the SRS may be transmitted with the beam configured for the configured SRS resource and the UE may arbitrarily transmit the SRS by applying the Tx beam to an SRS resource in which Spatial_Relation_Info is not configured.

FIG. 10 is a flow chart illustrating an example of a downlink transmission and reception operation.

Referring to the FIG. 10, the eNB may schedule downlink transmission such as the frequency/time resource, the transport layer, an downlink precoder, the MCS, etc., (S10010). Specifically, the eNB may determine a beam for PDSCH transmission to the UE.

The UE may receive Downlink Control Information (DCI) for downlink scheduling (i.e., including scheduling information of the PDSCH) on the PDCCH (S10020).

DCI format 1_0 or DCI format 1_1 may be used for the downlink scheduling and DCI format 1_1 may include information such as the following examples: Identifier for DCI formats, Bandwidth part indicator, Frequency domain resource assignment, Time domain resource assignment, PRB bundling size indicator, Rate matching indicator, ZP CSI-RS trigger, Antenna port(s), Transmission configuration indication (TCI), SRS request, and Demodulation Reference Signal (DMRS) sequence initialization In particular, according to each state indicated in an antenna port(s) field, the number of DMRS ports may be scheduled, and single-user (SU)/Multi-user (MU) transmission scheduling is also available.

Further, a TCI field is configured with 3 bits, and the QCL for the DMRS may be dynamically indicated by indicating a maximum of 8 TCI states according to a TCI field value.

The UE may receive downlink data from the eNB on the PDSCH (S10030).

When the UE detects a PDCCH including the DCI format 1_0 or 1_1, the UE may decode the PDSCH according to the indication by the corresponding DCI.

Here, when the UE receives a PDSCH scheduled by DCI format 1, a DMRS configuration type may be configured by higher layer parameter "dmrs-Type" in the UE and the DMRS type is used for receiving the PDSCH. Further, in the UE, the maximum number of front-loaded DMRS symbols for the PDSCH may be configured by higher layer parameter "maxLength."

In the case of DMRS configuration type 1, when a single codeword is scheduled and an antenna port mapped to an index of {2, 9, 10, 11, or 30} is designated in the UE or when two codewords are scheduled in the UE, the UE assumes that all remaining orthogonal antenna ports are not associated with PDSCH transmission to another UE.

Alternatively, in the case of DMRS configuration type 2, when a single codeword is scheduled and an antenna port mapped to an index of {2, 10, or 23} is designated in the UE or when two codewords are scheduled in the UE, the UE assumes that all remaining orthogonal antenna ports are not associated with PDSCH transmission to another UE.

When the UE receives the PDSCH, a precoding granularity P' may be assumed as a consecutive resource block in the frequency domain. Here, P' may correspond to one value of {2, 4, and wideband}.

When P' is determined as wideband, the UE does not predict that the PDSCH is scheduled to non-contiguous PRBs and the UE may assume that the same precoding is applied to the allocated resource.

On the contrary, when P' is determined as any one of {2, 4}, a Precoding Resource Block (PRG) is split into P' consecutive PRBs. The number of actually consecutive PRBs in each PRG may be one or more. The UE may assume that the same precoding is applied to consecutive downlink PRBs in the PRG.

In order to determine a modulation order in the PDSCH, a target code rate, and a transport block size, the UE may first read a 5-bit MCD field in the DCI and determine the modulation order and the target code rate. In addition, the UE may read a redundancy version field in the DCI and determine a redundancy version. In addition, the UE may determine the transport block size by using the number of layers before rate matching and the total number of allocated PRBs.

FIG. 11 is a flow chart illustrating an example of an uplink transmission and reception operation.

Referring to the FIG. 11, the eNB may schedule uplink transmission such as the frequency/time resource, the transport layer, an uplink precoder, the MCS, etc., (S11010). In particular, the eNB may determine a beam for PUSCH transmission of the UE The UE may receive, from the eNB, DCI for downlink scheduling (i.e., including scheduling information of the PUSCH) on the PDCCH (S11020).

DCI format 0_0 or 0_1 may be used for the uplink scheduling and in particular, DCI format 0_1 may include information such as the following examples: Identifier for DCI formats, UL/Supplementary uplink (SUL) indicator, Bandwidth part indicator, Frequency domain resource assignment, Time domain resource assignment, Frequency hopping flag, Modulation and coding scheme (MCS), SRS resource indicator (SRI), Precoding information and number of layers, Antenna port(s), SRS request, DMRS sequence initialization, and Uplink Shared Channel (UL-SCH) indicator In particular, configured SRS resources in an SRS resource set associated with higher layer parameter "usage" may be indicated by an SRS resource indicator field. Further, "spatialRelationInfo" may be configured for each SRS resource and a value of "spatialRelationInfo" may be one of {CRI, SSB, SRI}.

The UE may transmit the uplink data to the eNB on the PUSCH (S11030).

When the UE detects a PDCCH including DCI format 0_0 or 0_1, the UE may transmit the corresponding PUSCH according to the indication by the corresponding DCI.

2 kinds of transmission schemes, Codebook based transmission and non-codebook based transmission, are supported for PUSCH transmission:

i) When higher layer parameter txConfig" is set to "codebook", the UE is configured to the codebook based transmission. On the contrary, when higher layer parameter txConfig" is set to "nonCodebook", the UE is configured to the non-codebook based transmission. When higher layer parameter "txConfig" is not configured, the UE does not predict that the PUSCH is scheduled by DCI format 0_1. When the PUSCH is scheduled by DCI format 0_0, the PUSCH transmission is based on a single antenna port.

In the case of the codebook based transmission, the PUSCH may be scheduled by DCI format 0_0, DCI format 0_1, or semi-statically. When the PUSCH is scheduled by DCI format 0_1, the UE determines a PUSCH transmission precoder based on the SRI, the Transmit Precoding Matrix Indicator (TPMI), and the transmission rank from the DCI as given by the SRS resource indicator and the Precoding information and number of layers field. The TPMI is used for indicating a precoder to be applied over the antenna port and when multiple SRS resources are configured, the TPMI corresponds to the SRS resource selected by the SRI. Alternatively, when the single SRS resource is configured, the TPMI is used for indicating the precoder to be applied over the antenna port and corresponds to the corresponding single SRS resource. A transmission precoder is selected from an uplink codebook having the same antenna port number as higher layer parameter "nrofSRS-Ports". When the UE is set to higher layer parameter "txConfig" set to "codebook", at least one SRS resource is configured in the UE. An SRI indicated in slot n is associated with most recent transmission of the SRS resource identified by the SRI and here, the SRS resource precedes PDCCH (i.e., slot n) carrying the SRI.

ii) In the case of the non-codebook based transmission, the PUSCH may be scheduled by DCI format 0_0, DCI format 0_1, or semi-statically. When multiple SRS resources are configured, the UE may determine the PUSCH precoder and the transmission rank based on a wideband SRI and here, the SRI is given by the SRS resource indicator in the DCI or given by higher layer parameter "srs-ResourceIndicator". The UE may use one or multiple SRS resources for SRS transmission and here, the number of SRS resources may be configured for simultaneous transmission in the same RB based on the UE capability. Only one SRS port is configured for each SRS resource. Only one SRS resource may be configured to higher layer parameter "usage" set to "nonCodebook". The maximum number of SRS resources which may be configured for non-codebook based uplink transmission is 4. The SRI indicated in slot n is associated with most recent transmission of the SRS resource identified by the SRI and here, the SRS transmission precedes PDCCH (i.e., slot n) carrying the SRI.

FIG. 12 illustrates a SSB architecture. The UE may perform cell search, system information acquisition, beam alignment for initial access, DL measurement, etc., based on an SSB. The SSB is mixedly used with an SS/Synchronization Signal/Physical Broadcast channel (PBCH) block.

Referring to FIG. 12, the SSB is constituted by PSS, SSS, and PBCH. The SSB is constituted by four continuous OFDM symbols and the PSS, the PBCH, the SSS/PBCH, and the PBCH are transmitted for each OFDM symbol. Each of the PSS and the SSS may be constituted by one OFDM symbol and 127 subcarriers and the PBCH is constituted by 3 OFDM symbols and 576 subcarriers. Polar coding and quadrature phase shift keying (QPSK) are applied to the PBCH. The PBCH is constituted by a data RE and a demodulation reference signal (DMRS) RE for each OFDM symbol. Three DMRS REs exist for each RB, and three data REs exist between DMRS REs.

Cell Search

The cell search refers to a process of acquiring time/frequency synchronization of the cell and detecting a cell identifier (ID) (e.g., physical layer cell ID (PCID)) of the cell by the UE. The PSS is used to detect the cell ID within a cell ID group and the SSS is used to detect the cell ID group. The PBCH is used for SSB (time) index detection and half-frame detection.

A cell search process of the UE may be organized as shown in Table 7 below.

TABLE 7

| | Type of Signals | Operations |
|---|---|---|
| 1st step | PSS | * SS/PBCH block (SSB) symbol timing acquisition<br>* Cell ID detection within a cell ID group (3 hypothesis) |
| 2nd Step | SSS | * Cell ID group detection (336 hypothesis) |
| 3rd Step | PBCH DMRS | * SSB index and Half frame (HF) index (Slot and frame boundary detection) |
| 4th Step | PBCH | * Time information (80 ms, System Frame Number (SFN), SSB index, HF)<br>* Remaining Minimum System Information (RMSI) Control resource set (CORESET)/Search space configuration |
| 5th Step | PDCCH and PDSCH | * Cell access information<br>* RACH configuration |

There are 336 cell ID groups, and three cell IDs exist for each cell ID group. There are a total of 1008 cell IDs.

FIG. 13 illustrates SSB transmission.

Referring to FIG. 13, the SSB is periodically transmitted according to an SSB periodicity. An SSB basic periodicity assumed by the UE in initial cell search is defined as 20 ms. After cell access, the SSB periodicity may be configured by one of {5 ms, 10 ms, 20 ms, 40 ms, 80 ms, 160 ms} by the network (e.g., eNB). At a beginning part of the SSB periodicity, a set of SSB bursts is configured. The SSB burst set may be configured by a 5-ms time window (i.e., half-frame) and the SSB may be transmitted up to L times within the SS burst set. L which is the maximum number of transmissions of the SSB may be given as follows according to a frequency band of a carrier. One slot includes up to two SSBs.

FIG. 14 illustrates that a UE acquires information on DL time synchronization.

The UE may acquire DL synchronization by detecting the SSB. The UE may identify the structure of the SSB burst set based on the detected SSB index, and thus detect a symbol/slot/half-frame boundary. The number of the frame/half-frame to which the detected SSB belongs may be identified using SFN information and half-frame indication information.

Specifically, the UE may acquire 10-bit System Frame Number (SFN) information from the PBCH (s0 to s9). 6 bits of the 10-bit SFN information are obtained from a Master Information Block (MIB), and the remaining 4 bits are obtained from a PBCH Transport Block (TB).

Next, the UE may acquire 1-bit half-frame indication information (c0). When a carrier frequency is 3 GHz or less, the half-frame indication information may be implicitly signaled using PBCH DMRS. The PBCH DMRS indicates 3-bit information by using one of eight PBCH DMRS sequences. Accordingly, in the case of L=4, 1 bit which remains after indicating the SSB index among 3 bits which may be indicated by using eight PBCH DRMS sequences may be used for half frame indication.

Last, the UE may acquire the SSB index based on a DMRS sequence and a PBCH payload. SSB candidates are indexed from 0 to L−1 in chronological order within the SSB burst set (i.e., half-frame). In the case of L=8 or 64, Least Significant Bit (LSB) 3 bits of the SSB index may be indicated using eight different PBCH DMRS sequences (b0 to b2). In the case of L=64, Most Significant Bit (MSB) 3 bits of the SSB index are indicated through the PBCH (b3 to b5). In the case of L=2, LSB 2 bits of the SSB index may be indicated using four different PBCH DMRS sequences (b0 and b1). In the case of L=4, 1 bit which remain after indicating the SSB index among 3 bits which may be indicated by using eight PBCH DRMS sequences may be used for the half frame indication (b2).

System Information Acquisition

FIG. 15 illustrates a system information (SI) acquisition process. The UE may acquire AS-/NAS-information through an SI acquisition process. The SI acquisition process may be applied to UEs which are in an RRC_IDLE state, an RRC_INACTIVE state, an RRC_CONNECTED state.

The SI is divided into a master information block (MIB) and a plurality of system information blocks (SIB). SI other than the MIB may be referred to as Remaining Minimum System Information (RSI). The following may be referred to for details.

The MIB includes information/parameters related to System InformationBlock1 (SIB1) reception and is transmitted through the PBCH of the SSB. In initial cell selection, the UE assumes that the half frame with the SSB is repeated with a periodicity of 20 ms. The UE may check whether a Control Resource Set (CORESET) for a Type0-PDCCH common search space exists based on the MIB. The Type0-PDCCH common search space is a kind of PDCCH search space and is used to transmit a PDCCH for scheduling an SI message. If there is the Type0-PDCCH common search space, the UE may (i) a plurality of continuous RBs and one or more continuous symbols constituting the CORESET and (ii) a PDCCH occasion (i.e., a time domain location for receiving the PDCCH) based on information (e.g., pdcch-ConfigSIB1) in the MIB. If there is no Type0-PDCCH common search space, pdcch-ConfigSIB1 provides information on a frequency location where SSB/SIB1 exists and a frequency range where the SSB/SIB1 does not exist.

The SIB1 contains information related to the availability and scheduling (e.g., transmission periodicity, SI-window size) of the remaining SIBs (hereinafter, referred to as SIBx, x is an integer of 2 or more). For example, the SIB1 may inform whether the SIBx is periodically broadcasted or whether the SIBx is provided by a request of the UE according to an on-demand scheme. When the SIBx is provided by the on-demand scheme, the SIB1 may include information which the UE requires for performing an SI request. The SIB1 is transmitted through the PDSCH, the PDCCH for scheduling the SIB1 is transmitted through the Type0-PDCCH common search space, and the SIB1 is transmitted through the PDSCH indicated by the PDCCH.

The SIBx is included in the SI message and transmitted through the PDSCH. Each SI message is transmitted within a time window (i.e., SI-window) which periodically occurs.

Random Access Procedure

The random access procedure of the UE may be summarized as shown in Table 8 and FIG. 16.

TABLE 8

| | Type of Signals | Acquired operation/information |
|---|---|---|
| 1st step | PRACH preamble in UL | * Initial beam acquisition<br>* Random selection of RA-preamble ID |
| 2nd Step | Random access response on DL-SCH | * Timing alignment information<br>* RA-preamble ID<br>* Initial UL grant, temporary C-RNTI |
| 3rd Step | UL transmission on UL-SCH | * RRC connection request<br>* UE identifier |
| 4th Step | Contention Resolution on DL | * Temporary C-RNTI on PDCCH for initial access C-RNTI on PDCCH for UE IN RRC_CONNECTED |

FIG. 16 illustrates an example of a random access procedure.

First, the UE may transmit a PRACH preamble as Msg1 of a random access procedure in UL.

Random access preamble sequences having two different lengths are supported. Long sequence length 839 is applied as subcarrier spacing of 1.25 and 5 kHz, and short sequence length 139 is applied as subcarrier spacing of 15, 30, 60 and 120 kHz. Long sequences support both unrestricted sets and restricted sets of type A and type B, while short sequences support only unrestricted sets.

Multiple RACH preamble formats are defined with one or more RACH OFDM symbols, different cyclic prefixes, and guard time. A PRACH preamble configuration for use is provided to the UE in the system information.

If there is no response to Msg1, the UE may retransmit the PRACH preamble within a predetermined number of times by power ramping. The UE calculates PRACH transmission power for retransmission of the preamble based on the most recent pathloss and power ramping counter. When the terminal performs beam switching, the counter of power ramping remains unchanged.

The system information informs the UE of an association between the SS block and the RACH resource.

FIG. 17 illustrates a concept of a threshold for an SS block for RACH resource association.

A threshold of the SS block for RACH resource association is based on RSRP and a configurable network. Transmission or retransmission of the RACH preamble is based on SS blocks that meet the threshold.

When the UE receives a random access response on the DL-SCH, the DL-SCH may provide timing alignment information, RA-preamble ID, initial UL grant, and temporary C-RNTI.

Based on this information, the UE may transmit the UL transmission on the UL-SCH as Msg3 of the random access procedure. The Msg3 may include the RRC connection request and the UE identifier.

In response thereto, the network may transmit Msg4 and the Msg4 may be handled as a contention resolution message in DL. By receiving the Msg4, the UE may enter the RRC connected state.

FIG. 18 illustrates an example of transmission through multiple Physical Downlink Control Channels (PDCCHs) according to an embodiment of the present disclosure.

As one of the discussions on NR MIMO, the following matters may be required in relation to Coordinated Multiple Point (COMP) transmission.

Enhancement of multi transmit and receive point (TRP)/panel transmission function including enhanced reliability and robustness through ideal backhaul and non-ideal backhaul:

Continuously displaying downlink control signaling for efficient support of non-coherent joint transmission (NCJT)

Improvement of uplink control signal and/or reference signal for non-interference transmission Multi TRP technology for Ultra Reliability and Low Latency Communication (URLLC) requirements Among the above matters, non-coherent transmission is described below.

Non-coherent transmission: A non-coherent transmission scheme means a transmission scheme in which transmission of MIMO layer(s) is performed from two or more transmit points (TPs) without adaptive precoding through TP.

Further, hereinafter, in the present disclosure, the transmit and receive point (TRP) which means a point where a signal is transmitted and received may be the same name and meaning as TRxP, the transmission point (TP), etc.

TRxP: Antenna array having one or more antenna elements usable in a network in a specific geographical location in a specific region.

When multiple TRPs are connected through non-deal backhaul (NIBH), there is a problem in that dynamic coordination is difficult between TRPs due to a backhaul latency (e.g., 2 ms, 5 ms, 50 ms). Therefore, when multiple TRPs are connected through the NIBH, it may be preferred to independently schedule resources in different TRPs in order to support the NCJT.

That is, in order to reduce the backhaul latency which may occur due to transmission through backhaul between the TRPs, different TRPs may individually schedule resources to the UE, respectively.

In this case, a multi-PDCCH scheme of transmitting the PDCCH in each TRP may be used as illustrated in FIG. 18. The multi-PDCCH scheme means a scheme of scheduling different PDSCHs by transmitting independent PDCCH to the UE in different TRPs.

For example, when TRP 1 and TRP 2 are connected through the non-ideal backhaul as illustrated in FIG. 18, TRP 1 and TRP 2 may individually transmit PDCCHs to the UE, respectively (PDCCH 1 and PDCCH 2), and transmit PDSCH 1 and PDSCH 2 to the UE through resources allocated through respective PDCCHs, respectively.

The UE may perform blind decoding (BD) for the PDCCH based on a Control Resource Set (CORESET) configuration and a search space configuration which the base station configures to the UE.

In a current NR standard, up to three different CORESETs may be configured per Bandwidth Part (BWP), and a TCI state may be separately configured for each CORESET configuration.

FIG. 19 illustrates an example in which different CORESETs are configured for different beams according to an embodiment of the present disclosure.

Referring to FIGS. 19(a) and 19(b), TCI state configurations of different CORESETs may include different CSI-RS resources, and different CSI-RS resources may correspond to different beams. For example, a configuration value for a TCI state of CORESET #1 may include CSI-RS resource #10 as illustrated in FIG. 19(a), and corresponding CSI-RS resource #10 may mean a specific transmission beam of the TRP.

FIG. 20 illustrates an example of configuring CORESET in different TRPs according to an embodiment of the present disclosure.

FIG. 20(a) illustrates an example of a method for configuring CORESETs in different TRPs having a plurality of beams.

For example, as illustrated in FIG. 20(a), a configuration value for a TCI state of CORESET #2 may include CSI-RS resource #21 transmitted in TRP 2. Comparing FIGS. 19(a) and 19(b), and FIG. 20(a), when CORESET which may have configuration values for different TCI states is configured in order to transmit the PDCCHs in multiple TRPs, a CORESET configuration which specific TRP may have may be reduced.

For example, in an example illustrated in FIG. 20(a), TRP 1 may not perform the CORESET configuration for CSI-RS resource #10, and therefore, the PDCCH may not be transmitted to the UE with the corresponding beam.

Therefore, transmission coverage for the PDCCH of the corresponding TRP is reduced. A TCI state of specific CORESET may be changed through an MAC CE operation, but to this end, additional signaling is required, and further, a latency occurs until a corresponding TCI state change is applied.

Meanwhile, as described above, the number of CORESETs for multiple beams which the specific TRP may have is reduced and there is a limit in the number of CORESETs which may differentiate a frequency/time resource configuration according to a purpose.

An example illustrated in FIG. 20(b) shows an example for the configuration of three CORESETs configured for different purposes in a single TRP. CORESET #1 may correspond to CSI-RS resource #0 having a relatively wide beam width, and may be used for a purpose for robust PDCCH transmission in spite of movement of the UE. On the contrary, CORESETs #2 and #3 correspond to CSI-RS resource #11 having a relatively narrow beam width. Therefore, CORESETs #2 and #3 have an advantage of being capable of providing a higher beamforming gain to the UE.

Further, since a length of a symbol constituting CORESET in the same beam is short, CORESET #2 may be used for a purpose for performing sudden data scheduling in the middle of the slot. Meanwhile, CORESET #3 may be used for a purpose of general data scheduling.

As in the above example, different CORESETs corresponding to the same beam may be configured to the UE for different purposes. In this case, when different CORESET configurations are applied to different TRPs, respectively in order to support PDCCHs transmitted in different TRPs, CORESET configurations which may be used for various purposes in a specific TRP are reduced.

Therefore, the present disclosure proposes a method that may support multiple PDCCH based multiple TRP transmission without reducing the number of CORESETs for different beams and/or the number of CORESETs for different purposes, which may be configured in a single TRP.

<Proposal #1: A TCI state configured in a specific CORESET may include two or more Reference Signal (RS) Sets>

A TCI state configured in a specific CORESET for the TRP to schedule the PDSCH through the PDCCH may include one or more RS sets.

Specifically, a TCI state which the CORESET configuration has may include one RS set as in a definition of a higher layer parameter as in Table 9 below.

```
TCI-State::=            SEQUENCE {
    tci-StateId             TCI-stateId,
    qcl-Type1               QCI -Info,
    qcl-Type2               QCL-Info ...
}
QCL-Info ::=            SEQUENCE{
    cell                        servCellIndex bwp-Id              BWP-Id
    referenceSignal         CHOICE {
        csi-rs                      NZP-CSI-RS-ResourceId,
        ssb                         SSB-Index
    },
    qcl-Type                ENUMERATED {typeA, typeB, typeC, typeD},
    ...
}
```

In this case, one RS set may mean one set constituted by qcl-Type1 and qcl-Type2, and one RS set may mean information on a QCL relationship with a downlink reference signal transmitted in a single TRP/panel/beam.

Therefore, according to the proposal, a case where the single TCI state includes two or more RS sets may mean that one TCI state may include information on a QCL relationship with a downlink reference signal transmitted in different TRPs, panels, and/or beams.

Hereinafter, the case where the information on the QCL relationship with the downlink reference signal transmitted in different TRPs, panels, and/or beams may be configured in one TCI state may be applied to the following embodiment.

In this case, there is an effect that the number of CORESETs for multiple beams and/or multiple purposes which the single TRP has may not be decreased and the number of PDCCHs which are simultaneously transmitted through different TRPs, panels, and/or beams may be increased.

In Proposal #1, it is assumed that a single TCI state configured in a specific CORESET may include multiple RS sets. Such a method may be regarded as an example for a method for configuring multiple QCL relationships in the configuration of the specific CORESET. As another method for configuring the multiple QCL relationships in the specific CORESET configuration, a method for configuring multiple TCI states comprised of a single RS set in a specific CORESET may be considered. When such a method is considered, Proposal #1 may be as follows.

The specific CORESET may be configured with multiple TCI states comprised of a single RS set. That is, the TCI state configured in the specific CORESET includes a plurality of RS sets, but a plurality of TCI sets including one RS set may be configured in the specific CORESET.

When the method of Proposal #1 is applied in order to configure the multiple QCL relationships in the specific CORESET configuration, "a specific RS set among multiple RS sets included in the TCI state configured in the specific CORESET" described in proposals of Proposal #2 (including sub-Proposal), Proposal #3 (including sub-Proposal), Proposal #4, and Proposal #5 may have the same meaning as "the specific TCI state among multiple TCI states configured in the specific CORESET", and the legacy proposed matter may be used to meet an original purpose.

A relationship between multiple RS sets and multiple TCI states may be described as follows. For example, a case where the method is applied to a case where TCI state #a including RS set #a and RS set #b is configured in CORESET #a may be the same as a case where TCI state #A and TCI state #B are configured in CORESET #a, and in this case, TCI state #A and TCI state #B may correspond to RS set #a and RS set #b, respectively.

<Proposal #2: When the TCI state configured in the specific CORESET includes two or more RS sets, the base station may designate a specific RS set(s) to the UE through a search space configuration including the corresponding CORESET configuration>

When the TCI state configured in the specific CORESET includes two or more RS sets, two or more RS sets may be configured even though the UE receives DCI corresponding to the specific CORESET. Therefore, in this case, the UE may designate at least one RS set of two or more RS sets to the UE through the configuration of the search space for receiving the DCI.

Specifically, when the plurality of RS sets is configured in the single TCI state configured in the specific CORESET as described in Proposal #1, Proposal #2 may be an example for the method for configuring the plurality of QCL relationships for the specific CORESET configuration.

As another method for configuring the multiple QCL relationships in the specific CORESET configuration, multiple TCI states comprised of the single RS set may be configured in the specific CORESET. In this case, Proposal #2 may be as follows.

When two or more TCI states are configured in the specific CORESET, the base station may designate the specific TCI state to the UE through the search space configuration including the corresponding CORESET configuration.

When the above method is applied in order to configure the multiple QCL relationships in the specific CORESET configuration, "a specific RS set of multiple RS sets included in the TCI state configured in the specific CORESET" described below may have the same meaning as "the specific TCI state of multiple TCI states configured in the specific CORESET", and the legacy proposed matter may be used to meet the original purpose.

In the above proposal, "designating the specific RS set(s) to the UE" may be interpreted even as "designating whether to use all RS sets or whether to use only one specific RS set".

Information on a frequency resource in which the PDCCH may be transmitted may be configured to the UE through ControlResourceSet which is a higher layer parameter transmitted through higher layer signaling shown in Table 10 below or information on a time resource in which the PDCCH may be transmitted to the UE through SearchSpace which is the higher layer parameter as shown in Table 11.

TABLE 10

```
ControlResourceSet ::=            SEQUENCE {
    controlResourceSetId              ControlResourceSetId,
    frequencyDomainResources          BIT STRING (SIZE (45)),
    duration                          INTEGER (1..maxCoReSetDuration),
    cce-REG-MappingType               CHOICE {
        interieaved                       SEQUENCE {
            reg-BundleSize                    ENUMERATED {n2, n3, n6},
            interleaverSize                   ENUMERATED {n2, n3, n6},
            shiftindex                        INTEGER(0..maxNrofPhysicalResourceBlocks-1)},
        nonInterleaved                    NULL
    },
    precoderGranularity               ENUMERATED {sameAsREG-bundle, allContiguousRBs},
    tci-StatesPDCCH-ToAddList         SEQUENCE(SIZE (1..maxNrofTCI-StatesPDCCH)) OF TCI-StateId
    tci-StatesPDCCH-ToReleaseList     SEQUENCE(SIZE (1..maxNrofTCI-StatesPDCCH)) OF TCI-StateId
    tci-PresentInDCI                  ENUMERATED {enabled}
    pdcch-DMRS-ScramblingID           INTEGER (0..65535) ...
}
```

TABLE 11

```
SearchSpace ::=                   SEQUENCE {
    searchSpaceId                     SearchSpaceId,
    controlResourceSetId              ControlResourceSetId monitoringSlotPeriodicityAndOffset
CHOICE {
    sl1                                   NULL,
    sl2                                   INTEGER (0..1),
    sl4                                   INTEGER (0..3),
    sl5                                   INTEGER (0..4),
    sl8                                   INTEGER (0..7),
    sl10                                  INTEGER (0..9),
    sl16                                  INTEGER (0..15),
    sl20                                  INTEGER (0..19),
    sl40                                  INTEGER (0..39),
    sl80                                  INTEGER (0..79),
    sl160                                 INTEGER (0..159),
    sl320                                 INTEGER (0..319),
    sl640                                 INTEGER (0..639),
    sl1280                                INTEGER (0..1279),
    sl2560                                INTEGER (0..2559)
}
    duration                          INTEGER (2..2559)
    monitoringSymbolsWithinSlot       BIT STRING (SIZE (14))
    nrofCandidates                    SEQUENCE {
        aggregationLevel1                 ENUMERATED {n0, n1, n2, n3, n4, n5, n6, n8},
        aggregationLevel2                 ENUMERATED {n0, n1, n2, n3, n4, n5, n6, n8},
        aggregationLevel4                 ENUMERATED {n0, n1, n2, n3, n4, n5, n6, n8},
        aggregationLevel8                 ENUMERATED {n0, n1, n2, n3, n4, n5, n6, n8},
        aggregationLevel16                ENUMERATED {n0, n1, n2, n3, n4, n5, n6, n8}
    }
    searchSpaceType                   CHOICE {
        common                            SEQUENCE {
            dci-Format0-0-AndFormat1-0        SEQUENCE {
                ...
            }
            dci-Format2-0                     SEQUENCE {
                nrofCandidates-SFI                SEQUENCE {
                    aggregationLevel1                 ENUMERATED {n1, n2}
                    aggregationLevel2                 ENUMERATED {n1, n2}
                    aggregationLevel4                 ENUMERATED {n1, n2}
                    aggregationLevel8                 ENUMERATED {n1, n2}
                    aggregationLevel16                ENUMERATED {n1, n2}
                },
                ...
            }
            dci-Format2-1                     SEQUENCE {
                ...
            }
            dci-Format2-2                     SEQUENCE {
                ...
            }
            dci-Format2-3                     SEQUENCE {
                dummy1                            ENUMERATED {sl1, sl2, sl4, sl5, sl8, sl10, sl16, sl20}
                dummy2                            ENUMERATED {n1, n2},
                ...
            }
        }
        ue-Specific                       SEQUENCE {
```

TABLE 11-continued

```
    dci-Formats                         ENUMERATED {formats0-0-And-1-0, formats0-1-And-
1-1},
        ...
        }
    }
}
```

In addition, a value of SearchSpace may be defined to have specific ControlResourceSet. Through this, the UE may perform PDCCH BD for a frequency domain indicated by ControlResourceSet which corresponding SearchSpace has in a time domain indicated by SearchSpace.

Meanwhile, when the TCI state configured in the specific CORESET has two or more RS sets according to Proposal #1 of the present disclosure, the base station may designate the specific RS set(s) to the UE through the search space configuration including the corresponding CORESET configuration. The UE may assume that only the specific RS set(s) designated through the search space configuration is valid when performing the PDCCH BD.

For example, when TCI state #1 configured in ControlResourceSet #1 has {RS set #1, RS set #2}, and SearchSpace #1 has ControlResourceSet #1, one of two following methods may be performed.

Option 1: The base station may designate only a specific RS set of RS set #1 and RS set #2 included in TCI state #1 configured in ControlResourceSet #1 through SearchSpace #1.

For example, the base station may designate only RS set #1 or designate only RS set #2. When only RS set #1 is designated, the UE may perform the BD for the PDCCH based on the search space configuration corresponding to RS set #1. In this case, QCL reference for PDCCH DMRS may be assumed to be RS set #1.

Option 2: The base station may designate, to the UE, both RS set #1 and RS set #2 included in TCI state #1 configured in ControlResourceSet #1 through SearchSpace #1. When all RS sets are designated, the QCL reference for the PDCCH DMRS may be RS set #1 and RS set #2 when the UE performs the BD for the PDCCH based on the corresponding search configuration.

In the case of Option 2, different PDCCHs may be simultaneously transmitted in the specific CORESET. In addition, since different QCL references (RS set #1 or RS set #2) may be configured for respective PDCCHs, the UE may transmit the respective PDCCHs through different TRPs, panels, and/or beams. In this case, it may be preconfigured that the UE may simultaneously receive different PDCCHs.

As an example for applying this, group based beam reporting of the current standard may use a function. When the group based beam reporting is configured to the UE, the UE may report, to the base station, information on downlink reference signals which may be simultaneously received.

Accordingly, the base station may know a combination of beams which the UE may simultaneously receive based on the report from the UE.

That is, when reportQuantity which is the higher layer parameter is constituted by CSI-ReportConfig configured as 'cri-RSRP' or 'ssb-Index-RSRP', When the higher layer parameter "groupBasedBeamReporting" is configured to 'disable', the UE is not required to update measurements for 64 CSI-RS and/or SSB resources or more. Further, the UE performs reporting in single report nrofReportedRS in different CRI or SSBRI for each report configuration.

When the higher parameter "groupBasedBeamReporting" is configured to 'enable', the UE need not update measurements for 64 CSI-RS and/or SSB resources or more, and the UE should report two different CRI or SSBRI for each report configuration in a single report instance. Here, the CSI-RS resource and/or SSB resource may be received simultaneously with a single spatial domain reception filter or multiple simultaneous spatial domain reception filters by the UE.

FIG. 20(a) illustrates an example of Option 2. FIG. 20(a) illustrates an example in which a beam for CSI-RS resource #11 transmitted in TRP 1 and a beam for CSI-RS resource #21 transmitted in TRP 2 are simultaneously configured through the TCI state of CORESET #2. In this case, CSI-RS resource #11 may be included in RS set #1 defined in the configuration for the TCI state of CORESET #2 and CSI-RS resource #21 may be included in RS set #2.

Meanwhile, the TCI state configured in the specific CORESET may include in multiple RS sets through the proposal, and when the base station designates the specific RS set(s) to the UE through the search space configuration, the following effect may be obtained.

The number of PDCCHs which are simultaneously transmitted through different TRPs, panels, and/or beams may be increased without decreasing the number of CORESETs for multiple beams/multiple purposes which the single TRP has.

Since simultaneous transmission of the PDCCH may be assumed only in a specific search space, the complexity of the UE may be prevented from being unnecessarily increased. The specific CORESET configuration may be shared in multiple search space configurations. Therefore, it is fixed that the TCI state configured in the specific CORESET includes multiple RS sets in a CORESET configuring step, simultaneous transmission of different PDCCHs should be assumed in all search spaces having the corresponding CORESET configuration, and as a result, the complexity increases unnecessarily.

Meanwhile, since the UE may expect that as the TCI state configured in the CORESET includes multiple RS sets, multiple PDCCHs are transmitted, the complexity for the PDCCH BD increases. For example, when the UE performs the PDCCH BD by RS set #1 and RS set #2 as the QCL references through two different panels, respectively, the complexity increases twice as compared with the legacy complexity. A method for complementing such a disadvantage and preventing the complexity from being increased will be described below.

Meanwhile, in the present disclosure, the TCI state configured in the specific CORESET may have two or more RS sets, and the base station may designate the specific RS set(s) to the UE through the search space configuration including the corresponding CORESET configuration.

In other words, the TCI state of the CORESET configuration may have multiple RS sets, but an RS set corresponding to the corresponding CORESET may actually vary depending on the search space configuration.

When such a configuration scheme, there is an advantage that the RS set corresponding to the CORESET configuration may be configured differently for each in which a PDCCH candidate is actually defined.

That is, one CORESET configuration may be used for various purposes/usages according to the search space configuration. On the contrary, the specific RS set(s) may not be designated to the UE through the search space configuration, and when the TCI state of the specific CORESET configuration has two or more RS sets, all RS sets included in the TCI state configured in the CORESET may be specified to be referred to in the search space configuration including the corresponding CORESET configuration. In this case, the advantage described above may not be provided, but there is an advantage that the standard may be defined more simply. When such a situation is assumed, a condition described as "a case where the base station designates multiple RS sets to the UE through the search space configuration' may be expressed as "a case where the TCI state of the CORESET configuration included in the specific search space configuration includes two or more RS sets".

Figure 21:
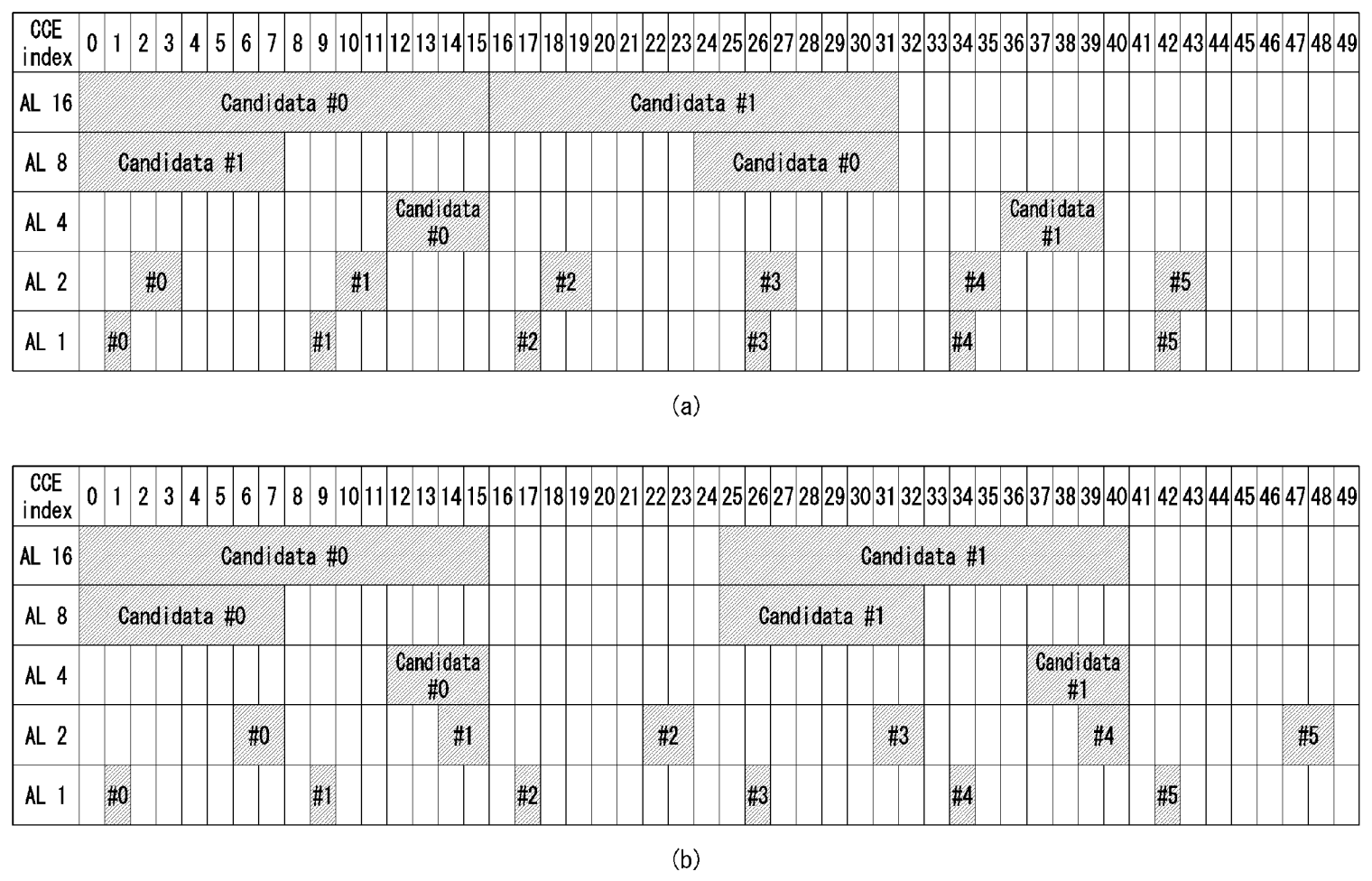

FIG. 21 illustrates an example of a method for configuring, by a base station, a plurality of resource sets to a UE through a configuration of a search space according to an embodiment of the present disclosure.

<Proposal #2-1: When the base station designates multiple RS sets to the UE through the search space configuration, a resource range in which the PDCCH may be transmitted for each RS set may BE configured between the base station and the UE.>

In other words, when the base station configures a plurality of RS sets to the UE through the configuration of the search space, the range of the resource in which the PDCCH may be transmitted for each RS set may be configured between the base station and the UE.

For example, the base station may indicate a range of a CCE index corresponding to each RS set to the UE. In this case, CCE indexes of PDCCH candidates for different aggregation levels may be defined within the CCE index range corresponding to each RS set.

Proposal #2-1 may include multiple RS sets in the single TCI state configured in the specific CORESET based on Proposal #1, and may be regarded as an example for the method for configuring multiple QCL relationships in the specific CORESET configuration.

As another method for configuring the multiple QCL relationships in the specific CORESET configuration, multiple TCI states constituted by the single RS set may be configured in the specific CORESET. In this case, Proposal #2-1 may be described as follows.

When the base station configures multiple TCI states to the UE through the search space configuration, a resource range in which the PDCCH may be transmitted for each TCI state may be configured between the base station and the UE.>

In other words, when the base station transmits configuration information in order to configure a search space for searching the DCI to the UE, the base station may configure a plurality of TCI states to the UE through the configuration of the search space. In this case, one or more resources may be configured in one TCI state or the base station may configure, to the UE, a resource in a predetermined range, in which the PDCCH for transmitting the DCI may be transmitted.

For example, the base station may indicate, to the UE, the range of the CCE index corresponding to each TCI state. In this case, CCE indexes of PDCCH candidates for different aggregation levels may be defined within the CCE index range corresponding to each TCI state.

When the above method is applied in order to configure the multiple QCL relationships in the specific CORESET configuration, "a specific RS set of multiple RS sets included in the TCI state configured in the specific CORESET" described below may have the same meaning as "the specific TCI state of multiple TCI states configured in the specific CORESET", and the legacy proposed matter may be used to meet the original purpose.

As described in Proposal #2, when the base station designates, to the UE, multiple RS sets through the search space configuration, the UE may expect that as the TCI state configured in the CORESET has multiple RS sets, multiple PDCCHs are transmitted, and as a result, the complexity for the PDCCH BD and complexity for channel estimation may increase.

In order to prevent the complexity increase, the resource range in which the PDCCH may be transmitted for each RS set may be configured between the base station and the UE. As one of the methods for configuring the resource range, the base station may indicate, to the UE, the range of the control channel element (CCE) index corresponding to each RS set. The method for indicating the range of the CCE index may be as follows.

Alt. 1: When the base station designates K RS sets to the UE through the search space configuration and the total number of CCEs which the CORESET configuration included in the corresponding search space configuration has is N, a range of a CCE index in which a k-th RS set is assumed as the QCL reference may be from k*floor(N/K) to (k+1)*floor(N/K)−1.

As an example, when the base station designates two RS sets to the UE and the total number of CCEs is 50, the UE may assume a range of a CCE index in which RS set #1 may be assumed as the QCL reference to be #0 to #24 and a range of a CCE index in which RS set #2 may be assumed as the QCL reference to be #25 to #49. Such a scheme may be indicated to the UE through explicit signaling by the base station or implicitly indicated through a predetermined rule between the base station and the UE.

Such a method is an example of the present disclosure, and the present disclosure is not limited by the above-described matter and may be extensively applied to a similar embodiment thereto.

For example, all methods for indicating which RS set CCE of a specific index is to assume as the QCL reference are applicable.

A CCE index for a specific PDCCH candidate at a specific aggregation level may be determined through a Hash function for Equation 3 below.

$$L \cdot \left\{ \left( Y_{p,n_{s,f}^{\mu}} + \left\lfloor \frac{m_{s,n_{CI}} \cdot N_{CCE,p}}{L \cdot M_{p,s,max}^{(L)}} \right\rfloor + n_{CI} \right) \bmod \lfloor N_{CCE,p}/L \rfloor \right\} + i \quad \text{[Equation 3]}$$

An example of each parameter of the above equation may include the following values.

$Y_{p,-1}=n_{RNTI}=6$, $A_p=39827$, $D=65537$, $n_{CI}=0$, $M_{p,a,max}^{(1)}=6$, $M_{p,a,max}^{(2)}=6$, $M_{p,a,max}^{(4)}=2$, $M_{p,a,max}^{(8)}=2$, $M_{p,a,max}^{(16)}=2$, $N_{CCE,p}=50$ The CCE index of the PDCCH candidate of each aggregation level for each above parameter is illustrated in FIG. 21(a).

In FIG. 21(a), by applying an example of Proposal #2-1, for two RS sets, CCE indices #0 to #24 may indicate RS set #1 to be assumed as the QCL reference and CCE indices #25 to #49 may indicate RS set #2 to be assumed as the QCL reference.

However, in such a configuration, there is a situation in which candidate #1 of aggregation level (AL) 16 and candidate #0 of AL 8 should assume different QCL references for a single PDCCH candidate.

Such a case may be interpreted as an error, and the corresponding PDCCH candidate may not be used. As described in such an example, a PDCCH candidate region which may not unintentionally be used may occur by the CCE index configuration of the candidate PDCCH using the Hash function.

In order to prevent such an error, when the base station designates to multiple RS sets to the UE through the search space configuration, the Hash function may be applied within the CCE index range corresponding to each RS set. In order to apply such a method to the legacy Hash function, $N_{CCE,p}$ of the legacy equation may be defined as $N_{CCE,p}^{new}$=floor($N_{CCE,p}$/K), and the Hash function may be applied within each CCE index range corresponding to a different RS set. An example of changing the legacy equation by applying such a scheme is shown in Equation 4 below. In Equation 4 below, k may mean the index of the RS set, k=0, . . . , K−1, and K may represent the number of RS sets which the base station designates to the UE.

$$L \cdot \left\{ \left( Y_{p,n_{s,f}^\mu} + \left\lfloor \frac{m_{s,n_{CI}} \cdot N_{CCE,p}^{new}}{L \cdot M_{p,s,max}^{(L)}} \right\rfloor + n_{CI} \right) \bmod \left\lfloor \frac{N_{CCE,p}^{new}}{L} \right\rfloor \right\} + l_{new} \qquad \text{[Equation 3]}$$

where $i_{new}$=i+k·$N_{CCE,p}^{new}$ and k=0, . . . , K−1

In Proposal #2-1, when the parameter for FIG. 21(a) is applied, the position of the candidate PDCCH for each aggregation level is illustrated in FIG. 21(b). However, in order to match the total number of candidates for a specific aggregation level with the previous number, $M_{p,a,max}^{(1)}$=3, $M_{p,a,max}^{(2)}$=3, $M_{p,a,max}^{(4)}$=1, $M_{p,a,max}^{(8)}$=1, $M_{p,a,max}^{(16)}$=1 within the CCE index range corresponding to each RS set.

Based on Proposal #2-1, the base station may designate a plurality of RS sets through the search space configuration, and a range in which the PDCCH may be transmitted may be configured for each RS set.

Through the proposed scheme, with respect to different RS sets, a range in which the corresponding RS set is to be assumed as the QCL reference is distinguished to limit a range in which the UE is to perform the PDCCH BD and a range in which the UE is to perform the channel estimation, thereby preventing complexity due to BD and channel estimation from being increased.

A PDCCH transmittable range may be configured in advance between the base stations. Therefore, as in a situation in which the TRPs are connected by the NIBH, a collision between different PDCCHs may be prevented even in a situation in which dynamic coordination between the TRPs is difficult.

In order to support multiple PDCCH based multiple TRP transmission transmitted in different TRPs, Proposals 1 and 2 are as follows.

First, the TCI state configured in the specific CORESET may include a plurality of RS sets. In this case, the TCI state including the plurality of RS sets is configured in the CORESET, the base station may allocate a specific RS set to the UE with respect to the TCI state of the corresponding CORESET through the search space configuration including the corresponding CORESET configuration.

That is, when the plurality of RS sets is configured in one TCI state, the base station may indicate, to the UE, the specific RS set among the plurality of RS sets through configuration information transmitted to the UE for the configuration of the search space. That is, the base station may transmit the configuration information for the search space configuration, which includes an indicator indicating the specific RS set among the plurality of RS sets configured in each TCI state.

When the base station allocates the plurality of RS sets to the UE through the configuration of the search space, the base station may designate the CCE index range to assume the specific RS set as the QCL reference. In this case, the number of candidates for different aggregation levels configured in the search space may be defined as the number of candidates defined within the CCE index range.

For example, when the number of candidates for aggregation level 2 is set to 3 and the number of selected RS sets is 2, the total number of candidates for AL 2, which may exist in the corresponding CORESET may become 6.

FIG. 22 illustrates an example of a method for configuring a precoder for Resource Element Groups (REGs) in a Resource Block (RB) according to an embodiment of the present disclosure.

<Proposal #2-1-1: When the base station configures multiple RS sets to the UE through the search space configuration, the UE may regard that the precoder may BE the same by a Resource Element Bock (REG) bundle unit.>

Proposal #2-1-1 may include a plurality of RS sets in a single TCI state in specific CORESET based on Proposal #1. Such a method may be an example for the method for configuring the plurality of QCL relationships in the specific CORESET configuration.

As another method for configuring the plurality of QCL relationships in the specific CORESET configuration, multiple TCI states constituted by the single RS set may be configured in the specific CORESET. In this case, Proposal #2-1-1 may be as follows.

When the base station designates a plurality of TCI states to the UE through the search space configuration, the UE may regard that the precoder is the same by the REG bundle unit.

When the above method is applied in order to configure the multiple QCL relationships in the specific CORESET configuration, "a specific RS set of multiple RS sets included in the TCI state configured in the specific CORESET" may have the same meaning as "the specific TCI state of multiple TCI states configured in the specific CORESET".

Meanwhile, the base station may configure, to the UE, one scheme of interleaved or non-interleaved as a control channel element (CCE)-to-resource element group (REG) mapping scheme. Further, a unit of a resource in which the UE may assume that the precoder is the same may be configured through precoderGranularity in ControlReourceSet which is a higher layer parameter for the CORESET configuration.

For example, when precoderGranularity is configured as sameAsREG-bundle, the UE may assume that the precoder is the same only within the REG bundle, and when precoderGranularity is configured as allContiguousRBs, the UE may assume that the precoder is the same for REGs within concatenated RBs in the CORESET. When the interleaved scheme is configured to the UE as the CCE-To-REG mapping scheme while the base station configures, to the UE, the CCE index range to assume different RS sets as the QCL reference according to the above proposal, different CCEs to assume different RS sets as the QC reference may be constituted by RBs which are concatenated with each other. In this case, when precoderGranularity is configured as allContiguousRBs to the UE, the UE may assume that the same precoder is configured for the REGs within the concatenated RBs.

However, when the UE assumes that the same precoder is configured for the REGs within the concatenated RBs, the UE actually wrongly assumes REGs applied with different precoders, and as a result, channel estimation performance may deteriorate. FIG. 22 illustrates an example of such a situation.

The example of FIG. 22 shows an example of a case where $$N_{symb}^{CORESET} = 2, L = 2, R = 6, n_{shift} = 0, N_{RB}^{CORESET} = 60$$

[e.g., see 3gpp TS 38.211. Physical downlink control channel], and a bit map expressed in the figure means a bit map parameter configured for frequency resource allocation in the CORESET configuration. In the example of FIG. 17 above, when precoderGranularity is configured as allContiguousRBs, it may be assumed that the same precoder is applied to REG #0 to REG #23 constituted by concatenated RBs.

However, when RS set #1 is assumed as the QCL reference in CCE #0 to CCE #9 and RS set #2 is assumed as the QCL reference in CCE #10 to CCE #19 according to the above proposal, CCEs are mixed, in which different RS sets are assumed as the QCL reference for corresponding REGs (REG #0 to REG #23), and as a result, it may not be assumed that the same precoder is applied.

In order to prevent the error in the precoder granularity configuration and the QCL reference configuration for the CCE, when the base station designates multiple RS sets to the UE through the search space configuration, the precoder granularity of the CORESET included in the corresponding search space may be configured as REG bundle in the UE.

Figure 23:
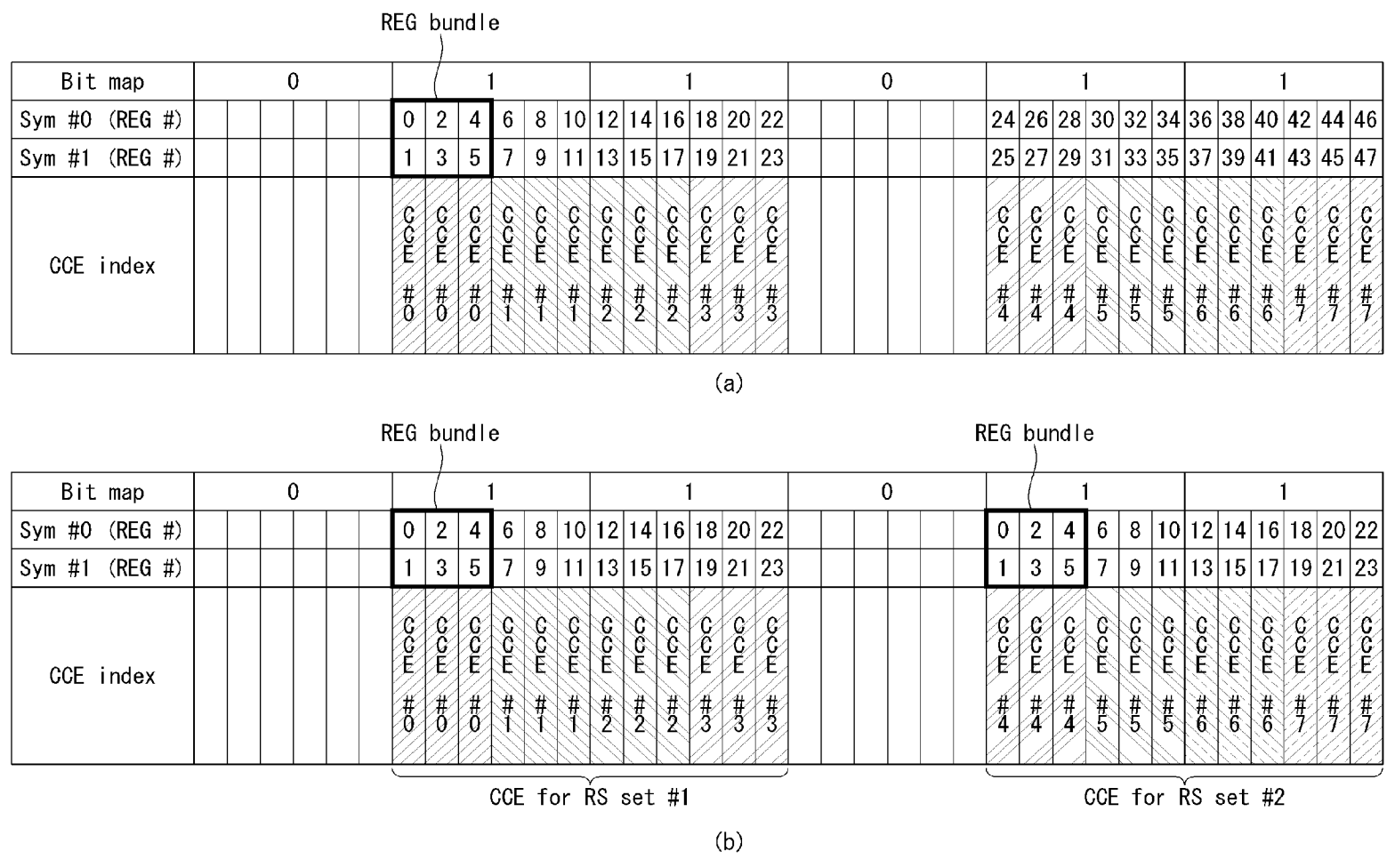

FIG. 23 illustrates an example of REG, REG bundle, and CCE according to an embodiment of the present disclosure.

<Proposal #2-2: When the base station designates multiple RS sets to the UE through the search space configuration, a resource range in which the PDCCH may be transmitted for each RS set may be configured between the base station and the UE. As an example therefor, the base station may indicate, to the UE, a range of a resource block (RB) index corresponding to each RS set. In this case, REG, REG bundle, and CCE may be defined within the RB index range corresponding to each RS set. In addition, CCE indices of PDCCH candidates for different aggregation levels may be defined within the RB index range corresponding to each RS set.>

In above proposal, it is assumed that a single TCI state configured in a specific CORESET may include multiple RS sets based on Proposal #1. The above method may be regarded as an example for the method for configuring multiple QCL relationships in the specific CORESET configuration. As another method for configuring the multiple QCL relationships in the specific CORESET configuration, a method for configuring multiple TCI states configured by a single RS set in a specific CORESET may be considered. When such a method is considered, Proposal #2-1-1 may be described as follows:

When the base station designates multiple TCI states to the UE through the search space configuration, a resource range in which the PDCCH may be transmitted for each TCI state may be configured between the base station and the UE. As an example therefor, the base station may indicate, to the UE, a range of a resource block (RB) index corresponding to each TCI state. In this case, REG, REG bundle, and CCE may be defined within the RB index range corresponding to each TCI state. In addition, CCE indices of PDCCH candidates for different aggregation levels may be defined within the RB index range corresponding to each TCI state.

When the above method is applied in order to configure the multiple QCL relationships in the specific CORESET configuration, "a specific RS set of multiple RS sets included in the TCI state configured in the specific CORESET" described below may have the same meaning as "the specific TCI state of multiple TCI states configured in the specific CORESET", and the legacy proposed matter may be used to meet the original purpose.

As described in Proposal #2 above, when the base station designates, to the UE, multiple RS sets through the search space configuration, the UE may expect that as the TCI state configured in the CORESET has multiple RS sets, multiple PDCCHs are transmitted, and as a result, the complexity for the PDCCH BD and complexity for channel estimation increase. In order to prevent the complexity increase, the resource range in which the PDCCH may be transmitted for each RS set may be configured between the base station and the UE. As one of the method for configuring the resource range, the base station may indicate, to the UE, the range of the RB index corresponding to each RS set. As the method for indicating the range of the RB index, the following method may be given as an example.

Alt. 1: When the base station designates K RS sets to the UE through the search space configuration and the total number of RBs which the CORESET configuration included in the corresponding search space configuration has is N, a range of an RB index in which a k-th RS set is assumed as the QCL reference may be from k*floor(N/K) to (k+1)*floor(N/K)−1.

In this case, as the RB index, indices may be assumed, which are sequentially defined within the RB configured to the UE according to a frequency resource configuration within the CORESET configuration. As an example of the above scheme, when the base station designates two RS sets to the UE and the total number of RBs is 24, the UE may assume a range of an RB index in which RS set #1 may be assumed as the QCL reference to be #0 to #11 and a range of an RB index in which RS set #2 may be assumed as the QCL reference to be #12 to #23. Such a scheme may be indicated to the UE through explicit signaling by the base station or implicitly indicated through a predetermined rule between the base station and the UE.

Such a method is an example of the present disclosure, and the present disclosure is not limited to such an example, but may be extensively applied to methods that may indicate which RS set an RB of a specific index may assume as the QCL reference.

FIG. 23 illustrates examples for the legacy REG, REG bundle, and CCE definitions and REG, REG bundle, and CCE definitions when applying the proposed scheme for the case where the total number of RBs which the base station configures to the UE through the frequency resource configuration within the CORESET configuration is 24 and the number of RS sets which the base station designates to the UE is 2.

In the example of FIG. 23, an REG bundle size may be assumed as 6 and the non-interleaved scheme may be assumed as CCE-to-REG mapping.

FIG. 23(a) illustrates an example for the legacy REG, REG bundle, and CCE definitions and FIG. 23(b) illustrates an example for REG, REG bundle, and CCE definitions according to Proposal #2-2.

According to Proposal #2-2, among the RBs configured to the UE according to the frequency resource configuration within the CORESET configuration, in RB indices #0 to #11, REG, REG bundle, and CCE for RS set #1 may be defined and in RB indices #12 to #23, REG, REG bundle, and CCE for RS set #2 may be defined.

In FIG. 23(b), a PDCCH candidate to assume the QCL reference as RS set #1 may be defined within a range of CCE indices #0 to #3 defined in RB indices #0 to #11 and a PDCCH candidate to assume the QCL reference as RS set #2 may be defined within a range of CCE indices #4 to #7 defined in RB indices #12 to #23.

<Proposal #2-3: When the base station designates multiple RS sets to the UE through the search space configuration, a resource range in which the PDCCH may be transmitted for each RS set may be configured between the base station and the UE.>

For example, the base station may indicate, to the UE, a range of an OFDM symbol index corresponding to each RS set. In this case, REG, REG bundle, and CCE may be defined within the OFDM symbol index range corresponding to each RS set.

In addition, CCE indices of PDCCH candidates for different aggregation levels may be defined within the OFDM symbol index range corresponding to each RS set.

That is, when the base station configures, to the UE, a search space for searching the DCI through RRC signaling, the plurality of RS sets may be configured to the UE through the search space configuration. In this case, the base station may configure a resource range in which the PDCCH may be transmitted for each RS set and the UE may receive the PDCCH within the configured resource range.

In Proposal #2-3, it is assumed that a single TCI state configured in a specific CORESET may include multiple RS sets based on Proposal #1. The method may be regarded as an example for the method for configuring multiple QCL relationships in the specific CORESET configuration. As another method for configuring the multiple QCL relationships in the specific CORESET configuration, a method for configuring multiple TCI states configured by a single RS set in a specific CORESET may be considered. When such a method is applied, Proposal #2-1-1 may be as follows.

When such a method is considered, Proposal #2-1-1 may be described as follows.

When the base station designates multiple TCI states to the UE through the search space configuration, a resource range in which the PDCCH may be transmitted for each TCI state may be configured between the base station and the UE. As an example therefor, the base station may indicate, to the UE, a range of an OFDM symbol index corresponding to each TCI RS set. In this case, REG, REG bundle, and CCE may be defined within the OFDM symbol index range corresponding to each TCI state. In addition, CCE indices of PDCCH candidates for different aggregation levels may be defined within the OFDM symbol index range corresponding to each RS set.

When the above method is applied in order to configure the multiple QCL relationships in the specific CORESET configuration, "a specific RS set of multiple RS sets included in the TCI state configured in the specific CORESET" described below may have the same meaning as "the specific TCI state of multiple TCI states configured in the specific CORESET", and the legacy proposed matter may be used to meet the original purpose.

As described in Proposal #2 above, when the base station designates, to the UE, multiple RS sets through the search space configuration, the UE may expect that as the TCI state configured in the CORESET has multiple RS sets, multiple PDCCHs are transmitted, and as a result, the complexity for the PDCCH BD and complexity for channel estimation increase. In order to prevent the complexity increase, the resource range in which the PDCCH may be transmitted for each RS set may be configured between the base station and the UE. As one of the methods for configuring the resource range, the base station may indicate, to the UE, the range of the OFDM symbol index corresponding to each RS set. As the method for indicating the range of the OFDM symbol index, the following method may be given as an example.

Alt. 1: When the base station designates K RS sets to the UE through the search space configuration and the total number of OFDM symbols which the CORESET configuration included in the corresponding search space configuration has is N, a range of an OFDM symbol index in which a k-th RS set is assumed as the QCL reference may be from $k*\text{floor}(N/K)$ to $(k+1)*\text{floor}(N/K)-1$. As an example, when the base station designates two RS sets to the UE and the total number of OFDM symbols is 2, the UE may assume a range of an OFDM symbol index in which RS set #1 may be assumed as the QCL reference to be #0 and a range of an OFDM symbol index in which RS set #2 may be assumed as the QCL reference to be #1. Such a scheme may be indicated to the UE through explicit signaling by the base station or implicitly indicated through a predetermined rule between the base station and the UE.

Such a method is an example of the present disclosure and does not limit the scope of the present disclosure, and may be applied to all methods for indicating whether which RS set the OFDM symbol of the specific index is to assume as the QCL reference.

The number of OFDM symbols constituting the CORESET may be configured to the UE through duration in ControlResourceSet which is the higher layer parameter for the CORESET configuration. When the proposal is applied, a duration value corresponding to each RS set may be equal to floor(duration/K). In this case, K may be equal to the number of RS sets which the base station designates to the UE.

Figure 24:
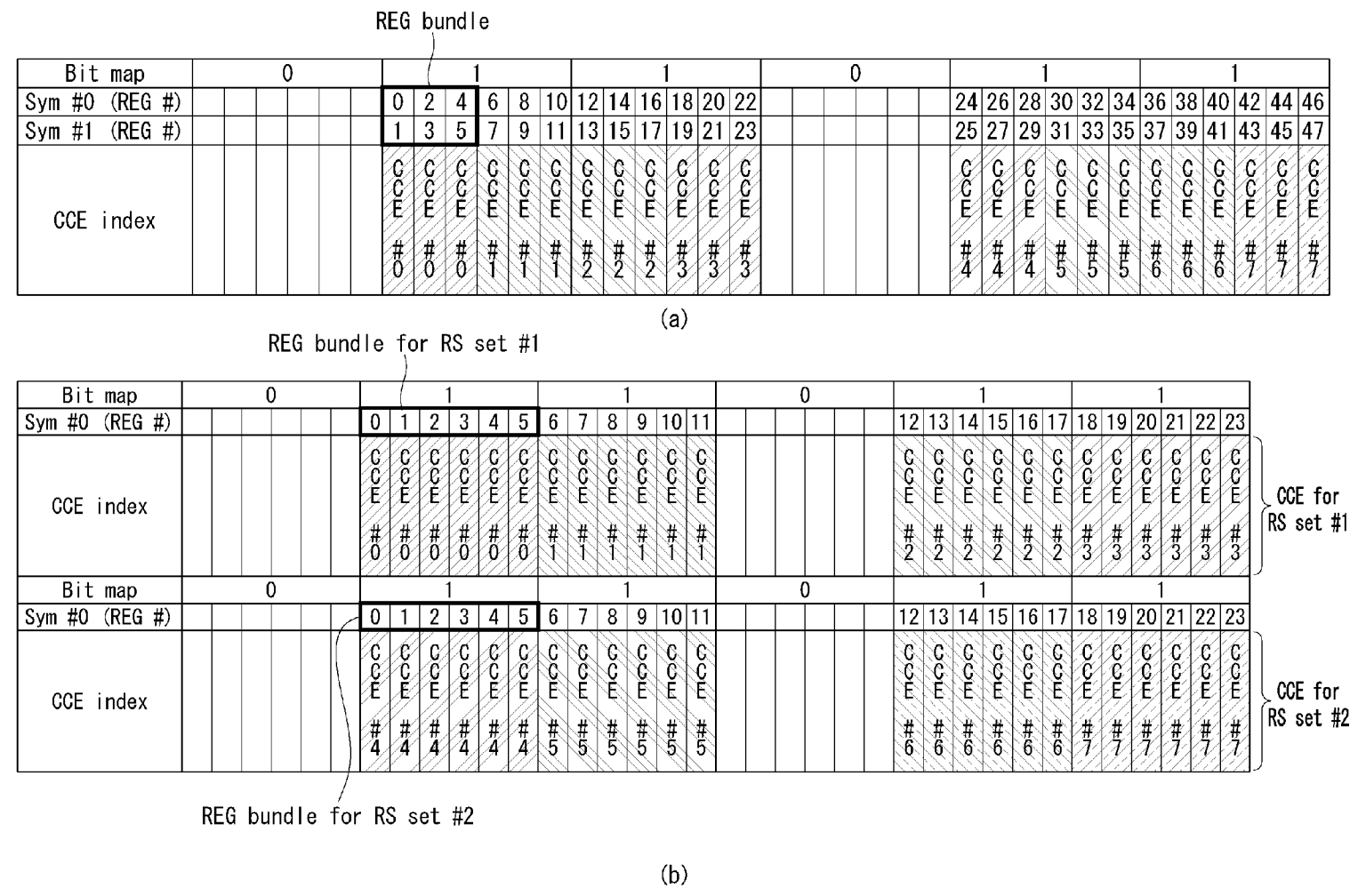

FIG. 24 illustrates another example of REG, REG bundle, and CCE according to an embodiment of the present disclosure.

FIG. 24 illustrates examples for the legacy REG, REG bundle, and CCE definitions, and REG, REG bundle, and CCE definitions when applying the proposed scheme for the case where the duration value is set to 2 in ControlResourceSet, and the number of RS sets which the base station designates to the UE is 2. In the following example, an REG bundle size may be assumed as 6 and the non-interleaved scheme may be assumed as CCE-to-REG mapping.

FIG. 24(a) illustrates an example for the legacy REG, REG bundle, and CCE definitions, and FIG. 24(b) illustrates an example for REG, REG bundle, and CCE definitions according to the proposed scheme. According to the proposed scheme, REG, REG bundle, and CCE for RS set #1 are defined in OFDM symbol #0, and REG, REG bundle, and CCE for RS set #2 are defined in OFDM symbol #1. In an example of FIG. 9-2, a PDCCH candidate to assume the QCL reference as RS set #1 may be defined within a range of CCE indices #0 to #3 defined in OFDM symbol #0 and a PDCCH candidate to assume the QCL reference as RS set #2 may be defined within a range of CCE indices #4 to #7 defined in OFDM symbol #1.

<Proposal 3: When the base station designates multiple RS sets to the UE through the search space configuration, PDCCHs corresponding to different RS sets (this may be interpreted as a meaning that the corresponding RS set may be assumed as the QCL reference) may be simultaneously transmitted to the UE in the same search space.

FIG. 25 illustrates an example of a method for transmitting Ack/Nack for Physical Downlink Shared Channel (PDSCH) scheduled through different TRPs according to an embodiment of the present disclosure.

When PDCCHs corresponding to different RS sets are simultaneously transmitted from different TRPs, panels, and/or beams to the UE in one search space, HARQ information of a PDSCH scheduled by each PDCCH may be simultaneously transmitted from the UE through different PUCCH resources.

In this case, the base station may indicate, to the UE, a PUCCH resource for HARQ information feedback of the PDSCH through the PDCCH for scheduling the corresponding PDSCH.

That is, when a PDCCH for allocating different resources is transmitted from different TRPs to the UE in at least one search space, the UE may receive the PDCCH and then receive each PDSCH scheduled through the PDCCH through different TRPs.

Thereafter, the UE may separately generate HARQ information feedback (or HARQ Ack/Nack codebook) for each PDSCH, for each PDSCH and then transmit the generated HARQ information feedback to each TRP.

In this case, the HARQ information feedback for each PDSCH may be transmitted to each TRP through different resources of the same slot.

In Proposal #3, it is assumed that a single TCI state configured in a specific CORESET may include multiple RS sets based on Proposal #1. The above method may be regarded as an example for the method for configuring multiple QCL relationships in the specific CORESET configuration. As another method for configuring the multiple QCL relationships in the specific CORESET configuration, a method for configuring multiple TCI states configured by a single RS set in a specific CORESET may be considered. When such a method is applied, Proposal #2-1-1 may be as follows.

When the base station designates multiple TCI states to the UE through the search space configuration, PDCCHs corresponding to different TCI states (this may be interpreted as a meaning that the corresponding TCI state may be assumed as the QCL reference) may be simultaneously transmitted to the UE in the same search space.

When PDCCHs corresponding to different TCI states are simultaneously transmitted from different TRPs, panels, and/or beams to the UE in one search space as such, HARQ information of a PDSCH scheduled by each PDCCH may be simultaneously transmitted from the UE through different PUCCH resources.

In this case, the base station may indicate, to the UE, a PUCCH resource for HARQ information feedback of the PDSCH through the PDCCH for scheduling the corresponding PDSCH.

When the above method is applied in order to configure the multiple QCL relationships in the specific CORESET configuration, "a specific RS set of multiple RS sets included in the TCI state configured in the specific CORESET" described below may have the same meaning as "the specific TCI state of multiple TCI states configured in the specific CORESET", and the legacy proposed matter may be used to meet the original purpose.

In Proposal 3, "the case where the PDCCHs corresponding to different RS sets/TCI states are simultaneously transmitted to the UE in one search space" serves to implicitly indicate, to the UE, a situation in which the PDCCH is transmitted from different TRPs, panels, and/or beams.

Further, to which TRP, panel, and/or beam the PDCCH received by the UE corresponds may be implicitly indicated. A condition of the proposal mentioned above may be regarded as an example of a condition for performing the aforementioned function. As another example, the following method may be additionally applied.

PDCCHs for scheduling PDSCHs in different TRPs may correspond to different RNTIs, and when RNTI of the PDCCH for scheduling the PDSCH transmitted to the UE is different, the function of the proposal may be performed.

For example, when PDCCH corresponding to random C-RNTI is referred to as PDCCH #1 and new introduced RNTI for multi-TRP transmission is referred to as MT-RNTI, PDCCH corresponding to random MT-RNTI may be referred to as PDCCH #2.

In addition, PDSCH scheduled by PDCCH #1 may be PDSCH #1 and PDSCH scheduled by PDCCH #2 may be PDSCH #2. In this case, when PDSCH #1 and PDSCH #2 are transmitted to the UE, HARQ information for the corresponding PDSCH may be simultaneously transmitted to different TRPs through different PUCCH resources.

That is, when TRP 1 and TRP 2 are connected through non-ideal backhaul as illustrated in FIG. 25, PDSCH #1 scheduled through PDCCH #1 and PDSCH #2 scheduled through PDCCH #2 may be transmitted to the UE from TRP 1 and TRP 2.

In this case, the UE may separately generate HARQ information, which is Ack/Nack for PDSCH #1 and PDSCH #2, for each of PDSCH #1 and PDSCH #2, and transmit the generated HARQ information to TRP 1 and TRP 2 through different resources.

In this case, respective HARQ information for PDSCH #1 and PDSCH #2 may be transmitted through different resources of one slot, and each Ack or Nack may be transmitted depending on whether the PDSCHs are successfully received.

In this case, the PDCCH corresponding to the C-RNTI means PDCCH using the C-RNTI for CRC masking or scrambling of the DCI. The PDCCH corresponding to the MT-RNTI may mean PDCCH using the MT-RNTI for CRC masking or scrambling of the DCI.

PDSCHs transmitted from different TRPs may have different PDSCH-Config setting values, and when the PDSCH-Config setting value corresponding to the PDSCH received by the UE is different, the function of the proposal may be performed. That is, HARQ information for different PDSCHs may be simultaneously transmitted by using different PUCCH resources.

For example, PDSCH corresponding to first PDSCH-Config may be referred to as PDSCH #1 and PDSCH corresponding to second PDSCH-Config may be referred to as PDSCH #2.

In this case, when PDSCH #1 and PDSCH #2 are transmitted to the UE, HARQ information for the corresponding PDSCH may be simultaneously transmitted to different TRPs through different PUCCH resources.

PDSCHs transmitted from different TRPs may be scheduled from PDCCHs having different PDCCH-Config setting values, and when the PDCCH-Config setting value corresponding to the PDCCH for scheduling the PDSCH is different, the function of the proposal may be performed. That is, HARQ information for different PDSCHs may be simultaneously transmitted by using different PUCCH resources.

For example, PDCCH corresponding to first PDCCH-Config may be referred to as PDCCH #1 and PDCCH corresponding to second PDCCH-Config may be referred to as PDCCH #2. In this case, the PDSCH scheduled by PDCCH #1 may be referred to as PDSCH #1 and the PDSCH scheduled by PDCCH #2 may be referred to as PDSCH #2. In this case, when PDSCH #1 and PDSCH #2 are transmitted to the UE, HARQ information for the corresponding PDSCH may be simultaneously transmitted to different TRPs through different PUCCH resources.

PDSCHs transmitted from different TRPs may be scheduled from PDCCHs of different CORESETs/search spaces, and when CORESETs/search spaces in which the PDCCH is transmitted are different, the function of the proposal may be performed. That is, HARQ information for different PDSCHs may be simultaneously transmitted by using different PUCCH resources.

For example, PDCCH transmitted in CORESET #1 and/or search space #1 may be referred to as PDCCH #1 and PDCCH transmitted in CORESET #2 and/or search space #2 may be referred to as PDCCH #2.

In this case, the PDSCH scheduled by PDCCH #1 may be referred to as PDSCH #1 and the PDSCH scheduled by PDCCH #2 may be referred to as PDSCH #2. In this case, when PDSCH #1 and PDSCH #2 are transmitted to the UE, HARQ information for the corresponding PDSCH may be simultaneously transmitted to different TRPs through different PUCCH resources.

The CORESET and/or search space may be configured as some kind of group. For example, CORESET group #1={CORESET #1, CORSET #2} and CORESET group #2={CORESET #3, CORESET #4} may be configured. Further, search space group #1={search space #1, search space #2} and search space group #2={search space #3, search space #4} may be configured.

In this case, PDCCH transmitted in the CORESET and/or search space included in CORESET group #1 and/or search space group #1 may be referred to as PDCCH #1 and PDCCH transmitted in the CORESET and/or search space included in CORESET group #2 and/or search space group #2 may be referred to as PDCCH #2.

The PDSCH scheduled by PDCCH #1 may be referred to as PDSCH #1 and the PDSCH scheduled by PDCCH #2 may be referred to as PDSCH #2. In this case, when PDSCH #1 and PDSCH #2 are transmitted to the UE, HARQ information for the corresponding PDSCH may be simultaneously transmitted to different TRPs through different PUCCH resources.

Single CORESET may correspond to multiple TCI states.
In this case, the TCI state may be configured as some kind of group. For example, TCI state group #1={TCI state #1, TCI state #2} and TCI state group #2={TCI state #3, TCI state #4} may be configured. In this case, PDCCH corresponding to a TCI state included in TCI state group #1 among multiple TCI states configured in the CORESET may be referred to as PDCCH #1 and PDCCH corresponding to a TCI state included in TCI state group #2 may be referred to as PDCCH #2.

In this case, the PDSCH scheduled by PDCCH #1 may be referred to as PDSCH #1 and the PDSCH scheduled by PDCCH #2 may be referred to as PDSCH #2. In this case, when PDSCH #1 and PDSCH #2 are transmitted to the UE, HARQ information for the corresponding PDSCH may be simultaneously transmitted to different TRPs through different PUCCH resources.

As illustrated in FIG. 25, in a situation of multiple TRPs connected through non-ideal backhaul, there is a disadvantage in that dynamic coordination is difficult between TRPs due to a latency (e.g., 2 ms, 5 ms, 50 ms) due to backhaul.

Therefore, in a situation of multiple TRPs connected through the NIBH, it may be preferred to independently schedule resources in different TRPs in order to support the NCJT. In addition, in order to support this, a multi-PDCCH scheme in which the PDCCH is transmitted in each TRP may be applied.

The multi-PDCCH scheme means a scheme of scheduling different PDSCHs by transmitting independent PDCCH to the UE from different TRPs. For respective PDSCHs scheduled to the UE through PDCCHs transmitted in different TRPs, the UE should transmit, to the base station, HARQ information for each PDSCH. In this case, in the situation of multiple TRPs connected by the NIBH, the UE should be able to transmit the HARQ information for the corresponding PDSCH to the TRP that schedules each PDSCH by considering the BH latency, etc.

Otherwise, when the UE transmits, to specific TRP, HARQ information for all PDSCHs, exchanging the corresponding information between the TRPs is required. In this case, when the backhaul latency between the TRPs is long, the latency occurs during state update of a buffer for an HARQ process in the specific TRP, so buffer efficiency may decrease and a specific buffer may not be used for a long time. Therefore, there may be a limitation in UE scheduling. FIG. 25(a) illustrates an example in which PDSCHs are scheduled to the UE through PDCCHs transmitted in different TRPs and HARQ information for the scheduled PDSCHs are transmitted to one TRP and FIG. 25(b) illustrates an example in which the HARQ information is transmitted to each of different TRPs.

In the related art, when the UE transmits, to the base station, the HARQ information for different PDSCHs through different PUCCH resources as illustrated in FIG. 25(b), if HARQ information feedback timings for different PDSCHs are configured to the UE by the same slot, the UE may be defined to use a PUCCH resource indicated in a last PDCCH in respect to a PUCCH resource to be used for transmitting the HARQ information. In this case, different HARQ information feedbacks may not be transmitted in the same slot.

However, in the case of the present disclosure, the PDCCHs are transmitted through different TRPs in order to prevent the occurrence of the backhaul latency, and when the PDSCH is scheduled through the PDCCH, the UE may individually generate the HARQ information feedback for each PDSCH.

Thereafter, the UE may transmit the individually generated HARQ information feedbacks to respective TRPs through different resources of the same slot.

That is, the base station may classify a plurality of CORESETs into respective groups (e.g. group 1 and group 2). Multiple TRPs may generate PDCCHs for respective CORESET groups according to the CORESET groups, respectively, and transmit the generated PDCCHs to the UE. In this case, the PDCCHs transmitted from the respective TRPs may correspond to different CORESET groups, and indices indicating the groups of the CORESET may be different from each other.

Thereafter, the UE may receive the PDSCH scheduled by the PDCCH from each of multiple TRPs, and generate an HARQ information feedback for the received PDSCH.

In this case, the UE may separately generate each HARQ information feedback according to the group for the CORESET and the HARQ information feedback may be generated by using the index value of the group of the CORESET.

That is, indices of CORESET groups transmitted through higher layer signaling corresponding to the HARQ information feedback may have different values.

The UE may use a dynamic codebook method or a semi-static codebook method, in generating the HARQ information feedback.

Specifically, when the dynamic codebook method is used, the base station may transmit DCI including a downlink assignment indicator (DAI) value for determining an ack or nack value for the HARQ information feedback. When PDSCH corresponding to the DAI value is received, the UE may transmit, to the base station, the HARQ information feedback including ack and when the PDSCH corresponding to the DAI value is not received, the UE may transmit, to the base station, the HARQ information feedback including nack.

When the semi-static codebook is used, the base station may configure, to the UE, a candidate region in which the PDSCH may be transmitted, and when the PDSCH is not received, in a region or a reception occasion in which the PDSCH is transmitted, the UE may transmit, to the base station, the HARQ information feedback including NACK and when the PDSCH is received, the UE may transmit, the base station, the HARQ information feedback including ACK.

The dynamic codebook method or semi-static codebook method may be included in the configuration information transmitted from the base station and transmitted to the UE. For example, when type information included in the configuration information indicates type I, the UE uses the semi-static method and when the type information indicates type II, the UE uses the dynamic method.

When the HARQ information for different PDSCHs is configured to the UE to be transmitted through different resources of the same slot, the UE transmits all HARQ information through the PUCCH resource indicated in the last PDCCH among the PDCCHs for scheduling the PDSCH.

This is the same as transmitting the HARQ information for all PDSCHs transmitted from different TRPs to the same TRP. Therefore, when the TRPs are connected by the NIBH, the problem described above occurs. In order to solve such a problem, in each PDCCH for scheduling the PDSCH, the HARQ information feedback timings may be designated in different slots.

However, in such a case, there is a disadvantage in that a limitation in scheduling freedom degree of each TRP is caused. When different TRPs are connected by the NIBH, the dynamic coordination between the TRPs is difficult, and as a result, it is also difficult to dynamically coordinate the HARQ information feedback timing as such.

The limitation for the HARQ information feedback timing may semi-statically configured between the TRPs, but even in this case, there is the disadvantage in that the limitation in scheduling freedom degree of each TRP is caused.

On the contrary, Proposal 3 has an advantage in that the UE may transmit the HARQ information of the PDSCH scheduled through different PDCCHs by using different PUCCH resources in the same slot.

In this case, the problems related to scheduling freedom degrees of different TRPs may be solved and the UE may transmit the HARQ information to different TRPs. Proposal 3 for simultaneous HARQ information transmission to different TRPs by the UE may be summarized as follows.

The TCI state configured in the specific CORESET may include multiple RS sets. When the TCI state including multiple RS sets is configured in the CORESET, the base station may designate, to the UE, a specific RS set for the TCI state of the corresponding CORESET through the search space configuration including the corresponding CORESET configuration.

When the base station designates, to the UE, multiple RS sets through the search space configuration, multiple PDCCHs to assume different RS sets as the QCL reference in the corresponding search space may be simultaneously transmitted to the UE.

When PDCCHs corresponding to different RS sets are simultaneously transmitted to the UE in one search space, the HARQ information of the PDSCH scheduled by each PDCCH may be simultaneously transmitted from the UE through different PUCCH resources indicated by each PDCCH.

In this case, different PUCCH resources for transmitting the HARQ information may be included in the same slot.

FIG. 26 illustrates an example of a resource for transmitting HARQ Ack/Nack according to an embodiment of the present disclosure.

In NR, when multiple HARQ information should be simultaneously transmitted in the same slot, only one PUCCH resource of multiple PUCCH resources is defined to be used. However, in the present disclosure, multiple specific PUCCH resources may be simultaneously used. FIG. 26 illustrates a difference between the methods.

FIG. 26(a) illustrates an example of using only one PUCCH resource of multiple PUCCH resource when multiple HARQ information should be simultaneously transmitted in the same slot. In FIG. 26(a), PDSCH 1 and PDSCH 2 are scheduled through PDCCH 1 and PDCCH 2, respectively, and when the last PDCCH is assumed as PDCCH 2, HARQ information for both PDSCHs 1 and 2 are together transmitted from the UE through PUCCH resource 2 indicated in PDCCH 2.

On the contrary, FIG. 26(b) illustrates an example in which multiple HARQ information is transmitted through multiple specific PUCCH resources in the same slot. In FIG. 26(b), PDSCH 1 and PDSCH 2 are scheduled through PDCCH 1-1 and PDCCH 1-2, respectively, and PDCCHs 1-1 and 1-2 mean two PDCCHs detected in the same search space and corresponding to different RS sets.

In this case, HARQ information for two PDSCHs may be transmitted on PUCCH resource 1 indicated in PDCCH 1-1 and PUCCH resource 2 indicated in PDCCH 1-2, respectively.

In FIG. 26, contents "PDCCHs 1-1 and 1-2 mean two PDCCHs detected in the same search space and corresponding to different RS sets" may be interpreted differently according to a condition for performing an operation of Proposal 3 based on the contents of the present disclosure described above. For example, the contents may be interpreted as follows.

When PDCCHs for scheduling the PDSCHs transmitted in different TRPs have different RNTIs, For example, when PDCCH corresponding to random C-RNTI is referred to as PDCCH 1-1 and new introduced RNTI for multi-TRP transmission is referred to as MT-RNTI, PDCCH corresponding to random MT-RNTI may be referred to as PDCCH 1-2.

Further, the PDCCH corresponding to the C-RNTI means PDCCH using the C-RNTI for CRC masking or scrambling of the DCI. The PDCCH corresponding to the MT-RNTI may mean PDCCH using the MT-RNTI for CRC masking or scrambling of the DCI.

When the PDSCHs transmitted in different TRPs have different PDSCH-Config setting values, For example, PDSCH corresponding to first PDSCH-Config may be referred to as PDSCH #1 and PDSCH corresponding to second PDSCH-Config may be referred to as PDSCH #2. In this case, the PDCCH for scheduling PDSCH #1 may be referred to as PDCCH 1-1 and the PDCCH for scheduling PDSCH #2 may be referred to as PDCCH 1-2.

When the PDSCHs transmitted in different TRPs are scheduled from the PDCCHs having different PDCCH-Config setting values, For example, PDCCH corresponding to first PDCCH-Config may be referred to as PDCCH 1-1 and PDCCH corresponding to second PDCCH-Config may be referred to as PDCCH 1-2.

When the PDSCHs transmitted in different TRPs are scheduled from the PDCCHs of different CORESETs/search spaces, For example, PDCCH corresponding to CORESET #1/search space #1 may be referred to as PDCCH 1-1 and PDCCH corresponding to CORESET #2/search space #2 may be referred to as PDCCH 1-2.

Further, when the CORESET/search space is configured as some kind of group,

For example, PDCCH transmitted in the CORESET/search space included in CORESET group #1 and/or search space group #1 may be referred to as PDCCH 1-1 and PDCCH transmitted in the CORESET/search space included in CORESET group #2/search space group #2 may be referred to as PDCCH 1-2.

When multiple TCI states may correspond to single CORESET,

For example, PDCCH corresponding to a first TCI state may be referred to as PDCCH 1-1 and PDCCH corresponding to a second TCI state may be referred to as PDCCH 1-2.

Further, when the TCI state is configured as a predetermined group,

For example, PDCCH corresponding to a TCI state included in TCI state group #1 among multiple TCI states configured in the CORESET may be referred to as PDCCH 1-1 and PDCCH corresponding to a TCI state included in TCI state group #2 may be referred to as PDCCH 1-2.

Meanwhile, different PUCCH resources described above may mean PUCCH resources transmitted to different TRPs. Each PUCCH resource may include information on a transmission beam which the UE should use when transmitting the PUCCH by using the corresponding PUCCH resource through the higher layer parameter PUCCH-SpatialRelationInfo. Therefore, the case where the PUCCH resources are different may mean that transmission beams which the UE should use when transmitting the PUCCH are different, and this may mean that TRPs to receive respective PUCCHs are different.

Meanwhile, when HARQ information for multiple PDSCHs is together transmitted in the same slot, an HARQ-ACK codebook may be configured and transmitted through a specific PUCCH resource. Therefore, in addition to the proposal, a method that may configure HARQ-ACK codebooks for multiple PDSCHs transmitted at different timings and transmit the HARQ-ACK codebooks through the same PUCCH resource may be required. FIG. 27 illustrates such an example.

FIG. 27 illustrates another example of a resource for transmitting HARQ Ack/Nack according to an embodiment of the present disclosure.

FIG. 27(a) illustrates an example of configuring the HARA-ACK codebook for the HARQ information transmitted at the same timing and transmitting the HARQ-ACK information together by using one PUCCH resource.

In FIG. 27(a), PDSCH 1/2/3/4/5 is scheduled through PDCCH 1/2/3/4/5, respectively, and when the last PDCCH is assumed to be PDCCH 5, HARQ information for PDSCH 1/2/3/4/5 is constituted as one HARQ-ACK codebook, and together transmitted from the UE through PUCCH resource 5 indicated in PDCCH 5.

On the contrary, FIG. 27(b) illustrates an example of constituting the HARQ information for PDSCH 1/3/4 with one HARQ-ACK codebook and transmitting the HARQ information together through PUCCH resource 3-1 indicated in PDCCH 301 and constituting the HARQ information for PDSCH 2/5 with one HARQ ACK codebook and transmitting the HARQ information together through PUCCH resource 3-2 indicated in PDCCH 3-2.

PUCCHs using PUCCH resource 3-1/3-2 may be transmitted at the same timing. PDCCH 1-1/1-2 and 3-1/3-2 mean two PDCCH combinations detected in the same search space and corresponding to different RS sets. In addition, last PDCCH among PDCCH 1-1/2/3-1 for scheduling PDSCH 1/3/4 is assumed to be PDCCH 3-1 and last PDCCH among PDCCH 1-2/3-2 for scheduling PDSCH 2/5 is assumed to be PDCCH 3-2. In the case of FIG. 12-2, there is an advantage in that the UE may transmit respective HARQ-ACK codebooks to different TRPs by using different PUCCH resources at the same timing.

The method for supporting such an operation will be described in detail in the following proposals.

<Proposal #3-1: In constituting an HARQ-ACK codebook to be transmitted by the UE by using a specific PUCCH resource, in the case of the search space configuration that designates multiple RS sets, HARQ information of the PDSCH scheduled by each PDCCH may be constituted as different HARQ-ACK codebooks according to the corresponding RS set. In addition, each HARQ-ACK codebook may be transmitted from the UE through the specific PUCCH resource. In this case, the specific PUCCH resource may be indicated to the UE through specific PDCCH among PDCCHs for scheduling PDSCHs constituting an HARQ-ACK codebook to be transmitted through the corresponding PUCCH resource.>

In Proposal #3-1, in the case of the search space configuration for designating multiple RS sets, the corresponding RS set may be defined to assume the corresponding RS set as the QCL reference.

In Proposal #3-1, a single TCI state configured in a specific CORESET may include multiple RS sets based on Proposal #1.

The above method may an example for the method for configuring multiple QCL relationships in the specific CORESET configuration. As another method for configuring the multiple QCL relationships in the specific CORESET configuration, a method for configuring multiple TCI states configured by a single RS set in a specific CORESET may be considered. When such a method is applied, Proposal #2-1-1 may be as follows.

> In constituting an HARQ-ACK codebook to be transmitted by the UE by using a specific PUCCH resource, in the case of the search space configuration that designates multiple TCI states, HARQ information of the PDSCH scheduled by each PDCCH may be constituted as different HARQ-ACK codebooks according to the corresponding TCI state (this may be interpreted as a meaning that the corresponding TCI state may be assumed as the QCL reference).

In addition, each HARQ-ACK codebook may be transmitted from the UE through the specific PUCCH resource. In this case, the specific PUCCH resource may be indicated to the UE through specific PDCCH among PDCCHs for scheduling PDSCHs constituting an HARQ-ACK codebook to be transmitted through the corresponding PUCCH resource.

When the above method is applied in order to configure the multiple QCL relationships in the specific CORESET configuration, "a specific RS set of multiple RS sets included in the TCI state configured in the specific CORESET" described below may have the same meaning as "the specific TCI state of multiple TCI states configured in the specific CORESET", and the legacy proposed matter may be used to meet the original purpose.

In Proposal 3-1, the case where "the HARQ information of the PDSCH scheduled by each PDCCH may be constituted as different HARQ-ACK codebooks according to the corresponding RS set" may be regarded as a proposal for constituting different HARQ-ACK codebooks according to the TRP in the situation in which the different PDSCHs are transmitted from different TRPs. In this case, "corresponding RS set" may be used for distinguishing the TRP that transmits the PDSCH received by the UE. For example, PDCCH corresponding to a first RS set may be referred to as PDCCH #1, and the UE may assume that the PDCCH is transmitted from TRP #1. On the contrary, PDCCH corresponding to a second RS set may be referred to as PDCCH #2, and the UE may assume that the PDCCH is transmitted from TRP #2.

A condition of the proposal mentioned above may be regarded as an example of a condition for performing the aforementioned function. As another example, the following method may be additionally applied.

> PDCCHs for scheduling PDSCHs in different TRPs may correspond to different RNTIs, and different HARQ-ACK codebooks may be constituted according to RNTI of the PDCCH for scheduling the PDSCH transmitted to the UE.

For example, when PDCCH corresponding to random C-RNTI is referred to as PDCCH #1 and new introduced RNTI for multi-TRP transmission is referred to as MT-RNTI, PDCCH corresponding to random MT-RNTI may be referred to as PDCCH #2. In addition, HARQ information for PDSCHs scheduled by PDCCH #1 is bundled and constituted as one codebook and HARQ information for PDSCHs scheduled by PDCCH #2 is bundled and constituted as one codebook.

> The PDCCH corresponding to the C-RNTI means PDCCH using the C-RNTI for CRC masking or scrambling of the DCI. The PDCCH corresponding to the MT-RNTI means PDCCH using the MT-RNTI for CRC masking or scrambling of the DCI.
> PDSCHs transmitted from different TRPs may have different PDSCH-Config setting values, and different HARQ-ACK codebooks may be constituted according to PDSCH-Config corresponding to the PDSCH.

For example, HARQ information for PDSCHs corresponding to first PDSCH-Config is bundled and constituted as one codebook and HARQ information for PDSCHs corresponding to second PDSCH-Config is bundled and constituted as one codebook.

> PDCCHs transmitted from different TRPs may have different PDCCH-Config setting values, and different HARQ-ACK codebooks may be constituted according to PDCCH-Config corresponding to PDCCH for scheduling the PDSCH.

For example, HARQ information for PDSCHs scheduled by PDCCH corresponding to first PDCCH-Config is bundled and constituted as one codebook and HARQ information for PDSCHs scheduled by PDCCH corresponding to second PDSCH-Config is bundled and constituted as one codebook.

> The PDSCHs transmitted from different TRPs may be scheduled from PDCCHs of different CORESETs/search spaces, and different HARQ-ACK codebooks may be constituted according to CORESET/search space corresponding to the PDCCH for scheduling the PDSCH.

For example, HARQ information for PDSCHs scheduled by PDCCH corresponding to CORESET #1/search space #1 is bundled and constituted as one codebook and HARQ information for PDSCHs scheduled by PDCCH corresponding to CORESET #2/search space #2 is bundled and constituted as one codebook.

> The CORESET and/or search space may be configured as a predetermined group. In this case, different HARQ-ACK codebooks may be constituted according to CORESET group/search space group corresponding to CORESET/search space corresponding to the PDCCH for scheduling the PDSCH.

For example, HARQ information for PDSCHs scheduled by PDCCH corresponding to CORESET/search space included in CORESET group #1/search space group #1 is bundled and constituted as one codebook and HARQ information for PDSCHs scheduled by PDCCH corresponding to CORESET/search space included in CORESET group #2/search space group #2 is bundled and constituted as one codebook.

> Multiple TCI states may correspond to single CORESET and the TCI state may be configured as a predetermined group. In this case, different HARQ-ACK codebooks may be constituted according to a TCI state group corresponding to a TCI state corresponding to the PDCCH for scheduling the PDSCH.

For example, TCI state group #1={TCI state #1, TCI state #2} and TCI state group #2={TCI state #3, TCI state #4} may be configured. In this case, HARQ information for PDSCHs scheduled by PDCCH corresponding to a TCI state included in TCI state group #1 among multiple TCI states configured in CORESET is bundled and constituted as one codebook and HARQ information for PDSCHs scheduled by PDCCH corresponding to a TCI state included in TCI state group #2 among multiple TCI states configured in CORESET is bundled and constituted as one codebook.

FIG. 28 illustrates an example of a method for configuring a resource for transmitting HARQ Ack/Nack through a configuration of a search space according to an embodiment of the present disclosure.

FIG. 28 illustrates an example of Proposal #3-1 and in FIG. 22, the PDSCH may be transmitted in the same slot as the PDCCH for scheduling the corresponding PDSCH. For example, PDSCH 1 is scheduled to the UE through PDCCH 1-1 transmitted in the same slot, and PDCCH 1-1 corresponds to RS set 1 designated through search space 1 configuration that designates multiple RS sets.

As in the above example, HARQ information for PDSCH scheduled from PDCCH corresponding to a first RS set among PDCCHs transmitted in the search space configuration that designates multiple RS sets and HARQ information for PDSCH scheduled from PDCCH transmitted in search space configuration that designates one RS set may be constituted as one HARQ-ACK codebook corresponding to HARQ-ACK codebook 1 in FIG. 28.

Meanwhile, HARQ information for PDSCH scheduled from PDCCH corresponding to a second RS set among PDCCHs transmitted in the search space configuration that designates multiple RS sets may be constituted as another HARQ-ACK codebook corresponding to HARQ-ACK codebook 2 in FIG. 28.

Codebook 1 and codebook 2 above may be transmitted through different PUCCH resources in the same slot. The PUCCH resource that transmits codebook 1 may use a PUCCH resource indicated by a last PDCCH among PDCCHs for scheduling PDSCHs constituting codebook 1. This may be similarly applied even to the case of codebook 2.

A large difference from the legacy HARQ-ACK codebook generating scheme which may be verified in the above example is as follows. In the legacy scheme, the HARQ information which the UE is to transmit to the base station at the same timing is constituted as one codebook to be transmitted through one PUCCH resource.

On the contrary, in the above example adopting the proposed scheme, the HARQ information which the UE is to transmit to the base station at the same timing is separated according to the RS set corresponding to the PDCCH for scheduling the PDSCH and constituted as different codebooks. In addition, the UE may transmit different HARQ-ACK codebooks through different PUCCH resources at the same timing.

Meanwhile, the proposed scheme adopts the legacy HARQ-ACK codebook generating scheme and the legacy PUCCH resource selecting scheme, however, it may be interpreted that HARQ information for PDSCHs scheduled by specific PDCCH among PDCCHs transmitted in a specific search space is constituted as separated HARQ-ACK codebooks and transmitted through separated PUCCH resources.

The specific search space may mean a search space that designates multiple RS sets, and the specific PDCCH may mean PDCCH corresponding to an RS set other than the first RS set. In other words, the above example is the same as a case where separate HARQ-ACK codebooks may generated for PDSCHs scheduled by PDCCHs corresponding to the RS sets other than the first RS set among the PDCCHs in the search space that designates multiple RS sets, and the HARQ-ACK codebook may be transmitted through a specific PUCCH resource among the PUCCH resources indicated by the corresponding PDCCHs, e.g., the last indicated PUCCH resource.

Meanwhile, in the above example, it is proposed that the HARQ information may be constituted as different codebooks according to the RS set corresponding to the PDCCH, and it is assumed that the HARQ information is distinguished according to the order of the RS set which the base station configures to the UE through the search space configuration or CORESET configuration. The above-described contents are an example for applying the proposal, and the present disclosure is not limited to the above matter, similar schemes, i.e., all methods that may constitute the HARQ information of the PDSCHs scheduled by different PDCCHs as different codebooks according to the RS set corresponding to the PDCCH, and transmit the HARQ information through different PUCCH resources at the same timing are available.

For example, in order to distinguish an RS set which becomes a reference for codebook generation and PUCCH resource selection, the base station may indicate, to the UE, DL RS groups including multiple DL RS. HARQ-ACK codebooks for PDSCHs scheduled by PDCCH corresponding to an RS set included in DL RS group 1 and PDCCH corresponding to an RS set included in DL RS group 2 may be separated from each other, and each codebook may be transmitted from the UE through different PUCCH resources.

Meanwhile, as a specific matter for the operation of the proposal, the following operation may be considered. The scheme of constituting the HARQ-ACK codebook includes Type 1 (semi-static) scheme and Type 2 (flexible) scheme.

First, the case of Type 1 will be described below in brief. A codebook (a set of HARQ information bits) is defined for one or one or more candidate PDSCH reception capable of transmitting PUCCH/PUSCHO⁰‖ HARQ-ACK information to be transmitted in a specific slot (e.g., slot #n). Even when actual PDSCH transmission not performed, a bit(s) for the corresponding PDSCH reception may be defined within the HARQ-ACK codebook.

When the UE recognizes that the PDSCH transmission is not transmitted as described above (including a case where PDCCH detection is unsuccessful), the NACK is defined to be transmitted. That is, FIG. 29 illustrates an example Type 1 scheme described above. For convenience of description, a single cell, non-Codeblock group (CBG) based transmission, and Maximum 1 Codeword are assumed.

FIG. 29 illustrates an example of a method for transmitting HARQ Ack/Nack according to an embodiment of the present disclosure.

In FIG. 29, the UE may know that a PDSCH reception timing at which the HARQ-ACK codebook at a timing m may be located earlier than the timing m by slots 1, 2, 3, and 4. In addition, the HARQ-ACK codebook is constituted based on the corresponding information.

In the example of the above figure, the PDSCH is transmitted to the UE before slots 1, 2, and 4, and the PDSCH is not transmitted before slot 3. The may transmit ACK or NACK according to whether to receive the PDSCH before slots 1, 2, and 4 and transmit NACK meaning that the PDSCH is not received before slot 3. As such, Type 1 codebook is defined to constitute the HARQ-ACK codebook based on a PDSCH receivable timing semi-statically defined based on the timing when the HARQ-ACK is transmitted.

Meanwhile, the following matter may be considered in the legacy Type 1 codebook generating scheme in order to apply the proposal of the present disclosure. In the present disclosure, the PDSCHs transmitted from different TRPs in the same slot may be simultaneously transmitted. The PDSCH may correspond to an index by using a predetermined rule.

For example, in the present disclosure, the TCI state may include two or more RS sets in one CORESET configuration, and multiple RS sets may be designated through the search space configuration. When multiple RS sets are designated as such, resource regions may be distinguished within the CORESET so as to correspond to different RS sets. In this case, when the UE succeeds in PDCCH decoding, the UE may know which RS set the corresponding PDCCH corresponds to.

Through this, PDCCH of which decoding is successful in a specific search space may correspond to a specific index. For example, PDCCH to assume the first RS set as the QCL reference may be referred to as PDCCH 1 and PDCCH to assume the second RS set as the QCL reference may be referred to as PDCCH 2. When the index may correspond to the PDCCH as such, a specific index may correspond to the PDSCH by using the PDCCH index.

For example, PDSCH scheduled by PDCCH 1 may be PDSCH 1 and PDSCH scheduled by PDCCH 2 may be PDSCH 2. When specific indices correspond to different PDSCHs simultaneously transmitted to the UE as such, the HARQ-ACK codebook may be specified to be constituted only for PDSCHs corresponding to the same index. The following figure illustrates an example of applying the proposal. The example of the following figure shows that different HARQ-ACK codebooks may be constituted according to the PDSCH index. In the above description, for convenience of description, the single cell, the non-Codeblock group (CBG) based transmission, and the Maximum 1 Codeword are assumed, but proposed technology is applicable even when the assumption is not performed.

FIGS. 30 to 23 which are examples of type 3 scheme illustrate another example of a method for configuring a resource for transmitting HARQ Ack/Nack according to an embodiment of the present disclosure.

In the case of Type-2 codebook, a codebook to transmit the HARQ-ACK information to the same PUCCH/PUSCH is defined based on a counter downlink assignment indicator (C-DAI) and/or total downlink assignment indicator (T-DAI) value indicated in actually transmitted PUCCH.

That is, the codebook is constituted based on PDCCH information actually transmitted to the UE. When the UE fails to specific PDCCH detection, the UE transmits NACK to a bit for the corresponding PDCCH among bits defined within the codebook.

In this case, the UE may recognize whether PDCCH detection is unsuccessful through the C-DAI/T-DAI value. In FIG. 30, for convenience of description, the single cell, the non-Codeblock group (CBG) based transmission, and the Maximum 1 Codeword are assumed.

In FIG. 31, the UE may constitute the HARQ-ACK codebook based on the c-DAI value indicated through the DCI. ACK/NACK may be transmitted according to whether receiving PDSCH scheduled by each DCI indicating c-DAI=0, 1, 2 is successful, and when receiving specific DCI among three DCIs is unsuccessful, the UE may implicitly recognize that there is PDSCH which may not be received through a feature that c-DAI sequentially increases.

In this case, the UE is specified to transmit NACK to the base station for the corresponding PDSCH.

Meanwhile, the following matter may be considered in the legacy Type 2 codebook generating scheme in order to apply the proposal of the present disclosure. The UE may count the c-DAI/t-DAI value only for the PDCCH corresponding to the same index according to the PDCCH index when counting the c-DAI/t-DAI value.

In this case, the PDCCH index may be specified in the same manner as the proposal described in the Type 1 codebook generating scheme. That is, the PDCCH index may correspond to the index of the RS set. For example, in the present disclosure, the TCI state may include two or more RS sets in one CORESET configuration, and multiple RS sets may be designated through the search space configuration.

When multiple RS sets are designated as such, resource regions may be distinguished within the CORESET so as to correspond to different RS sets. In this case, when the UE succeeds in PDCCH decoding, the UE may know which RS set the corresponding PDCCH corresponds to. Through this, PDCCH of which decoding is successful in a specific search space may correspond to a specific index.

For example, PDCCH to assume the first RS set as the QCL reference may be referred to as PDCCH 1 and PDCCH to assume the second RS set as the QCL reference may be referred to as PDCCH 2. Therefore, in the case of the UE configured with Type 2 codebook, the HARQ-ACK codebook may be constitute by counting c-DAI/t-DAI for each of PDCCHs of different indices.

FIG. 32 illustrates an example to which such a method is applied. FIG. 32 illustrates that counting of c-DAI/t-DAI may be performed according to the PDCCH index, and different HARQ-ACK codebooks may be constituted. In the above description, for convenience of description, the single cell, the non-Codeblock group (CBG) based transmission, and the Maximum 1 Codeword are assumed, but proposed technology is applicable even when the assumption is not performed.

In FIG. 32, the index of the PDSCH may be constituted in the same manner as in the example of Type 1.

In respect to the Type 2 codebook generating scheme, a value which becomes a reference when the UE counts the c-DAI/t-DAI is expressed as "PDCCH index". In this case, as a method for mapping specific PDCCH to a predetermined index, the methods for distinguishing the TRPs may be applied as described in Proposal #3-1. That is, the UE may distinguish the TRP in which the corresponding PDSCH for the PDSCH received based on specific information, and count the c-DAI/t-DAI value only within PDCCH for scheduling PDSCH regarded to be transmitted in the same TRP. An example therefore is as follows.

When PDCCHs for scheduling the PDSCHs transmitted in different TRPs correspond to different RNTIs For example, when PDCCH corresponding to random C-RNTI is referred to as PDCCH #1 and new introduced RNTI for multi-TRP transmission is referred to as MT-RNTI, PDCCH corresponding to random MT-RNTI may be referred to as PDCCH #2. In this case, the c-DAI/t-DAI value is counted only within PDCCH #1 and the c-DAI/t-DAI value is counted only within PDCCH #2.

The PDCCH corresponding to the C-RNTI means PDCCH using the C-RNTI for CRC masking or scrambling of the DCI. The PDCCH corresponding to the MT-RNTI means PDCCH using the MT-RNTI for CRC masking or scrambling of the DCI.

When the PDSCHs transmitted in different TRPs have different PDSCH-Config setting values For example, PDSCH corresponding to first PDSCH-Config may be referred to as PDSCH #1 and PDSCH corresponding to second PDSCH-Config may be referred to as PDSCH #2. In this case, the PDCCH for scheduling PDSCH #1 may be referred to as PDCCH #1 and the PDCCH for scheduling PDSCH #2 may be referred to as PDCCH #2. In this case, the c-DAI/t-DAI value is counted only within PDCCH #1 and the c-DAI/t-DAI value is counted only within PDCCH #2.

When the PDSCHs transmitted in different TRPs are scheduled from the PDCCHs having different PDCCH-Config setting values For example, PDCCH corresponding to first PDCCH-Config may be referred to as PDCCH #1 and PDCCH corresponding to second PDCCH-Config may be referred to as PDCCH #2. In this case, the c-DAI/t-DAI value is counted only within PDCCH #1 and the c-DAI/t-DAI value is counted only within PDCCH #2.

When the PDSCHs transmitted in different TRPs are scheduled from the PDCCHs of different CORESETs/search spaces For example, PDCCH corresponding to CORESET #1/search space #1 may be referred to as PDCCH #1 and PDCCH corresponding to CORESET #2/search space #2 may be referred to as PDCCH #2. In this case, the c-DAI/t-DAI value is counted only within PDCCH #1 and the c-DAI/t-DAI value is counted only within PDCCH #2.

When the CORESET/search space is configured as a predetermined group

For example, PDCCH transmitted in the CORESET/search space included in CORESET group #1 and/or search space group #1 may be referred to as PDCCH #1 and PDCCH transmitted in the CORESET/search space included in CORESET group #2/search space group #2 may be referred to as PDCCH #2. In this case, the c-DAI/t-DAI value is counted only within PDCCH #1 and the c-DAI/t-DAI value is counted only within PDCCH #2.

When multiple TCI states may correspond to single CORESET

For example, PDCCH corresponding to a first TCI state may be referred to as PDCCH #1 and PDCCH corresponding to a second TCI state may be referred to as PDCCH #2. In this case, the c-DAI/t-DAI value is counted only within PDCCH #1 and the c-DAI/t-DAI value is counted only within PDCCH #2.

When the TCI state is configured as a predetermined group,

For example, PDCCH corresponding to a TCI state included in TCI state group #1 among multiple TCI states configured in the CORESET may be referred to as PDCCH #1 and PDCCH corresponding to a TCI state included in TCI state group #2 may be referred to as PDCCH #2. In this case, the c-DAI/t-DAI value is counted only within PDCCH #1 and the c-DAI/t-DAI value is counted only within PDCCH #2.

Meanwhile, when the base station indicates, to the UE, a PUCCH resource for HARQ-ACK codebook transmission, a PUCCH resource set may be determined according to a payload size and a specific PUCCH resource within the PUCCH resource set may be indicated through a specific field within the DCI. In the above proposal, it is described that when the HARQ-ACK codebook is constituted, different codebooks may be constituted according to the TRP that transmits the PDSCH. Even when the base station indicates, to the UE, the PUCCH resource set/PUCCH resource, a method for defining the PUCCH resource set/PUCCH resource for each TRP transmitting the PDSCH may be together considered.

That is, a PUCCH resource set/PUCCH resource for TRP #1 and a PUCCH resource set/PUCCH resource for TRP #2 may be separately defined. Since the PUCCH resource corresponding to each TRP should be able to be transmitted in the same slot, a random PUCCH resource among PUCCH resource candidates of TRP #1 and a random PUCCH resource among PUCCH resource candidates of TRP #2 should be able to be TDMed with each other at an OFDM symbol level in one slot.

To this end, both TRPs configure PUCCH resources that satisfy a TDM condition at the OFDM symbol level through a backhaul link. The UE does not expect to be configured to transmit the PUCCH resource of TRP #1 and the PUCHH resource of TRP #2 in the same OFDM symbol.

A PUCCH resource to be actually for transmission may be selected to correspond to the TRP that constitutes the HARQ-ACK codebook. In this case, since the PUCCH resource set/PUCCH resource may be defined for each TRP, there is an advantage in that a lot of PUCCH resources for each TRP may be configured. A detailed embodiment is as follows.

When PDCCHs for scheduling the PDSCHs transmitted in different TRPs correspond to different RNTIs For example, when PDCCH corresponding to random C-RNTI defined in a current standard is referred to as PDCCH #1 and new introduced RNTI for multi-TRP transmission is referred to as MT-RNTI, PDCCH corresponding to random MT-RNTI may be referred to as PDCCH #2.

In this case, a PUCCH resource set/PUCCH resource indicated by PDCCH #1 and a PUCCH resource set/PUCCH resource indicated by PDCCH #2 may be different from each other, and each of candidates which may be indicated through PDCCH #1/#2 may be configured to the UE through the higher layer signaling, etc.

The UE transmits the PUCCH through the indicated PUCCH resource among the PUCCH resource set/PUCCH resource candidates corresponding to the corresponding index according to the index of the PDCCH for scheduling the PDSCH.

The PDCCH corresponding to the C-RNTI means PDCCH using the C-RNTI for CRC masking or scrambling of the DCI. The PDCCH corresponding to the MT-RNTI means PDCCH using the MT-RNTI for CRC masking or scrambling of the DCI.

When the PDSCHs transmitted in different TRPs have different PDSCH-Config setting values For example, PDSCH corresponding to first PDSCH-Config may be referred to as PDSCH #1 and PDSCH corresponding to second PDSCH-Config may be referred to as PDSCH #2. In this case, the PDCCH for scheduling PDSCH #1 may be referred to as PDCCH #1 and the PDCCH for scheduling PDSCH #2 may be referred to as PDCCH #2. In this case, a PUCCH resource set/PUCCH resource indicated by PDCCH #1 and a PUCCH resource set/PUCCH resource indicated by PDCCH #2 may be different from each other, and each of candidates which may be indicated through PDCCH #1/#2 may be configured to the UE through the higher layer signaling, etc.

The UE transmits the PUCCH through the indicated PUCCH resource among the PUCCH resource set/PUCCH resource candidates corresponding to the corresponding index according to the index of the PDCCH for scheduling the PDSCH.

When the PDSCHs transmitted in different TRPs are scheduled from the PDCCHs having different PDCCH-Config setting values For example, PDCCH corresponding to first PDCCH-Config may be referred to as PDCCH #1 and PDCCH corresponding to second PDCCH-Config may be referred to as PDCCH #2. In this case, a PUCCH resource set/PUCCH resource indicated by PDCCH #1 and a PUCCH resource set/PUCCH resource indicated by PDCCH #2 may be different from each other, and each of candidates which may be indicated through PDCCH #1/#2 may be configured to the UE through the higher layer signaling, etc.

The UE transmits the PUCCH through the indicated PUCCH resource among the PUCCH resource set/PUCCH resource candidates corresponding to the corresponding index according to the index of the PDCCH for scheduling the PDSCH.

When the PDSCHs transmitted in different TRPs are scheduled from the PDCCHs of different CORESETs/search spaces For example, PDCCH corresponding to CORESET #1/search space #1 may be referred to as PDCCH #1 and PDCCH corresponding to CORESET #2/search space #2 may be referred to as PDCCH #2. In this case, a PUCCH resource set/PUCCH resource indicated by PDCCH #1 and a PUCCH resource set/PUCCH resource indicated by PDCCH #2 may be different from each other, and each of candidates which may be indicated through PDCCH #1/#2 may be configured to the UE through the higher layer signaling, etc.

The UE transmits the PUCCH through the indicated PUCCH resource among the PUCCH resource set/PUCCH resource candidates corresponding to the corresponding index according to the index of the PDCCH for scheduling the PDSCH.

When the CORESET/search space is configured as a predetermined group

For example, PDCCH transmitted in the CORESET/search space included in CORESET group #1 and/or search space group #1 may be referred to as PDCCH #1 and PDCCH transmitted in the CORESET/search space included in CORESET group #2/search space group #2 may be referred to as PDCCH #2. In this case, a PUCCH resource set/PUCCH resource indicated by PDCCH #1 and a PUCCH resource set/PUCCH resource indicated by PDCCH #2 may be different from each other, and each of candidates which may be indicated through PDCCH #1/#2 may be configured to the UE through the higher layer signaling, etc.

The UE transmits the PUCCH through the indicated PUCCH resource among the PUCCH resource set/PUCCH resource candidates corresponding to the corresponding index according to the index of the PDCCH for scheduling the PDSCH.

When multiple TCI states may correspond to single CORESET,

For example, PDCCH corresponding to a first TCI state may be referred to as PDCCH #1 and PDCCH corresponding to a second TCI state may be referred to as PDCCH #2. In this case, a PUCCH resource set/PUCCH resource indicated by PDCCH #1 and a PUCCH resource set/PUCCH resource indicated by PDCCH #2 may be different from each other, and each of candidates which may be indicated through PDCCH #1/#2 may be configured to the UE through the higher layer signaling, etc. The UE transmits the PUCCH through the indicated PUCCH resource among the PUCCH resource set/PUCCH resource candidates corresponding to the corresponding index according to the index of the PDCCH for scheduling the PDSCH.

When the TCI state is configured as a predetermined group,

For example, PDCCH corresponding to a TCI state included in TCI state group #1 among multiple TCI states configured in the CORESET may be referred to as PDCCH #1 and PDCCH corresponding to a TCI state included in TCI state group #2 may be referred to as PDCCH #2.

In this case, a PUCCH resource set/PUCCH resource indicated by PDCCH #1 and a PUCCH resource set/PUCCH resource indicated by PDCCH #2 may be different from each other, and each of candidates which may be indicated through PDCCH #1/#2 may be configured to the UE through the higher layer signaling, etc.

The UE transmits the PUCCH through the indicated PUCCH resource among the PUCCH resource set/PUCCH resource candidates corresponding to the corresponding index according to the index of the PDCCH for scheduling the PDSCH.

Meanwhile, as in the above proposal, when a PUCCH resource set/PUCCH resource for TRP #1 and a PUCCH resource set/PUCCH resource for TRP #2 are separately defined, the following scheme may be together considered. At present, a transmission beam used by the UE when transmitting the PUCCH may be configured for each PUCCH resource through the MAC-CE operation.

Table 12 below shows an example of PUCCH configuration information (PUCCH-Config) for configuring the PUCCH.

```
PUCCH-Config
PUCCH-Config ::=                        SEQUENCE {
    resourceSetToAddModList                 SEQUENCE (SIZE (1...maxNrofPUCCH-ResourceSets)) OF
PUCCH-ResourceSet
    resourceSetToReleaseList                SEQUENCE (SIZE (1..maxNrofPUCCH-ResourceSets)) OF PUCCH-
ResourceSetId
    resourceToAddModList                    SEQUENCE (SIZE (1..maxNrofPUCCH-Resources)) OF PUCCH-
Resource
    resourceToReleaseList                   SEQUENCE (SIZE (1..maxNrofPUCCH-Resources)) OF PUCCH-
ResourceId
        format1                             SetupRelease { PUCCH-FormatConfig }
        format2                             SetupRelease { PUCCH-FormatConfig }
        format3                             SetupRelease { PUCCH-FormatConfig }
        format4                             SetupRelease { PUCCH-FormatConfig }
    schedulingRequestResourceToAddModList       SEQUENCE   (SIZE   (1..maxNrofSR-Resources))   OF
SchedulingRequestResourceConfig
    schedulingRequestResourceToReleaseList      SEQUENCE (SIZE (1..maxNrofSR-Resources))   OF
SchedulingRequestResourceId
    multi-CSI-PUCCH-ResourceList            SEQUENCE (SIZE (1..2)) OF PUCCH-ResourceId
    dl-DataToUL-ACK                         SEQUENCE (SIZE (1..8)) OF INTEGER (0..15)
    spatialRelationInfoToAddModList         SEQUENCE (SIZE (1..maxNrofSpatialRelationInfos)) OF PUCCH-
SpatialRelationInfo OPTIONAL, -- Need N
    spatialRelationInfoToReleaseList        SEQUENCE (SIZE (1..maxNrofSpatialRelationInfos)) OF PUCCH-
SpatialRelationInfoId
    pucch-PowerControl                                                  PUCCH-PowerControl
OPTIONAL, --Need M
    ...
}
PUCCH-FormatConfig ::=                  SEQUENCE {
```

```
    interslotFrequencyHopping           ENUMERATED {enabled}
    additionalDMRS                      ENUMERATED {true}
    maxCodeRate                         PUCCH-MaxCodeRate
    nrofSlots                           ENUMERATED {n2,n4,n8}
    pi2BPSK                             ENUMERATED {enabled}
    simultaneousHARQ-ACK-CSI            ENUMERATED {true}
}
PUCCH-MaxCodeRate ::=                   ENUMERATED {zeroDot08, zeroDot15, zeroDot25, zeroDot35,
zeroDot45, zeroDot60, zeroDot80}
-- A set with one or more PUCCH resources
PUCCH-resourceSet ::=                   SEQUENCE {
    pucch-ResourceSetId                 PUCCH-ResourceSetId.
    resourceList                        SEQUENCE (SIZE (1..maxNrofPUCCH-ResourcesPerSet)) OF PUCCH-
ResourceId,
    maxPayloadMinus1                    INTEGER (4..256)
}
PUCCH-ResourceSetId ::=                 INTEGER (0..maxNrofPUCCH-ResourceSets-1)
PUCCH-Resource ::=                      SEQUENCE {
    pucch-ResourceId                    PUCCH-ResourceId,
    startingPRB                         PRB-Id,
    intraSlotFrequencyHopping           ENUMERATED { enabled }
    secondHopPRB                        PRB-Id
    format                              CHOICE {
        format0                             PUCCH-format0,
        format1                             PUCCH-format1,
        format2                             PUCCH-format2,
        format3                             PUCCH-format3,
        format4                             PUCCH-format4,
    }
}
PUCCH-ResourceId ::=                    INTEGER (0..maxNrofPUCCH-Resources-1)
PUCCH-format0 ::=                       SEQUENCE {
    initialCyclicShift                  INTEGER(0.11),
    nrofSymbols                         INTEGER (1..2),
    startingSymbolIndex                 INTEGER(0..13)
}
PUCCH-format1 ::=                       SEQUENCE {
    initialCyclicShift                  INTEGER(0.11),
    nrofSymbols                         INTEGER (4..14),
    startingSymbolIndex                 INTEGER(0..10),
    timeDomainOCC                       INTEGER(0..6)
}
PUCCH-format2 ::=                       SEQUENCE {
    nrofPRBs                            INTEGER (1..16),
    nrofSymbols                         INTEGER (1..2),
    startingSymbolIndex                 INTEGER (1..13)
}
PUCCH-format3 ::=                       SEQUENCE {
    nrofPRBs                            INTEGER (1..16),
    nrofSymbols                         INTEGER (4..14),
    startingSymbolIndex                 INTEGER (0..10)
}
PUCCH-format4 ::=                       SEQUENCE {
    nrofSymbols                         INTEGER (4..14),
    occ-Length                          ENUMERATED {n2,n4},
    occ-Index                           ENUMERATED {n0,n1,n2,n3}
    startingSymbolIndex                 INTEGER(0..10)
}
```

PUCCH Spatial Relation Activation/Deactivation MAC CE

FIG. 33 illustrates an example of PUSCH spatial relationship activation/deactivation MAC CE.

Referring to FIG. 33, a PUCCH spatial relation activation/deactivation MAC CE is identified by an MAC PDU sub header having LCID. A fixed size of the following field is 24 bits.

Serving cell ID: This field represents ID of a serving cell to which MAC CE is applied. A length of the field is 5 bits.

BWP ID: This field represents UL BWP in which the MAC CE is applied to a codepoint of a DCI bandwidth part indicator field. The length of a BWP ID field is 2 bits.

PUCCH resource ID: This field includes an identifier of PUCCH resource ID identified by PUCCH-ResourceId. The length of the field is 7 bits.

Si: When there is PUCCH spatial relationship information having PUCCH-SpatialRelationInfold I constituted for an uplink bandwidth part displayed with a BWP ID field, Si represents an activation state of the PUCCH spatial relation information using the PUCCH. Otherwise, an MAC entity disregards the field, SpatialRelationInfold i. A field of Si is set to "1" in order to indicate that the PUCCH spatial relation information having PUCCH-SpatialRelationInfold i should be activated.

The field of Si is set to "0" in order to indicate that the PUCCH spatial relation information having PUCCH-SpatialRelationInfold i should be deactivated. Only one PUCCH spatial relation information may be activated for the PUCCH resource at one time.

For example, when there are 10 PUCCH resources, 10 MAC-CE operations are required in order to change transmission beams for the UE for 10 PUCCH resources.

When the number of PUCCH resources is large, the MAC-CE operation is required for each of different PUCCH resources, and as a result, there is a disadvantage in that signaling overhead for changing the transmission beam of the UE and a delay for a beam change is lengthened.

In order to supplement such a disadvantage, a method that may change the transmission beams of the UE may be applied to a predetermined PUCCH resource set constituted by all PUCCH resources configured to the UE or some PUCCH resources among all PUCCH resources.

For example, in a current MAC-CE operation, a specific transmission beam may be defined to be applied to specific serving cell ID, specific BWP ID, and specific PUCCH resource ID, and for application of the proposal, when a specific value promised between the base station and the UE is indicated in a field for indicating the PUCCH resource ID, transmission beam configurations for all PUCCH resources configured to the UE may be defined to be changed together. Meanwhile, as in the proposal, different PUCCH resource sets/PUCCH resources may be defined to be distinguished for different TRPs.

In this case, when transmission beams of the UE for multiple PUCCH resources are together changed, the transmission beams of the UE may be defined to be changed together only for PUCCH resources corresponding to the same TRP.

The reason is that different TRPs will have different QCL references from the viewpoint of the UE, and as a result, transmission beams of the UE for respective TRPs may be different from each other.

Accordingly, when the transmission beams of the UE for multiple PUCCH resources are intended to be changed together, the transmission beams may be together changed only for the PUCCH resources corresponding to the same TRP according to the TRP corresponding to the PUCCH resource.

For example, 10 PUCCH resources may reconfigured to the UE, and PUCCH resource #0/#1/ . . . /#4 may correspond to TRP #1 and PUCCH resource #5/#6/ . . . /#9 may correspond to TRP #2.

In this case, among the example of the proposal, when an example of the case in which different CORESET groups correspond to different TRPs is applied, PUCCH resource #0/#1/ . . . /#4 above may correspond to CORESET group #0 and PUCCH resource #5/#6/ . . . /#9 may correspond to CORESET group #1. In this case, the transmission beam configuration of the UE may be intended to be changed together for PUCCH resources configured to the UE in TRP #1.

In this case, the UE may transmit the PDCCH for scheduling the PDSCH for performing the MAC-CE operation through one CORESET among CORESETs constituting CORESET group #0 corresponding to TRP #1. The PDCCH, i.e., PDCCH corresponding to TRP #1 may be referred to as PDCCH #1 and PDSCH scheduled by PDCCH #1 may be referred to as PDSCH #1.

When changing the configurations of the transmission beams of all PUCCH resources configured to the UE is indicated through PDSCH #1, the UE may change only transmission beams of PUSCCH resources corresponding to TRP #1, i.e., PUCCH resource #0/#1/ . . . /#4. FIG. 28 illustrates an example of a proposed scheme.

FIG. 34 illustrates an example of a method for changing a transmission beam for transmission of HARQ Ack/Nack according to an embodiment of the present disclosure.

In FIG. 34, the MAC-CE operation using the PDSCH scheduled by the PDCCH transmitted through CORESET corresponding to TRP #1 may be applied only to PUCCH resources corresponding to the same TRP.

That is, it is shown that a configuration of changing transmission beams of the UE corresponding to multiple PUCCH resources together is applied only to PUCCH resources corresponding to specific TRP.

Meanwhile, the HARQ-ACK codebook may be transmitted to the base station through the PUCCH, but may be transmitted through the PUSCH. When a timing of transmitting the PUCCH and a timing of transmitting the PUSCH overlap with each other, the HARQ-ACK information to be transmitted to the PUCCH may be transmitted together with data through the PUSCH.

As described above, both Type 1 and Type 2 codebooks may be constituted based on the PDSCH index/PDCCH index. Therefore, PUCCH to transmit the corresponding HARQ-ACK codebook may correspond to an index according to a PDSCH index/PDCCH index corresponding to the HARQ-ACK codebook.

For example, PUCCH to transmit an HARQ-ACK codebook for PDSCH/PDCCH 1 may be referred to as PUCCH 1 and PUCCH to transmit an HARQ-ACK codebook for PDSCH/PDCCH 2 may be referred to as PUCCH 2.

In this case, even when there is PUSCH transmission scheduled at a time when PUCCH 1/PUCCH 2 is to be transmitted, a specific index may correspond to the PUSCH in a similar method and PUCCH information may be together encoded to the PUSCH with respect to transmission of PUCCH/PUSCH corresponding to the same index.

In this case, as an example of defining the PUSCH index, the PUSCH index may correspond to an index of PDCCH for scheduling the corresponding PUSCH. For example, PUSCH scheduled by PDCCH 1 may be referred to as PUSCH 1. Based on the proposal, for example, when PUCCH 1/PUCCH 2/PUSCH 1 is transmitted at the same timing, uplink control information (UCI) to be transmitted to PUCCH 1 may be transmitted together with data through PUSCH 1.

Meanwhile, proposed matters corresponding to Proposal #1/#2/#2-1/#2-1-1/#2-2/#2-3/#3/#3-1 above are based on that the TCI state of one CORESET configuration may include multiple, e.g., two or more RS sets, and a specific RS set(s) may be designated through the search space configuration.

As a similar method thereto, a method including multiple CORESET configurations in one search space configuration may be considered. Proposal #2-1/#2-2/#2-3 proposes a method for allocating resource regions corresponding to different RS sets in one CORESET, and when one search space configuration includes multiple CORESET configurations, resource regions corresponding to respective CORESETs may have the same meaning as the resource regions corresponding to the different RS sets.

In Proposal #3/#3-1, it is proposed that in respect to PDCCH of which receiving is successful, HARQ information of PDSCH scheduled by each PDCCH may be constituted as different HARQ-ACK codebooks according to an RS set corresponding to a region in which the corresponding PDCCH is transmitted.

That is, the resource regions may be distinguished according to the RS set within one CORESET, and a specific index may correspond to the PDCCH according to the resource region in which the PDCCH is transmitted. In addition, the PDSCH index may correspond from the PDCCH index. Through this, it is proposed that the HARQ-ACK codebook may be constituted within the same PDCCH/PDSCH index. The proposed matters may be similarly applied even to the case where one search space configuration includes multiple CORESET configurations.

For example, when one search space configuration includes multiple CORESET configurations, the PDCCH index may correspond to the index of the CORESET configuration. For example, when a specific search space configuration includes CORESET #1 and CORESET #2, PDCCH transmitted in CORESET #1 of the corresponding search space may be defined as PDCCH #1 and PDCCH transmitted in CORESET #2 may be defined as PDCCH #2. In this case, the PDCCH index may correspond to random CORESET index #a/#b in ascending order or descending order. When the PDCCH index may be defined, the PDSCH index may also be defined by using the PDCCH index, and the proposed matters assuming multiple RS sets may be applied as they are.

When one search space configuration includes multiple CORESET configurations, there may be an advantage in that a PDCCH transmission region may be relatively arbitrarily configured through the CORESET configuration. However, as defined in the current standard, when the maximum number of CORESETs which may be defined per BWP is maintained to 3 as present, there may be a disadvantage in that the number of CORESET configurations which may be used for other usages/purposes is reduced.

Meanwhile, proposed matters corresponding to Proposal #1/#2/#2-1/#2-1-1/#2-2/#2-3/#3/#3-1 above are based on that the TCI state of one CORESET configuration may include multiple, e.g., two or more RS sets, and a specific RS set(s) may be designated through the search space configuration. As a similar method thereto, a predetermined CORESET group may be defined. As a method that may operate this, the group index may be configured for each CORESET configuration by defining a parameter capable of configuring a group index in a CORESET configuration (ControlResourceSet) which is the higher layer parameter.

Each of a plurality of CORESETs may be grouped according to the CORESET configuration, and respective CORESET groups may be distinguished according to an index value. In this case, an index for the CORESET group may be referred to as a value (or a CORESET pool index) for a CORESET pool.

Proposal #2-1/#2-2/#2-3 proposes a method for allocating resource regions corresponding to different RS sets in one CORESET, and when the CORESET group is defined, resource regions corresponding to CORESETs of different groups may have the same meaning as the resource regions corresponding to the different RS sets.

In Proposal #3/#3-1, it is proposed that in respect to PDCCH of which receiving is successful, HARQ information of PDSCH scheduled by each PDCCH may be constituted as different HARQ-ACK codebooks according to an RS set corresponding to a region in which the corresponding PDCCH is transmitted. That is, the resource regions may be distinguished according to the RS set within one CORESET, and a specific index may correspond to the PDCCH according to the resource region in which the PDCCH is transmitted. In addition, the PDSCH index may correspond from the PDCCH index. Through this, it is proposed that the HARQ-ACK codebook may be constituted within the same PDCCH/PDSCH index.

The proposed matters may be similarly applied even to the case of defining the CORESET group. For example, the PDCCH index may correspond to the CORESET group index configured to the CORESET.

For example, when CORESET #1/#2 is configured to CORESET group #1 and CORESET #3/#4 is configured to CORESET group #2, PDCCH transmitted in CORESET #1/#2 may be defined as PDCCH #1 and PDCCH transmitted in CORESET #3/#4 may be defined as PDCCH #2. When the PDCCH index may be defined as such, the PDSCH index may also be defined by using the PDCCH index, and the proposed matters assuming multiple RS sets may be applied as they are.

When the CORESET group may be configured, the PDCCH transmission region may be relatively arbitrarily configured through each CORESET configuration, and there may be an advantage in that the HARQ-ACK codebook may be constituted for the PDSCH scheduled by the PDCCH transmitted through the CORESET group constituted by multiple CORESETs by defining a specific CORESET configuration as a group. However, as defined in the current standard, when the maximum number of CORESETs which may be defined per BWP is maintained to 3 as present, there may be a disadvantage in that the number of CORESET configurations which may be used for other usages/purposes is reduced.

In the above proposal, the following contents may be together considered. The base station may designate CORESET/Search space/TCI group to the UE. If only one CORESET/Search space/TCI of a plurality of CORESETs/search spaces/TCIs configured to the UE corresponds to TRP 2 and the remaining CORESETs/search spaces/TCIs correspond to TRP 1, the base station distinguishes and indicates one CORESET/Search space/TCI corresponding to TRP 2 to the UE to group CORESET/Search space/TCI. Alternatively, the base station does not distinguish and directly indicate one CORESET/Search space/TCI corresponding to TRP 2, but the UE may determine CORESET/Search space/TCI by a promised rule. For example, CORESET/Search space/TCI having a smallest/largest ID (/index) may be promised to correspond to TRP 2.

<proposal 4: The number of DL RSs which the UE should manage may be limited according to a specific method.

In order for the UE to receive the PDCCH/PDSCH, etc., information on a DL reference signal (RS) which becomes the QCL reference of the PDCCH/PDSCH is required. Therefore, the UE should manage information (e.g., Doppler shift, Doppler spread, average delay, delay spread, Spatial Rx parameter, etc.) required for receiving the PDCCH/PDSCH based on the corresponding RS while continuously receiving the DL RS which may become the QCL reference of the corresponding PDCCH/PDSCH before receiving specific PDCCH/PDSCH.

When the UE considers PDCCH/PDSCH transmission from multiple TRPs, the UE should receive DL RSs from different TRPs, and continuously manage information on the corresponding RS. Accordingly, the number of DL RS which the UE should manage increases together as the number of TRPs capable of transmitting the PDCCH/PDSCH to the UE increases. When the number of DL RSs which the UE should continuously receive and manage increases, the complexity of the UE may increase and battery consumption may become faster.

In order to reduce such an influence, the base station may limit the number of DL RSs which the UE should manage. As a method for limiting the number of DL RSs which the UE should manage, the following examples are available.

Alt. 1: The base station may limit the maximum number of DL RSs which the UE should simultaneously manage. To this end, the base station may indicate the maximum DL RS number to the UE through explicit signaling or implicitly indicate the maximum DL RS number through a rule predetermined between the base station and the UE.

Alt. 2: The base station may indicate, to the UE, information which may correspond to a priority of each DL RS for the DL RSs which the UE should manage. The UE may manage only some RSs having a high priority among all DL RSs based on the corresponding information.

The proposed schemes described above may be independently implemented, but implemented in combination (or merge) of some of the proposed methods.

As an example Alt. 1 above, in order to prevent the complexity of the UE from being excessively increased, the maximum number of DL RSs which the UE should simultaneously manage may be defined to be limited to X or less according to a rule fixed between the base station and the UE.

In this case, it may be assumed that the base station should transmit a signal so as for the UE to receive the PDCCH/PDSCH based on information on DL RSs of a maximum X number or less, and the UE transmits the PDCCH/PDSCH based on the information on the DL RSs of X or less. Meanwhile, FIG. 29 illustrates different beams of respective TRPs illustrated to describe an example for Alt. 2.

FIG. 35 illustrates an example of a method for limiting the number of beams transmitted in different TRPs according to an embodiment of the present disclosure.

In FIG. 35, CSI-RS resources #0, #10, #11, and #12 mean DL RSs transmitted from TRP 1, and CSI-RS resource #0 may be transmitted through a relatively wide beam width and CSI-RS resources #10, #11, and #12 may be transmitted through a relatively narrow beam width.

Likewise, CSI-RS resources #1, #20, #21, and #22 mean DL RSs transmitted from TRP 2, and CSI-RS resource #1 may be transmitted through the relatively wide beam width and CSI-RS resources #20, #21, and #22 may be transmitted through the relatively narrow beam width.

In this case, it may be expected that the narrow beam width will have a relatively higher beamforming gain than the wide beam width. An example of configuring the priority for each DL RS to the UE based on the CSI-RS resources is as follows.

Opt. 1: The CSI-RS resource transmitted from TRP 1 may be configured to a high priority, e.g., priority #1 and the CSI-RS resource transmitted from TRP 2 may be configured to a low priority, e.g., priority #2.

A base station which is expected to primarily use TRP 1 for data exchange with the UE and have a low use frequency of TRP 2 may limit the complexity of the UE by increasing the priority for TRP 1. This may be useful in an environment in which it is difficult to expect transmission from multiple TRPs because resource utilization (RU) is high.

Opt. 2: The CSI-RS resource transmitted through the wide beam width may be configured to a high priority, e.g., priority #1 and the CSI-RS resource transmitted through the narrow beam width may be configured to a low priority, e.g., priority #2.

A base station which intends to ensure a high mobility to the UE may limit the complexity of the UE by increasing the priority for the wide beam width. In this case, the mobility may correspond to a speed of the UE. That is, a base station which intends to provide sable performance even to a UE having a high speed may use such a configuration scheme.

Opt. 3: The base station may configure DL RSs (CSI-RS resources #11 and #21) in which the UE is expected to have a high reception quality to a high priority, e.g., priority #1 and configure DL RSs (CSI-RS resources #0, #1, #10, #12, #20, and #22) in which the UE is expected to have a low reception quality to a low priority, e.g., priority #2.

When determining that the mobility of the UE is low, the base station may limit the complexity of the UE by increasing the priorities for DL RSs in which the UE is expected to have the high reception quality.

Opt. 4: The base station may configure, to the UE, the priorities of the DL RSs according to a random beam combination preferred by the base station. The beam combination may vary depending on a scheduling scheme of the base station and a implementation scheme of the base station, such as coverage, etc.

The complexity of the UE may be limited by distinguishing the priority of the beam according to the implementation scheme of the base station. The efficiency may be enhanced from the viewpoint of the beam operation of the base station.

The UE may adjust a DL RS range to be considered when feeding back channel information to the base station by considering information on priorities which the base station configures in advance for multiple DL RSs, and the UE complexity.

For example, in the above example, a UE which is high in UE complexity and limitation of battery consumption may feed back the channel information only within the DL RS which the base station configures to priority #1.

On the contrary, a UE which is low in UE complexity and limitation of the battery consumption may feed back the channel information to all DL RSs transmitted by the base station. When the proposal is applied, the following advantages may be expected.

The number of DL RSs which the UE should continuously receive and manage is adjusted to lower the complexity of the UE and reduce the battery consumption of the UE.

<Proposal 5: The UE may expect that the number of blind decodings will not exceed x for the specific search space configuration.>

There is a high possibility that non-coherent joint transmission (NCJT) of transmitting multiple layers through different TRPs/panels/beams will be used in an environment in which a reception SINR of the UE is excellent.

Therefore, in this case, a possibility that a high aggregation level will be used becomes lower. The reason is that in the case of the high aggregation level (e.g., 16), a purpose is large in which a PDCCH reception probability of a UE which has a low reception SINR due to being far away from the base station or a bad channel environment is increased to extend the coverage of the base station.

Therefore, in the case of the NCJT of transmitting multiple layers through different TRPs/panels/beams, the maximum blind decoding (BD) number may be limited in order to reduce a PDCCH reception complexity of the UE. As such, when the maximum BD number is limited for a specific search configuration (e.g., a search space configuration to transmit the PDCCH for NCJT scheduling) between the base station and the UE, there is an advantage in that the number of search space configurations having different purposes/usages from the specific search space configuration may be increased.

FIG. 36 is a flowchart showing an example of a method for transmitting, by a UE, HARQ Ack/Nack through different resources according to an embodiment of the present disclosure.

Referring to FIG. 36, the UE may individually transmit HARQ information feedback for PDSCHs transmitted through different TRPs to TRPs, respectively by using different resources on the same slot by using Proposals #1 to #5 described above.

Specifically, a UE receives higher layer configuration information required for configuring a CORESET from a base station (S36010). In this case, a TCI state configured to a specific CORESET may include two or more RS sets by applying Proposal #1. The UE receives higher layer configuration information required for configuring a search space from the base station (S36020). In this case, when the TCI state configured in the specific CORESET has two or more RS sets by applying Proposal #2, the UE may expect that a specific RS set(s) is designated through a search space configuration including the corresponding CORESET configuration.

The UE receives PDCCH in a specific resource region according to previously received CORESET configuration and search space configuration information (S36030). In this case, the UE may calculate a specific resource region capable of receiving the PDCCH by applying Proposals #2-1 to #2-3.

The UE receives PDSCH according to scheduling information indicated by the PDCCH (S36040). The UE transmits, to the base station, the HARQ information for the PDSCH (S36050). In this case, the UE may determine a PUCCH resource to be used for a configuration scheme and transmission of the HARQ information by applying Proposal #3.

FIG. 37 is a flowchart showing an example of a method for receiving, by a base station, HARQ Ack/Nack through different resources according to an embodiment of the present disclosure.

A base station transmits, to a UE, higher layer configuration information required for configuring a CORESET (S37010). In this case, a TCI state configured to a specific CORESET may include two or more RS sets by applying Proposal #1. The base station transmits, to the UE, higher layer configuration information required for configuring a search space (S37020).

In this case, when the TCI state configured in the specific CORESET has two or more RS sets by applying Proposal #2, the base station may designate a specific RS set(s) to the UE through a search space configuration including the corresponding CORESET configuration.

The base station transmits, to the UE, PDCCH by using a specific resource region according to CORESET configuration and search space configuration information previously transmitted to the UE (S37030). In this case, the base station may determine a specific resource region of PDCCH to be used when transmitting the PDCCH to the UE by applying Proposals #2-1 to #2-3.

The base station transmits, to the UE, PDSCH according to scheduling information indicated through the PDCCH (S37040).

The base station receives, from the UE, HARQ information for the PDSCH (S37050). In this case, the base station may expect a PUCCH resource to be used for a configuration scheme and transmission of the HARQ information by applying Proposal #3.

FIGS. 38 and 39 are flowcharts showing an example of signaling between a network and a UE in a multi-TRP situation according to an embodiment of the present disclosure.

FIGS. 38 and 39 illustrate signaling between a network side (e.g., TRP 1, TRP 2) and the UE in a situation of multiple TRPs (i.e., M-TRP or multiple cells, hereinafter, all TRPs may be replaced with cells) to which the methods proposed in the present disclosure may be applied.

Referring to FIGS. 38 and 39, for convenience of description, signaling between two TRPs and the UE is considered, but the corresponding signaling scheme may be extensively applied even to signaling between multiple TRPs and multiple UEs, of course.

In the following description, the network side may be one base station including a plurality of TRPs, and may be one cell including the plurality of TRPs. As an example, ideal/non-ideal backhaul may also be configured between TRP 1 and TRP 2 constituting the network side. Further, the following description is made based on multiple TRPs, but this may be extensively applied even to transmission through multiple panels in the same manner.

Specifically, FIG. 38 illustrates signaling when the UE receives multiple DCIs (i.e., when each TRP transmits the DCI to the UE) in a situation of M-TRP (alternatively, cells, hereinafter, all TRPs may be replaced with the cells). In relation to the corresponding signaling, at least one of the above-described methods (e.g., Proposals #1/#2/#2-1/#2-1-1/#2-2/#2-3/#3/#3-1/#4/#5, etc.) may be applied.

The UE may receive configuration information for multiple TRP based transmission and reception from TRP 1 (and/or TRP 2) (M105). The configuration information may include information related to a configuration of the network side (i.e., TRP configuration), resource information (resource allocation) related to the multiple TRP based transmission and reception, etc. In this case, the configuration information may be transferred through higher layer signaling (e.g., RRC signaling, MAC-CE, etc.). Further, when the configuration information is previously defined or configured, the corresponding step may also be skipped.

Here, the configuration information may include information on a configuration for at least one operation among the above-described methods (e.g., Proposals #1/#2/#2-1/#2-1-1/#2-2/#2-3/#3/#3-1/#4/#5, etc.). As an example, a TCI state configured to a specific CORESET may be configured to include two or more RS sets by applying Proposal #1.

As another example, when the TCI state configured in the specific CORESET has two or more RS sets by applying Proposal #2, the UE may be configured to expect that a specific RS set(s) is designated through a search space configuration including the corresponding CORESET configuration.

As yet another example, configuration information related to the limitation of the number of DL RSs related to the QCL reference may be configured/designated to the UE by applying Proposals #. As still yet another example, configuration information for the number of blind decoding (BD) times for the search space configuration may be configured/designated to the UE by applying Proposal #5.

Thereafter, the UE may receive, from TRP 1, DCI 1 and Data 1 scheduled by corresponding DCI 1 (M110-1). Further, the UE may receive, from TRP 2, DCI 2 and Data 2 scheduled by corresponding DCI 2 (M110-2). In this case, as an example, as in the above-described methods (e.g., Proposals #1/#2/#2-1/#2-1-1/#2-2/#2-3/#3/#3-1/#4/#5, etc.), DCI 1 and/or DCI 2 above may be transferred (through the PDCCH) based on a CORESET (group), a search space, etc., configured/designated based on the configuration information.

Further, DCI (e.g., DCI 1, DCI 2) and Data (e.g., Data 1, Data 2) may be transferred through a control channel (e.g., PDCCH, etc.) and a data channel (e.g., PDSCH, etc.), respectively. Further, steps M110-1 and M110-2 may be simultaneously performed or any one may be performed earlier than the other one. In this case, as an example, performing reception/decoding of the PDCCH through which the DCI is transferred and reception/decoding of Data (i.e., PDSCH) by the UE may be based on at least one of the above-described methods (e.g., Proposals #1/#2/#2-1/#2-1-1/#2-2/#2-3/#3/#3-1/#4/#5, etc.).

Thereafter, the UE may decode Data 1 and Data 2 received from TRP 1 and TRP 2 (M115).

Thereafter, the UE may transmit HARQ-ACK information (e.g., ACK information, NACK information, etc.) for Data 1 and/or Data 2 above to TRP 1 and/or TRP 2 (M120-1 and M120-2).

In this case, the HARQ-ACK information for Data 1 and Data 2 may be combined into one. Further, the UE may be configured to transmit only HARQ-ACK information to representative TRP (e.g., TRP 1), and transmission of the HARQ-ACK information to the other TRP (e.g., TRP 2) may also be skipped. In this case, as an example, the UE may use at least one of the above-described methods (e.g., Proposals #1/#2/#2-1/#2-1-1/#2-2/#2-3/#3/#3-1/#4/#5, etc.) in transmitting the HARQ-ACK information.

As a specific example, by applying Proposal #3, the UE may identify/determine a PUCCH resource(s) to transfer the HARQ information for received Data 1/Data 2 (i.e., PDSCH 1/PDSCH 2), and transmit the HARQ information through the identified PUCCH resource(s). In other words, the network side may expect a configuration scheme of the HARQ information which the UE is to transmit and a PUCCH resource which the UE is to use for transmission. Further, the HARQ-ACK codebook may also be determined by applying Proposal #3-1.

In this regard, the operation of the TRP and/or UE may be implemented by devices (e.g., FIGS. 42, 42, 44, and 45) to be described below. For example, the TRP may correspond to a transmitting device and the UE may correspond to a receiving device, and an opposite case thereto may also be considered.

As a specific example, the UE may receive the DCI through an RF unit and perform DCI decoding and blind decoding (BD) of a DMRS port through a processor and then perform decoding for data. In this process, the UE may use a memory and store the decoded data in the memory. Further, the TRP (i.e., network side) may store data to be transmitted in the memory, and perform scheduling for data signal transmission and DCI encoding by using the processor. Thereafter, the TRP (i.e., network side) may transmit the DCI through the RF unit.

Specifically, FIG. 39 illustrates signaling when the UE receives single DCI (i.e., when one TRP transmits the DCI to the UE) in a situation of M-TRP (alternatively, M-cells, hereinafter, all TRPs may be replaced with the cells).

In FIG. 39, it is assumed that TRP 1 is representative TRP transmitting the DCI. In relation to the corresponding signaling, at least one of the above-described methods (e.g., Proposals #1/#2/#2-1/#2-1-1/#2-2/#2-3/#3/#3-1/#4/#5, etc.) may be applied.

The UE may receive configuration information for multiple TRP based transmission and reception from TRP 1 (and/or TRP 2) (M205). The configuration information may include information related to a configuration of the network side (i.e., TRP configuration), resource information (resource allocation) related to the multiple TRP based transmission and reception, etc. In this case, the configuration information may be transferred through higher layer signaling (e.g., RRC signaling, MAC-CE, etc.).

Further, when the configuration information is previously defined or configured, the corresponding step may also be skipped. Here, the configuration information may include information on a configuration for at least one operation among the above-described methods (e.g., Proposals #1/#2/#2-1/#2-1-1/#2-2/#2-3/#3/#3-1/#4/#5, etc.). As an example, a TCI state configured to a specific CORESET may be configured to include two or more RS sets by applying Proposal #1. As another example, when the TCI state configured in the specific CORESET has two or more RS sets by applying Proposal #2, the UE may be configured to expect that a specific RS set(s) is designated through a search space configuration including the corresponding CORESET configuration. As yet another example, configuration information related to the limitation of the number of DL RSs related to the QCL reference may be configured/designated to the UE by applying Proposals #. As still yet another example, configuration information for the number of blind decoding (BD) times for the search space configuration may be configured/designated to the UE by applying Proposal #5.

Thereafter, the UE may receive, from TRP 1, DCI 1 and Data 1 scheduled by corresponding DCI 1 (M210-1). Further, the UE may receive Data 2 from TRP 2 (M210-2). Here, the DCI may be configured to be used for scheduling both Data 1 and Data 2. In this case, as an example, as in the above-described methods (e.g., Proposals #1/#2/#2-1/#2-1-1/#2-2/#2-3/#3/#3-1/#4/#5, etc.), the DCI may be transferred (through the PDCCH) based on a CORESET (group), a search space, etc., configured/designated based on the configuration information.

Further, DCI and Data (e.g., Data 1, Data 2) may be transferred through a control channel (e.g., PDCCH, etc.) and a data channel (e.g., PDSCH, etc.), respectively. Further, steps M210-1 and M210-2 may be simultaneously performed or any one may be performed earlier than the other one. In this case, as an example, performing reception/decoding of the PDCCH through which the DCI is transferred and reception/decoding of Data (i.e., PDSCH) by the UE may be based on at least one of the above-described methods (e.g., Proposals #1/#2/#2-1/#2-1-1/#2-2/#2-3/#3/#3-1/#4/#5, etc.).

Thereafter, the UE may decode Data 1 and Data 2 received from TRP 1 and TRP 2 (M215).

Thereafter, the UE may transmit HARQ-ACK information (e.g., ACK information, NACK information, etc.) for Data 1 and/or Data 2 above to TRP 1 and/or TRP 2 (M220-1 and M220-2). In this case, according to the number of codewords, HARQ-ACK information for Data 1 and/or Data 2 may be combined into one or may be separated. Further, the UE may be configured to transmit only HARQ-ACK information to representative TRP (e.g., TRP 1), and transmission of the HARQ-ACK information to the other TRP (e.g., TRP 2) may also be skipped. In this case, as an example, the UE may use at least one of the above-described methods (e.g., Proposals #1/#2/#2-1/#2-1-1/#2-2/#2-3/#3/#3-1/#4/#5, etc.) in transmitting the HARQ-ACK information. As a specific example, by applying Proposal #3, the UE may identify/determine a PUCCH resource(s) to transfer the HARQ information for received Data 1/Data 2 (i.e., PDSCH 1/PDSCH 2), and transmit the HARQ information through the identified PUCCH resource(s). In other words, the network side may expect a configuration scheme of the HARQ information which the UE is to transmit and a PUCCH resource which the UE is to use for transmission. Further, the HARQ-ACK codebook may also be determined by applying Proposal #3-1.

In this regard, the operation of the TRP and/or UE may be implemented by devices (e.g., FIGS. 42, 43, 44 and 45) to be described below. For example, the TRP may correspond to a transmitting device and the UE may correspond to a receiving device, and an opposite case thereto may also be considered.

As a specific example, the UE may receive the DCI through an RF unit and perform DCI decoding and blind decoding (BD) of a DMRS port through a processor and then perform decoding for data. In this process, the UE may use a memory and store the decoded data in the memory. Further, the TRP (i.e., network side) may store data to be transmitted in the memory, and perform scheduling for data signal transmission and DCI encoding by using the processor. Thereafter, the TRP (i.e., network side) may transmit the DCI through the RF unit.

FIG. 40 is a flowchart showing an example of a method for transmitting, by a UE, HARQ Ack/Nack on different resources according to an embodiment of the present disclosure.

Referring to FIG. 40, when the UE receives DCI through PDCCH through different TRPs and receives each PDSCH scheduled by PDCCH, the UE may individually generate HARQ information for respective PDSCHs, respectively, and transmit the generated HARQ information to respective TRPs through different resources.

Specifically, the UE receives, from the base station, configuration information for configuring a control resource set (CORESET) (S40010). In this case, the configuration information may include index values for configuring a plurality of CORESETs described in Proposals #1 to #5 to a first group and a second group.

For example, the operation of the UE (e.g., reference numeral 4210 and/or 4220 of FIGS. 42 to 25) which receives the configuration information in step S40010 described above may be implemented by devices of FIGS. 42 to 45 to be described below. For example, referring to FIG. 40, one or more processors 102 may control one or more transceivers 106 and/or one or more memories 104 so as to receive the configuration information and one or more transceivers 106 may receive the configuration information.

Thereafter, the UE receives first downlink control information (DCI) for generating Ack/Nack using a dynamic method based on the configuration information (S40020). In this case, the DCI may be transmitted through PDCCH corresponding to the first group as described in Proposals #1 to #5. Further, the UE receives second DCI based on the configuration information (S40030). In this case, the DCI may be transmitted through PDCCH corresponding to the second group as described in Proposals #1 to #5.

For example, the operations of the UE (e.g., reference numeral 4210 and/or 4220 of FIGS. 42 to 45) which receives the first DCI and the second DCI in steps S40020 and S40030 described above may be implemented by devices of FIGS. 42 to 45 to be described below. For example, referring to FIG. 40, one or more processors 102 may control one or more transceivers 106 and/or one or more memories 104 so as to receive the first DCI and the second DCI and one or more transceivers 106 may receive the first DCI and the second DCI.

Thereafter, the UE receives a first Physical Downlink Shared channel (PDSCH) on a resource scheduled by the first DCI (S40040) and receives a second PDSCH on a resource scheduled by the second DCI (S40050).

For example, the operations of the UE (e.g., reference numeral 4210 and/or 4220 of FIGS. 42 to 45) which receives the first PDSCH and the second PDSCH in steps S40040 and S40050 described above may be implemented by devices of FIGS. 42 to 45 to be described below. For example, referring to FIG. 40, one or more processors 102 may control one or more transceivers 106 and/or one or more memories 104 so as to receive the first PDSCH and the second PDSCH and one or more transceivers 106 may receive the first PDSCH and the second PDSCH.

In this case, the first PDSCH and the second PDSCH correspond to a first PDCCH and a second PDCCH, respectively.

Thereafter, the UE separately generates HARQ information for the first PDSCH and the second PDSCH by using indices of the first group and the second group, respectively, and transmits first Ack/Nack for the generated first PDSCH and Ack/Nack for the second PDSCH to respective TRPs (S40060).

For example, the operations of the UE (e.g., reference numeral 4210 and/or 4220 of FIGS. 42 to 45) which transmits the first Ack/Nack and the second Ack/Nack in step S40060 described above to the respective TRPs may be implemented by devices of FIGS. 42 to 45 to be described below. For example, referring to FIG. 45, one or more processors 102 may control one or more transceivers 106 and/or one or more memories 104 so as to transmit the first Ack/Nack and the second Ack/Nack and one or more transceivers 106 may receive the first Ack/Nack and the second Ack/Nack.

In this case, the first DCI and the second DCI include a downlink assignment indicator (DAI) for separately generating the first Ack/Nack and the second Ack/Nack, respectively.

In this case, the first Ack/Nack and the second Ack/Nack may be transmitted through different resources in the same slot, and the first DCI may be received based on the first group and the second DCI may be received based on the second group.

Further, as described in Proposals #1 to #5, the first AcK/Nack may be generated based on the index value configured in the first group and the second Ack/Nack may be generated based on the index value configured in the second group.

Further, the configuration information includes type information indicating that a generating method of the Ack/Nack is dynamically generated, and each of the first Ack/Nack or the second Ack/Nack is determined as Ack or Nack based on the DAI value.

Communication System Applied to the Present Disclosure

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 41 illustrates a communication system (4100) applied to the present disclosure.

Referring to FIG. 41, a communication system (4100) applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 4110a, vehicles 4110b-1 and 4110b-2, an eXtended Reality (XR) device 4110c, a hand-held device 4110d, a home appliance 4110e, an Internet of Things (IoT) device 4110f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 4120a may operate as a BS/network node with respect to other wireless devices.

The wireless devices 4110a to 4110f may be connected to the network 300 via the BSs 4120. An AI technology may be applied to the wireless devices 4110a to 4110f and the wireless devices 4110a to 4110f may be connected to the AI server 400 via the network 300. The network 300 may be configured using a 3G network, a 4G (e.g., LTE) network, or a 5G (e.g., NR) network. Although the wireless devices 4110a to 4110f may communicate with each other through the BSs 4120/network 300, the wireless devices 4110a to 4110f may perform direct communication (e.g., sidelink communication) with each other without passing through the BSs/network. For example, the vehicles 4110b-1 and 4110b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 4110a to 4110f.

Wireless communication/connections 150a, 150b, or 150c may be established between the wireless devices 4110a to 4110f/BS 4120, or BS 4120/BS 4120. Herein, the wireless communication/connections may be established through various RATs (e.g., 5G NR) such as uplink/downlink communication 150a, sidelink communication 150b (or, D2D communication), or inter BS communication (e.g. Relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Devices Applicable to the Present Disclosure

FIG. 42 illustrates wireless devices applicable to the present disclosure.

Referring to FIG. 42, a first wireless device 4210 and a second wireless device 4220 may transmit radio signals through a variety of RATs (e.g., LTE and NR). Herein, {the first wireless device 4210 and the second wireless device 4220} may correspond to {the wireless device 4110x and the BS 4120} and/or {the wireless device 4110x and the wireless device 4110x} of FIG. 41.

The first wireless device 4210 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 4220 may include at least one processor 202 and at least one memory 204 and additionally further include at least one transceiver 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 206 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 4210 and 4220 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. From RF band signals into baseband signals in order to process received user data, control information, radio signals/channels, etc. Using the one or more processors 102 and 202. The one or more transceivers 106 and 206 may convert the user data, control information, radio signals/channels, etc. Processed using the one or more processors 102 and 202 from the base band signals into the RF band signals. To this end, the one or more transceivers 106 and 206 may include (analog) oscillators and/or filters.

Signal Processing Circuit Example to which Present Invention is Applied

FIG. 43 illustrates a signal processing circuit for a transmit signal.

Referring to FIG. 43, a signal processing circuit 2000 may include a scrambler 2010, a modulator 2020, a layer mapper 2030, a precoder 2040, a resource mapper 2050, and a signal generator 2060. Although not limited thereto, an operation/function of FIG. 42 may be performed by the processors 102 and 202 and/or the transceivers 106 and 206 of FIG. 42. Hardware elements of FIG. 43 may be implemented in the processors 102 and 202 and/or the transceivers 106 and 206 of FIG. 42. For example, blocks 2010 to 2060 may be implemented in the processors 102 and 202 of FIG. 42. Further, blocks 2010 to 2050 may be implemented in the processors 102 and 202 of FIG. 42 and the block 2060 may be implemented in the transceivers 106 and 206 of FIG. 42.

A codeword may be transformed into a radio signal via the signal processing circuit 2000 of FIG. 43. Here, the codeword is an encoded bit sequence of an information block. The information block may include transport blocks (e.g., a UL-SCH transport block and a DL-SCH transport block).

The radio signal may be transmitted through various physical channels (e.g., PUSCH and PDSCH).

Specifically, the codeword may be transformed into a bit sequence scrambled by the scrambler 2010. A scramble sequence used for scrambling may be generated based on an initialization value and the initialization value may include ID information of a wireless device. The scrambled bit sequence may be modulated into a modulated symbol sequence by the modulator 2020. A modulation scheme may include pi/2-BPSK (pi/2-Binary Phase Shift Keying), m-PSK (m-Phase Shift Keying), m-QAM (m-Quadrature Amplitude Modulation), etc. A complex modulated symbol sequence may be mapped to one or more transport layers by the layer mapper 2030. Modulated symbols of each transport layer may be mapped to a corresponding antenna port(s) by the precoder 2040 (precoding). Output z of the precoder 2040 may be obtained by multiplying output y of the layer mapper 2030 by precoding matrix W of N*M. Here, N represents the number of antenna ports and M represents the number of transport layers. Here, the precoder 2040 may perform precoding after performing transform precoding (e.g., DFT transform) for complex modulated symbols. Further, the precoder 2040 may perform the precoding without performing the transform precoding.

The resource mapper 2050 may map the modulated symbols of each antenna port to a time-frequency resource. The time-frequency resource may include a plurality of symbols (e.g., CP-OFDMA symbol and DFT-s-OFDMA symbol) in a time domain and include a plurality of subcarriers in a frequency domain. The signal generator 2060 may generate the radio signal from the mapped modulated symbols and the generated radio signal may be transmitted to another device through each antenna. To this end, the signal generator 2060 may include an Inverse Fast Fourier Transform (IFFT) module, a Cyclic Prefix (CP) inserter, a Digital-to-Analog Converter (DAC), a frequency uplink converter, and the like.

A signal processing process for a receive signal in the wireless device may be configured in the reverse of the signal processing process (2010 to 2060) of FIG. 43. For example, the wireless device (e.g., 4210 or 4220 of FIG. 42) may receive the radio signal from the outside through the antenna port/transceiver. The received radio signal may be transformed into a baseband signal through a signal reconstructer. To this end, the signal reconstructer may include a frequency downlink converter, an analog-to-digital converter (ADC), a CP remover, and a Fast Fourier Transform (FFT) module. Thereafter, the baseband signal may be reconstructed into the codeword through a resource demapper process, a postcoding process, a demodulation process, and a de-scrambling process. The codeword may be reconstructed into an original information block via decoding. Accordingly, a signal processing circuit (not illustrated) for the receive signal may include a signal reconstructer, a resource demapper, a postcoder, a demodulator, a descrambler, and a decoder.

Example of a Wireless Device Applied to the Present Disclosure

FIG. 44 illustrates another example of a wireless device applied to the present disclosure. The wireless device may be implemented in various forms according to a use-case/service (refer to FIG. 42).

Referring to FIG. 44, wireless devices 4210 and 4220 may correspond to the wireless devices 4210 and 4220 of FIG. 42 and may be configured by various elements, components, units/portions, and/or modules. For example, each of the wireless devices 4210 and 4220 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 104 of FIG. 42. For example, the transceiver(s) 114 may include the one or more transceivers 106 and 106 and/or the one or more antennas 108 and 108 of FIG. 42. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110).

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (4110a of FIG. 41), the vehicles (4110b-1 and 4110b-2 of FIG. 41), the XR device (4110c of FIG. 41), the hand-held device (4110d of FIG. 41), the home appliance (4110e of FIG. 41), the IoT device (4110f of FIG. 41), a digital broadcast terminal, a hologram device, a public safety device, an MTC device, a medicine device, a fintech device (or a finance device), a security device, a climate/environment device, the AI server/device (400 of FIG. 41), the BSs (4120 of FIG. 41), a network node, etc. The wireless device may be used in a mobile or fixed place according to a use-example/service.

In FIG. 44, the entirety of the various elements, components, units/portions, and/or modules in the wireless devices 4210 and 4220 may be connected to each other through a wired interface or at least a part thereof may be wirelessly connected through the communication unit 110. For example, in each of the wireless devices 4210 and 4220, the control unit 120 and the communication unit 110 may be connected by wire and the control unit 120 and first units (e.g., 130 and 140) may be wirelessly connected through the communication unit 110. Each element, component, unit/portion, and/or module within the wireless devices 4210 and 4220 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Portable Device Example to which Present Invention is Applied

FIG. 45 illustrates a portable device applied to the present disclosure. The portable device may include a smart phone, a smart pad, a wearable device (e.g., a smart watch, a smart glass), and a portable computer (e.g., a notebook, etc.). The portable device may be referred to as a Mobile Station (MS), a user terminal (UT), a Mobile Subscriber Station (MSS), a Subscriber Station (SS), an Advanced Mobile Station (AMS), or a Wireless terminal (WT).

Referring to FIG. 45, a portable device 4210 may include an antenna unit 108, a communication unit 110, a control unit 120, a memory unit 130, a power supply unit 140a, an interface unit 140b, and an input/output unit 140c. The antenna unit 108 may be configured as a part of the communication unit 110. The blocks 110 to 130/140a to 140c correspond to the blocks 110 to 130/140 of FIG. 44, respectively.

The communication unit 110 may transmit/receive a signal (e.g., data, a control signal, etc.) to/from another wireless device and eNBs. The control unit 120 may perform various operations by controlling components of the portable device 4210. The control unit 120 may include an Application Processor (AP). The memory unit 130 may store data/parameters/programs/codes/instructions required for driving the portable device 4210. Further, the memory unit 130 may store input/output data/information, etc. The power supply unit 140a may supply power to the portable device 4210 and include a wired/wireless charging circuit, a battery, and the like. The interface unit 140b may support a connection between the portable device 100 and another external device. The interface unit 140b may include various ports (e.g., an audio input/output port, a video input/output port) for the connection with the external device. The input/output unit 140c may receive or output a video information/signal, an audio information/signal, data, and/or information input from a user. The input/output unit 140c may include a camera, a microphone, a user input unit, a display unit 140d, a speaker, and/or a haptic module.

As one example, in the case of data communication, the input/output unit 140c may acquire information/signal (e.g., touch, text, voice, image, and video) input from the user and the acquired information/signal may be stored in the memory unit 130. The communication unit 110 may transform the information/signal stored in the memory into the radio signal and directly transmit the radio signal to another wireless device or transmit the radio signal to the eNB. Further, the communication unit 110 may receive the radio signal from another wireless device or eNB and then reconstruct the received radio signal into original information/signal. The reconstructed information/signal may be stored in the memory unit 130 and then output in various forms (e.g., text, voice, image, video, haptic) through the input/output unit 140c.

The embodiments described above are implemented by combinations of components and features of the present disclosure in predetermined forms. Each component or feature should be considered selectively unless specified separately. Each component or feature may be carried out without being combined with another component or feature. Moreover, some components and/or features are combined with each other and may implement embodiments of the present disclosure. The order of operations described in embodiments of the present disclosure may be changed. Some components or features of one embodiment may be included in another embodiment, or may be replaced by corresponding components or features of another embodiment. It is apparent that some claims referring to specific claims may be combined with another claims referring to the claims other than the specific claims to constitute the embodiment or add new claims by means of amendment after the application is filed.

Embodiments of the present disclosure may be implemented by various means, for example, hardware, firmware, software, or combinations thereof. When embodiments are implemented by hardware, one embodiment of the present disclosure may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the present disclosure may be implemented by modules, procedures, functions, etc. Performing functions or operations described above. Software code may be stored in a memory and may be driven by a processor. The memory is provided inside or outside the processor and may exchange data with the processor by various well-known means.

It is apparent to those skilled in the art that the present disclosure may be embodied in other specific forms without departing from essential features of the present disclosure. Accordingly, the aforementioned detailed description should not be construed as limiting in all aspects and should be considered as illustrative. The scope of the present disclosure should be determined by rational construing of the appended claims, and all modifications within an equivalent scope of the present disclosure are included in the scope of the present disclosure.

INDUSTRIAL APPLICABILITY

Although the present disclosure has been described with reference to an example applied to a 3GPP LTE/LTE-A/NR system, the present disclosure may be applied to various wireless communication systems in addition to the 3GPP LTE/LTE-A/NR system.

The invention claimed is:

1. A method of transmitting and receiving data by a user equipment (UE) in a wireless communication system, the method comprising:
   receiving system information comprising at least one of a master information block (MB) or a system information block (SIB);
   receiving configuration information for configuring a control resource set (CORESET),
   wherein a first CORESET and a second CORESET are configured based on the configuration information,
   wherein the configuration information includes an index of a CORESET group associated with each CORESET;
   receiving first downlink control information (DCI) based on the first CORESET;
   receiving second DCI based on the second CORESET;
   receiving first Physical Downlink Shared channel (PDSCH) scheduled by the first DCI;
   receiving second PDSCH scheduled by the second DCI;
   transmitting first Hybrid Automatic Repeat Request-Acknowledgement (HARQ-ACK) information corresponding to the first PDSCH; and
   transmitting second HARQ-ACK information corresponding to the second PDSCH,
   wherein the method further comprising:
   receiving information for determination of a HARQ-ACK codebook,
   wherein the first HARQ-ACK information and the second HARQ-ACK information are based on the HARQ-ACK codebook determined by the information, wherein based on an index of a CORESET group associated with the first CORESET being configured differently from an index of a CORESET group associated with the second CORESET, the first HARQ-ACK information and the second HARQ-ACK information are generated separately, and wherein the first HARQ-ACK information is associated with the first CORESET and the second HARQ-ACK information is associated with the second CORESET.

2. The method of claim 1,
wherein the information for determination of the HARQ-ACK codebook indicates one of a dynamic type or a semi-static type.

3. The method of claim 2,
wherein each of the first DCI and the second DCI includes a downlink assignment indicator (DAI) field.

4. The method of claim 3,
wherein based on the information indicating the dynamic type, values of the HARQ-ACK codebook are determined as Acknowledgement (Ack) or Negative Acknowledgement (Nack) based on a value of the DAI field included in each DCI.

5. The method of claim 2,
wherein the first HARQ-ACK information is transmitted via a first physical uplink control channel (PUCCH) and the second HARQ-ACK information is transmitted via a second PUCCH.

6. The method of claim 5,
wherein the first PUCCH and the second PUCCH are transmitted in different resources within a slot.

7. The method of claim 6,
wherein a first PUCCH resource is scheduled by the first DCI, and a second PUCCH resource is scheduled by the second DCI.

8. The method of claim 7,
wherein the first PDSCH and the second PDSCH are received on overlapped resources in a time domain.

9. The method of claim 2,
wherein the first HARQ-ACK information is generated based on the index of the CORESET group associated with the first CORESET, and
wherein the second HARQ-ACK information is generated based on the index of the CORESET group associated with the second CORESET.

10. A user equipment (UE) configured to transmit and receive data in a wireless communication system, the UE comprising:
a transceiver;
at least one processor; and
at least one computer memory operably connectable to the at least one processor and storing instructions that, when executed by the at least one processor, perform operations comprising:
receiving system information comprising at least one of a master information block (MIB) or a system information block (SIB);
receiving configuration information for configuring a control resource set (CORESET),
wherein a first CORESET and a second CORESET are configured based on the configuration information,
wherein the configuration information includes an index of a CORESET group associated with each CORESET;
receiving first downlink control information (DCI) based on the first CORESET;
receiving second DCI based on the second CORESET;
receiving first Physical Downlink Shared channel (PDSCH) scheduled by the first DCI;
receiving second PDSCH scheduled by the second DCI;
transmitting first Hybrid Automatic Repeat Request-Acknowledgement (HARQ-ACK) information corresponding to the first PDSCH; and
transmitting second HARQ-ACK information corresponding to the second PDSCH,
wherein the operations further comprising:
receiving information for determination of a HARQ-ACK codebook,
wherein the first HARQ-ACK information and the second HARQ-ACK information are based on the HARQ-ACK codebook determined by the information,
wherein based on an index of a CORESET group associated with the first CORESET being configured differently from an index of a CORESET group associated with the second CORESET, the first HARQ-ACK information and the second HARQ-ACK information are generated separately, and
wherein the first HARQ-ACK information is associated with the first CORESET and the second HARQ-ACK information is associated with the second CORESET.

11. The UE of claim 10,
wherein the information for determination of the HARQ-ACK codebook indicates one of a dynamic type or a semi-static type.

12. The UE of claim 11,
wherein each of the first DCI and the second DCI includes a downlink assignment indicator (DAI) field.

13. The UE of claim 12,
wherein based on the information indicating the dynamic type, values of the HARQ-ACK codebook are determined as Acknowledgement (Ack) or Negative Acknowledgement (Nack) based on a value of the DAI field included in each DCI.

14. The UE of claim 11,
wherein the first HARQ-ACK information is transmitted via a first physical uplink control channel (PUCCH) and the second HARQ-ACK information is transmitted via a second PUCCH.

15. The UE of claim 14,
wherein the first PUCCH and the second PUCCH are transmitted in different resources within a slot.

16. The UE of claim 15,
wherein a first PUCCH resource is scheduled by the first DCI, and a second PUCCH resource is scheduled by the second DCI.

17. The UE of claim 16,
wherein the first PDSCH and the second PDSCH are received on overlapped resources in a time domain.

18. The UE of claim 11,
wherein the first HARQ-ACK information is generated based on the index of the CORESET group associated with the first CORESET, and
wherein the second HARQ-ACK information is generated based on the index of the CORESET group associated with the second CORESET.

19. One or more non-transitory computer-readable medium storing one or more instructions, the one or more instructions executable by one ore more processors to cause a user equipment (UE) to:
receive system information comprising at least one of a master information block (MB) or a system information block (SIB);
receive configuration information for configuring a control resource set (CORESET),
wherein a first CORESET and a second CORESET are configured based on the configuration information, wherein the configuration information includes an index of a CORESET group associated with each CORESET;
receive first downlink control information (DCI) based on the first CORESET;
receive second DCI based on the second CORESET;
receive first Physical Downlink Shared channel (PDSCH) scheduled by the first DCI;
receive second PDSCH scheduled by the second DCI;
transmit first Hybrid Automatic Repeat Request-Acknowledgement (HARQ-ACK) information corresponding to the first PDSCH; and
transmit second HARQ-ACK information corresponding to the second PDSCH,
wherein the one or more instructions to cause the UE further to:
receive information for determination of a HARQ-ACK codebook,
wherein the first HARQ-ACK information and the second HARQ-ACK information are based on the HARQ-ACK codebook determined by the information,
wherein based on an index of a CORESET group associated with the first CORESET being configured differently from an index of a CORESET group associated with the second CORESET, the first HARQ-ACK information and the second HARQ-ACK information are generated separately, and
wherein the first HARQ-ACK information is associated with the first CORESET and the second HARQ-ACK information is associated with the second CORESET.

\* \* \* \* \*